US012676524B1

(12) United States Patent
Hynes, Jr. et al.

(10) Patent No.: US 12,676,524 B1
(45) Date of Patent: Jul. 7, 2026

(54) STACKED PLATE STATOR SYSTEM AND DEVICE

(71) Applicant: CONTINENTAL CONTROLS AND DESIGN, INC., Huntington Beach, CA (US)

(72) Inventors: James Patrick Hynes, Jr., Huntington Beach, CA (US); James Patrick Hynes, III, Fountain Valley, CA (US)

( * ) Notice: Subject to any disclaimer, the term of this patent is extended or adjusted under 35 U.S.C. 154(b) by 332 days.

(21) Appl. No.: 18/238,436

(22) Filed: Aug. 25, 2023

Related U.S. Application Data

(60) Provisional application No. 63/401,478, filed on Aug. 26, 2022.

(51) Int. Cl.
| | |
|---|---|
| *H02K 3/28* | (2006.01) |
| *H02K 3/18* | (2006.01) |
| *H02K 3/26* | (2006.01) |
| *H02K 11/01* | (2016.01) |

(52) U.S. Cl.
CPC ................ *H02K 3/28* (2013.01); *H02K 3/18* (2013.01); *H02K 3/26* (2013.01); *H02K 11/014* (2020.08)

(58) Field of Classification Search
CPC .. H02K 3/12; H02K 3/18; H02K 3/26; H02K 3/487; H02K 3/493; H02K 15/0407; H02K 15/0414; H02K 15/0432; H02K 15/062; H02K 15/064; H02K 15/0646

USPC .......................................................... 310/179
See application file for complete search history.

(56) References Cited

U.S. PATENT DOCUMENTS

| | | | | |
|---|---|---|---|---|
| 6,548,933 | B2 * | 4/2003 | Yasuhara | H02K 3/505 310/206 |
| 7,268,456 | B2 * | 9/2007 | Harada | H02K 3/12 310/201 |
| 8,044,550 | B2 | 10/2011 | Baumann | |
| 11,070,100 | B2 | 7/2021 | Bernhardt et al. | |
| 11,296,582 | B2 * | 4/2022 | Hotta | H02K 5/225 |
| 11,362,611 | B2 | 6/2022 | Bailey et al. | |
| 11,557,930 | B2 * | 1/2023 | Koga | H02K 3/28 |
| 2019/0207460 | A1 * | 7/2019 | Iwaki | H02K 15/13 |
| 2024/0039355 | A1 * | 2/2024 | Takahashi | H02K 3/28 |

* cited by examiner

*Primary Examiner* — Oluseye Iwarere
*Assistant Examiner* — Minki Chang
(74) *Attorney, Agent, or Firm* — Olav M. Underdal; IDP Patent Services

(57) ABSTRACT

A stacked plate stator device including a stator body with a plurality of stator teeth, a plurality of winding assemblies, each including a plurality of conductive plate assemblies interleafed and stacked one upon the other with each adjacent plate assembly, including first and second sub-plates and having a single continuous path of conductivity through the stator winding. Also disclosed is a stacked electrical device with a device housing, a stacked plate stator device, and an electrical rotor.

28 Claims, 45 Drawing Sheets

Stacked Plate Stator Device

FIG. 4C                                       FIG. 4D
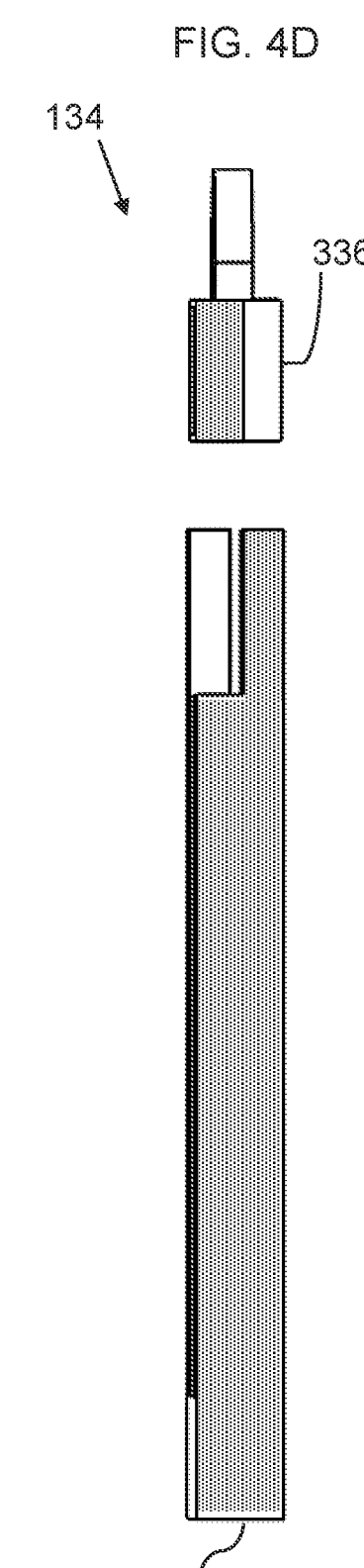
134
336
338

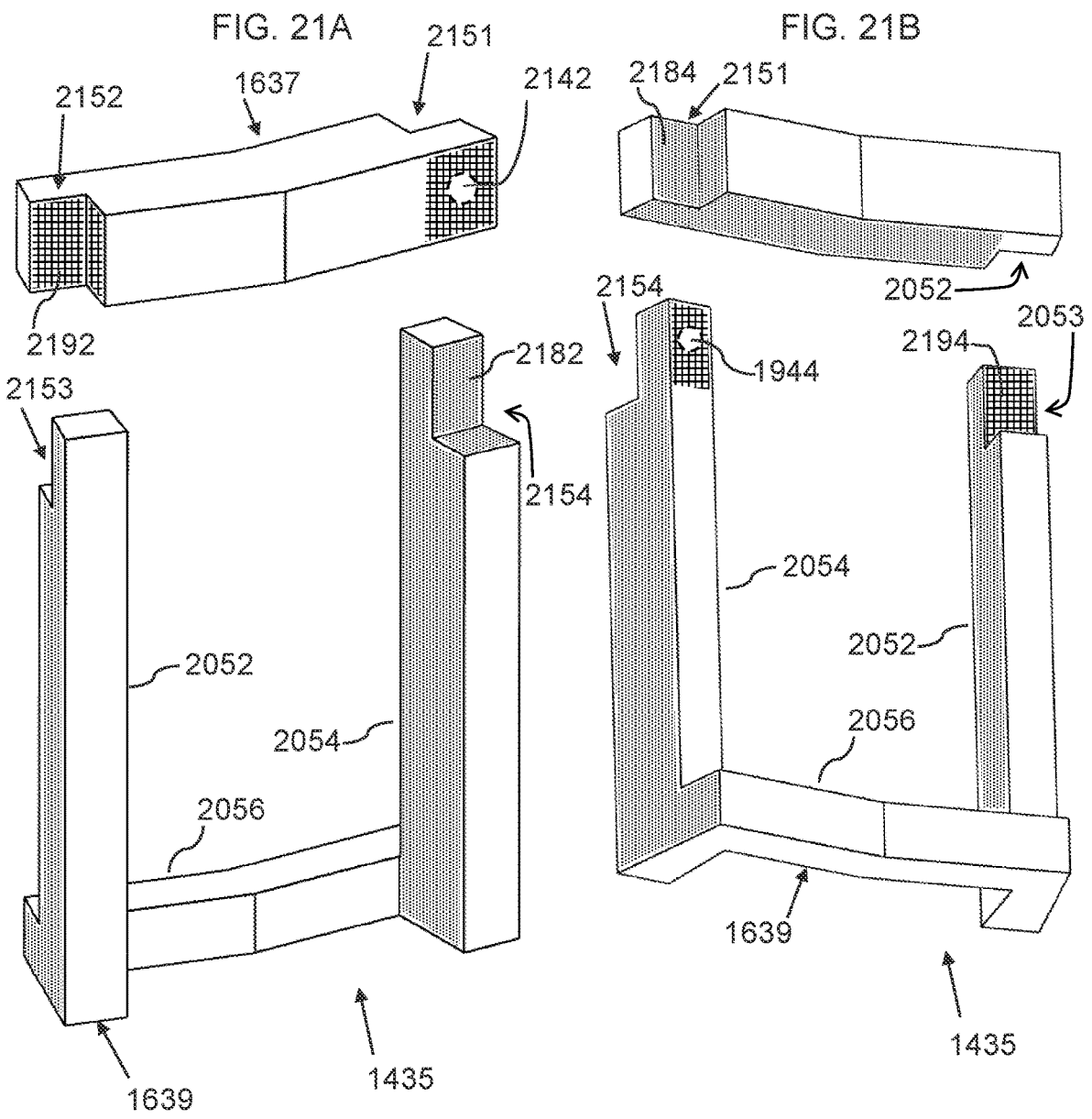

STACKED PLATE STATOR SYSTEM AND DEVICE

CROSS-REFERENCE TO RELATED APPLICATIONS

This application claims the benefit of U.S. Provisional Application No. 63/401,478, filed Aug. 26, 2022; which is hereby incorporated herein by reference in its entirety.

GOVERNMENT SUPPORT STATEMENT

This invention was made with government support under 80NSSC19C0095 awarded by the National Aeronautics and Space Administration. The government has certain rights in the invention.

FIELD OF THE INVENTION

The present invention relates generally to the field of electrical motors and inductors, and more particularly to methods and systems for stator windings in stator devices and systems.

BACKGROUND OF THE INVENTION

Existing electrical devices that include a stator use wires, bars or hairpin shaped material as windings in the stator, for example to generate a magnetic field to produce rotational torque in the rotor of such devices.

Stators typically comprise a ring with teeth and slots about its circumference with windings filling the slots. The phase resistance in a stator winding of an electric device is inversely proportional to the amount of copper that can be inserted into its slots. Theoretically, round wires can be wound to a 'fill factor' of over 90% of the stator slots if they are packed hexagonally but in practice it has proven very difficult to achieve even 50% fill factor with typical values closer to 25-30%. Very large machines, such as stationary generators, typically use Roebel bars which are interleaved to carefully equalize the electromagnetic fields of parallel circuits, but small motors of 1-100 kW are typically 'random wound' with small cross section round copper wires which are easily bent around the end turns as the slot is filled. Sometimes 'hairpin' formed windings are used and these generally have just a few turns and the coils are welded at each slot crossing. Heavier wires can be painstakingly hand wound in a deterministic sequence in an attempt to increase slot fill factor, but these suffer from higher proximity and skin effect losses due to internal eddy currents. These skin effects losses are more pronounced as operating frequencies increase and the conductor thickness or diameter is greater than the skin depth resulting in the loss of conductance in the windings.

As such, considering the foregoing, it may be appreciated that there continues to be a need for novel and improved devices and methods for stator windings.

SUMMARY OF THE INVENTION

The foregoing needs are met, to a great extent, by the present invention, wherein in aspects of this invention, enhancements are provided to the existing model of stator windings in stator devices and systems.

In an aspect, an electrical device, such as an electrical engine or an electrical generator, can include:
a) a device housing;

b) a stacked plate stator device, which is configured to be stationary relative to the device housing, wherein the stacked plate stator device can include:
  i. a plurality of winding assemblies, which can each include:
    1) a plurality of stacked plate assemblies, each including a first sub-plate and a second sub-plate; and
c) an electrical rotor, which can include:
  i. a circular magnet portion, including a plurality of magnets;
  ii. a circular support portion, which is connected to the circular magnet portion;
  wherein the electrical rotor is configured to be rotatable relative to the housing of the stacked plate stator device;
wherein the stacked plate stator device is configured to cause a rotation of the electrical rotor, when at least one electrical current is passed through the stacked plate stator device; and
wherein the stacked plate stator device is configured such that a rotation of the electrical rotor, induces at least one electrical current of the stacked plate stator device.

In a related aspect, a stacked plate stator device, can include:
a) a stator body, which can include:
  i. a stator support member, which can be ring-shaped with a central aperture; and
  ii. a plurality of stator teeth, which can each include:
    1) a tooth body; and
    2) a tooth head, which is connected to an outer end of the tooth body;
    such that each stator tooth protrudes radially from the stator support member; and
    such that stator slots are formed between consecutive stator teeth;
b) a plurality of winding assemblies, which can each include:
  i. at least one or a plurality of stacked plate assemblies, which can each include:
    1) a first sub-plate; and
    2) a second sub-plate, such that a first end of the second sub-plate is mechanically and electrically connected to a second end of the first sub-plate;
    such that each plate assembly forms an interior passageway, such that the plurality of stacked plate assemblies form a combined passageway of the at least one winding assembly;
    such that a second end of the second sub-plate is electrically insulated from a first end of the first sub-plate;
    such that the plate assembly forms a 360-degree turn around the interior passageway;
    such that the tooth body of the at least one stator tooth protrudes through the combined passageway of the at least one winding assembly;
    such that each successive plate assembly is stacked upon a prior plate assembly;
    such that each successive plate assembly is electrically connected with a prior plate assembly, such that a front conductive entry portion of each successive plate assembly is electrically connected with a rear conductive exit portion of a prior plate assembly, such that the at least one winding assembly forms a spiraling continuous path of conductivity, which spirals around the tooth body of the at least one stator tooth.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 2C is a cross-sectional view of a portion of stacked plate stator device taken along section line 2C-2C of FIG. 1C, according to an embodiment of the invention.

4

Figures 4A, 4B:
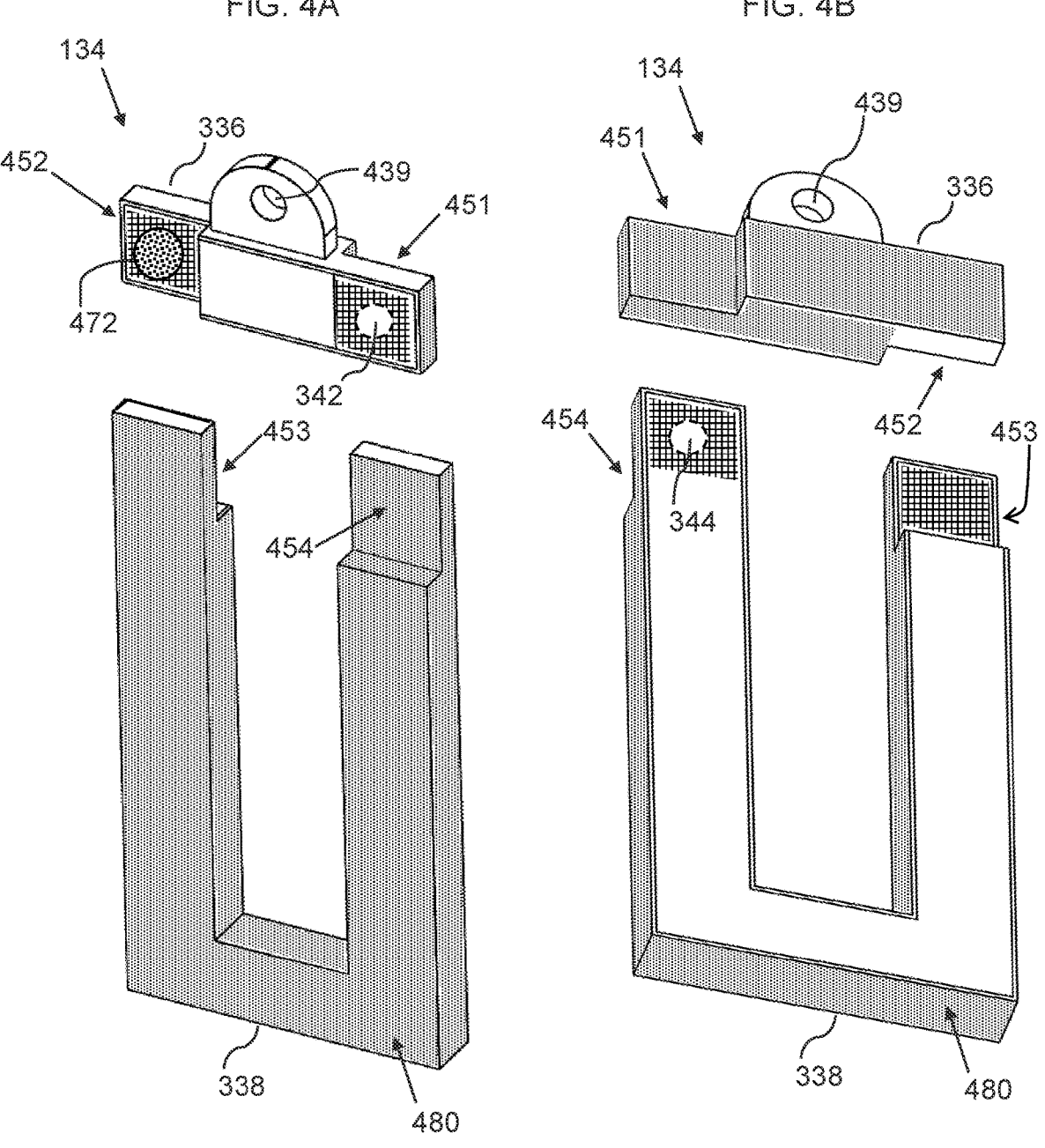

FIG. 4A is an exploded top front perspective view of a plate assembly of a stacked plate stator device, according to an embodiment of the invention.

FIG. 4B is an exploded bottom rear perspective view of a plate assembly of a stacked plate stator device, according to an embodiment of the invention.

FIG. 4C is an exploded left side view of a plate assembly of a stacked plate stator device, according to an embodiment of the invention.

FIG. 4D is an exploded right side view of a plate assembly of a stacked plate stator device, according to an embodiment of the invention.

Figure 5A:
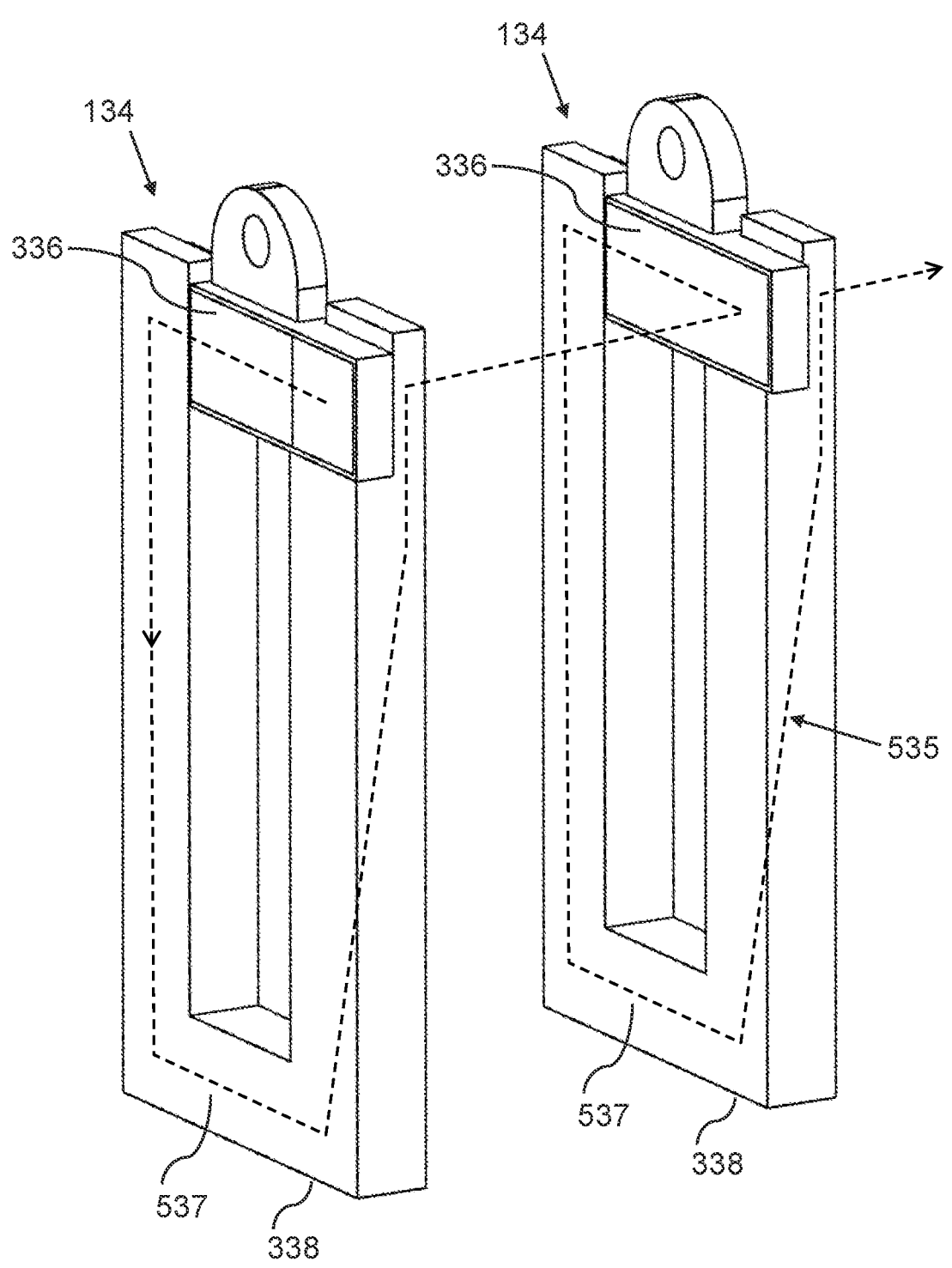

FIG. 5A is a top front partially exploded perspective view of two consecutive plate assemblies in a winding assembly of a stacked plate stator device, according to an embodiment of the invention.

Figure 5B:
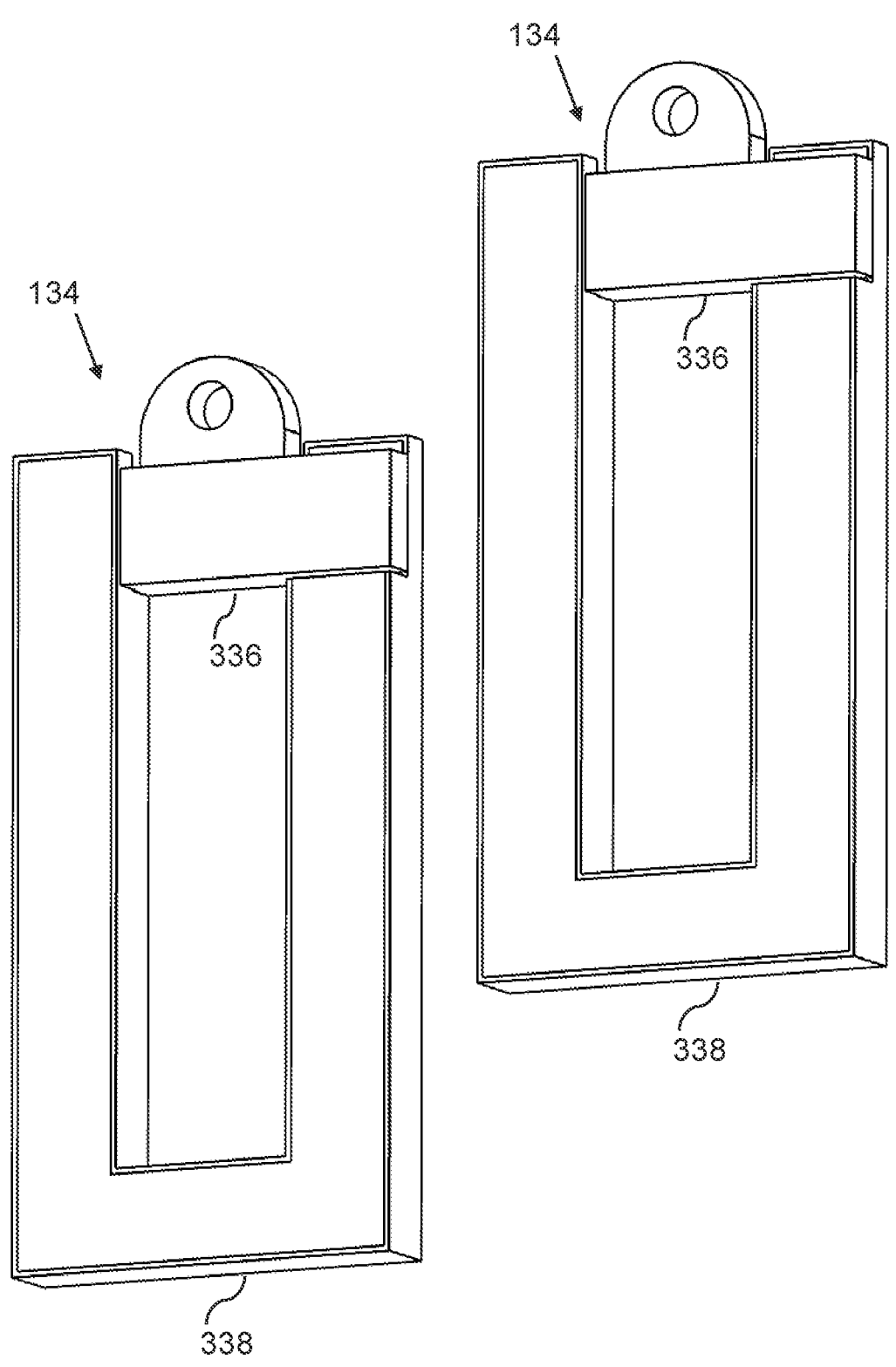

FIG. 5B is bottom rear partially exploded perspective view of two consecutive plate assemblies in a winding assembly of a stacked plate stator device, according to an embodiment of the invention.

Figure 6A:
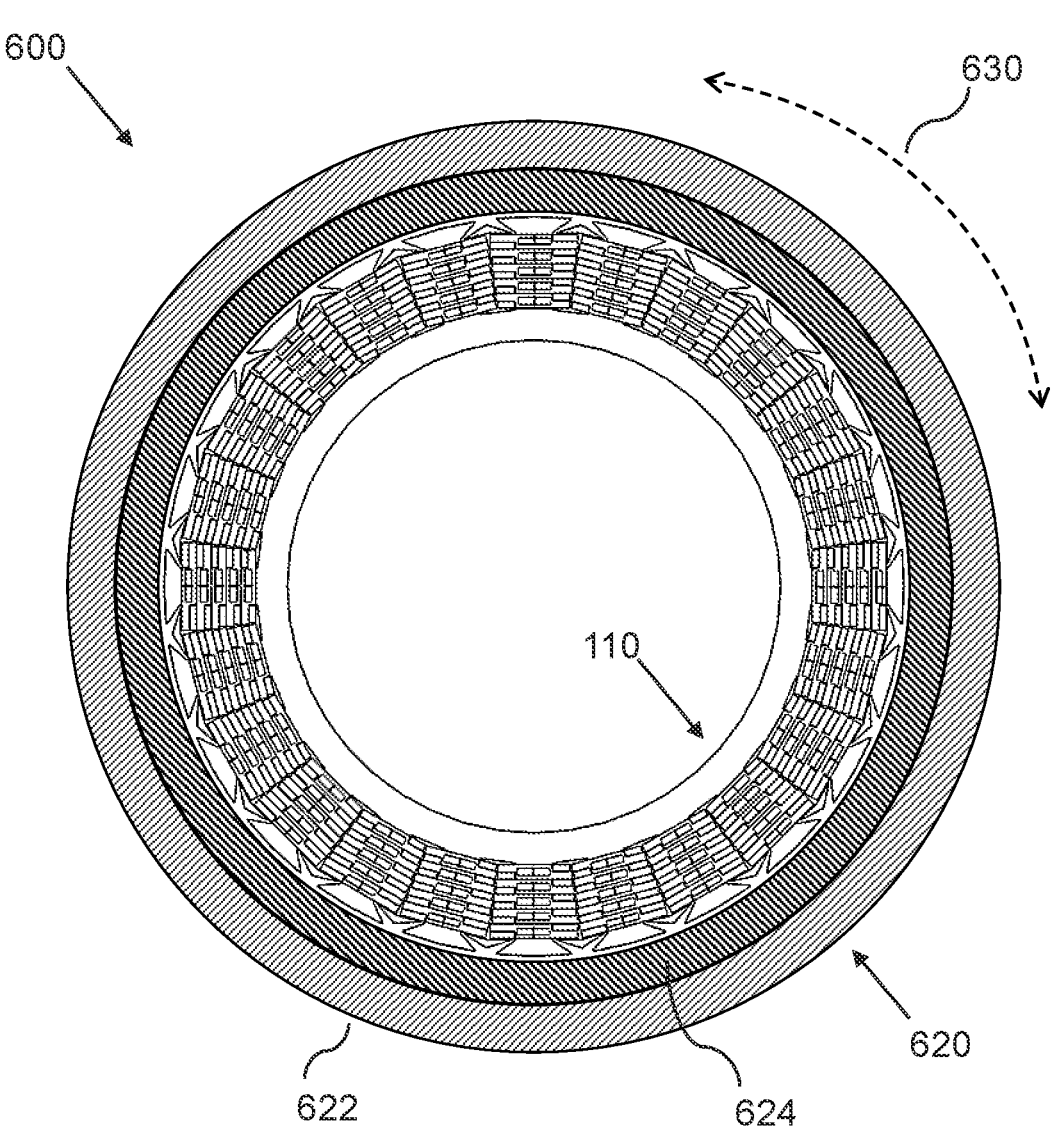

FIG. 6A is a top schematic view of an electric device that includes a stacked plate stator device, according to an embodiment of the invention.

Figure 6B:
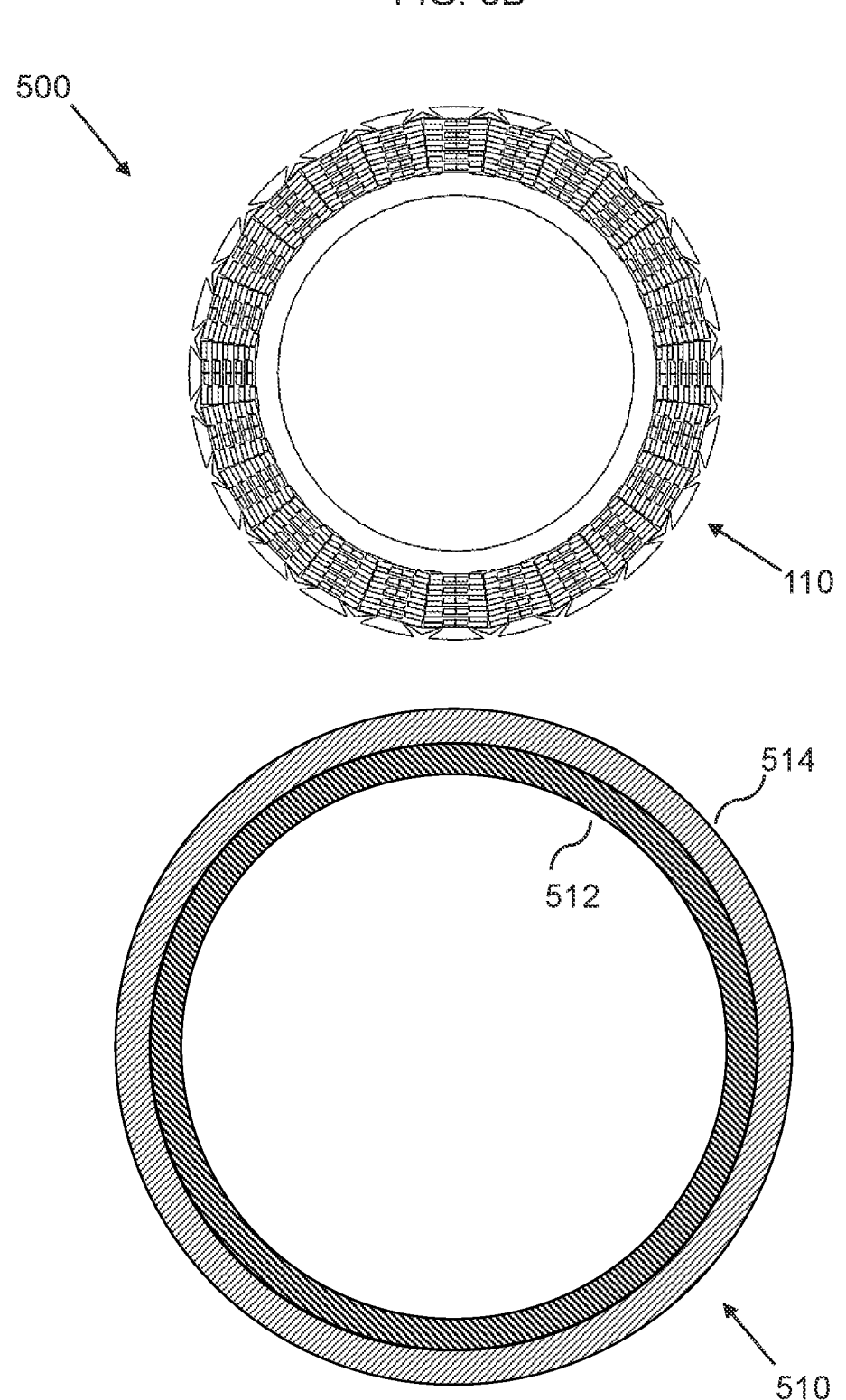

FIG. 6B is a top schematic exploded view of an electric device that includes a stacked plate stator device, according to an embodiment of the invention.

Figure 7A:
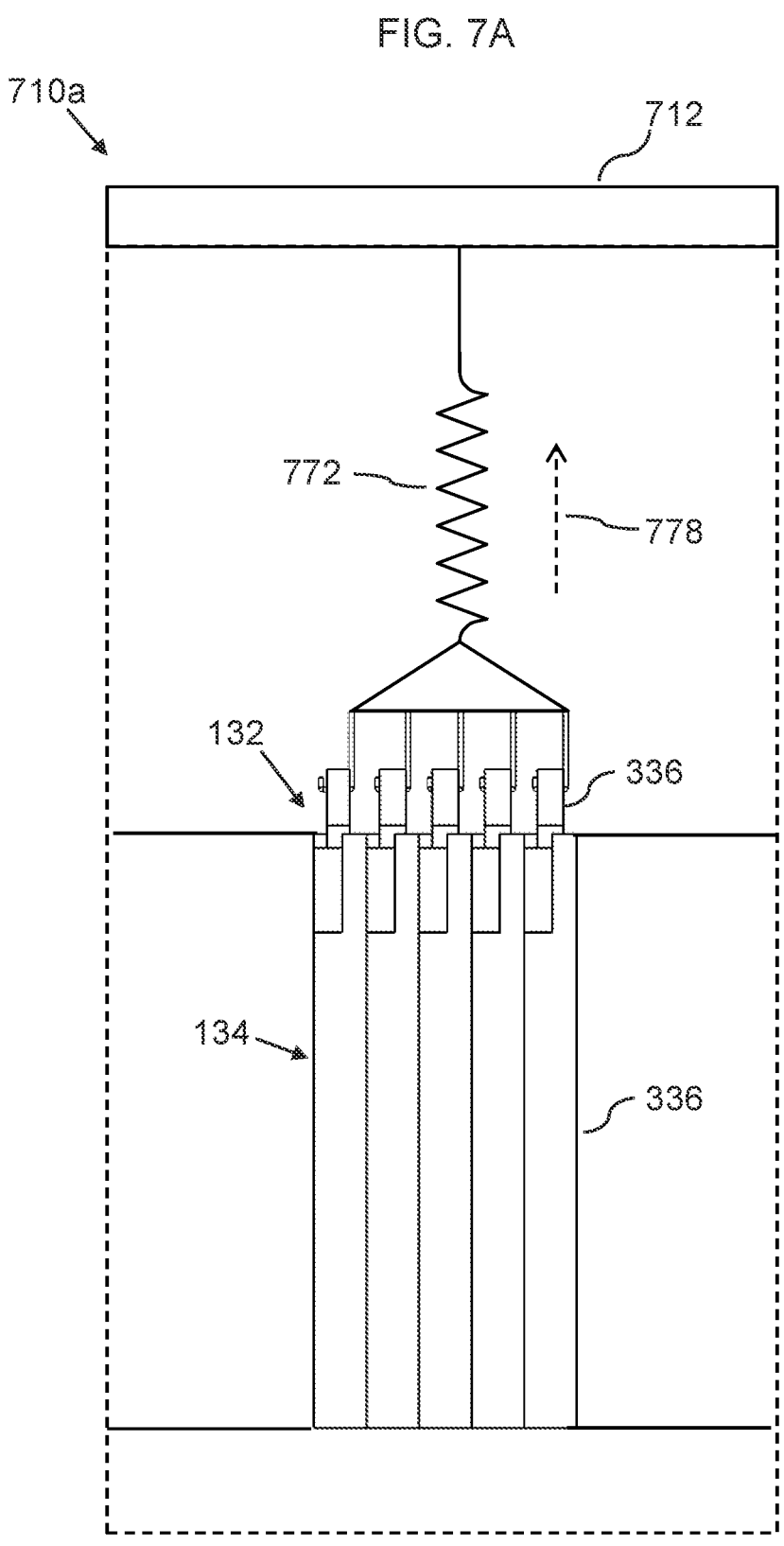

FIG. 7A is a side schematic view of a stacked plate stator device with spring mounted plate assemblies, according to an embodiment of the invention.

Figure 7B:
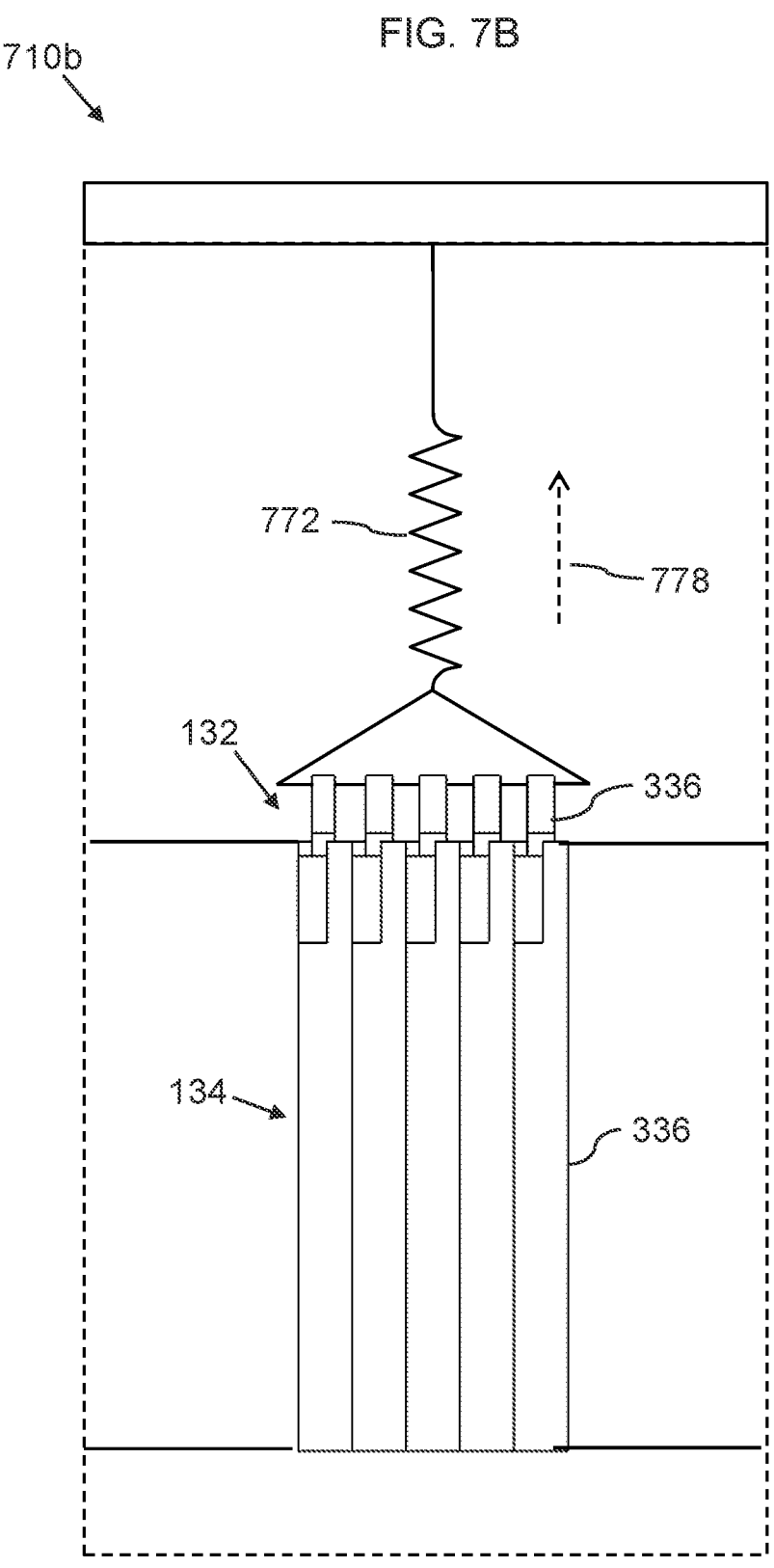

FIG. 7B is a side schematic view of a stacked plate stator device with a spring mounted winding assembly, according to an embodiment of the invention.

Figure 7C:
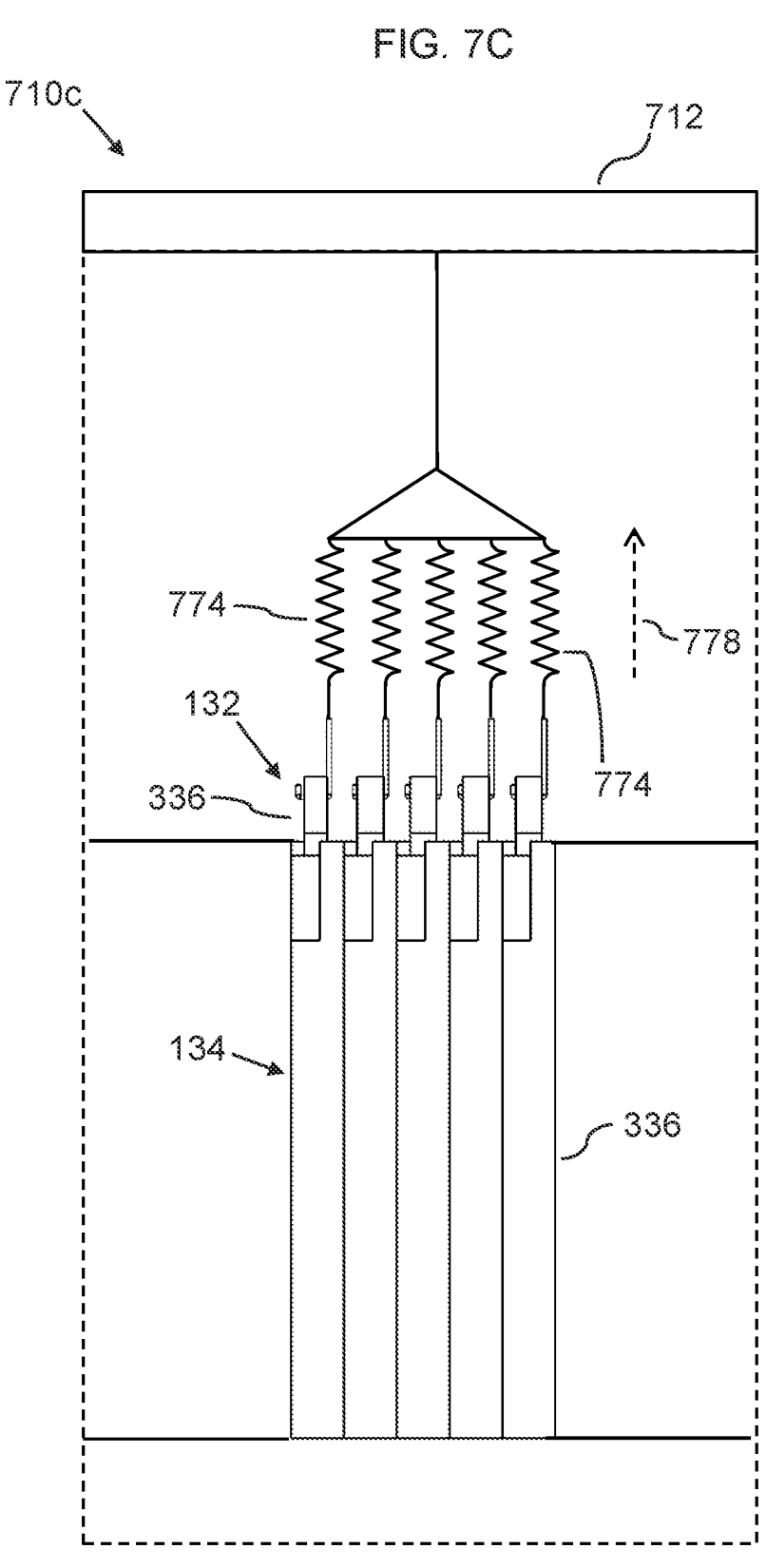

FIG. 7C is a side schematic view of a stacked plate stator device with spring mounted plate assemblies in a connected configuration, according to an embodiment of the invention.

Figure 7D:
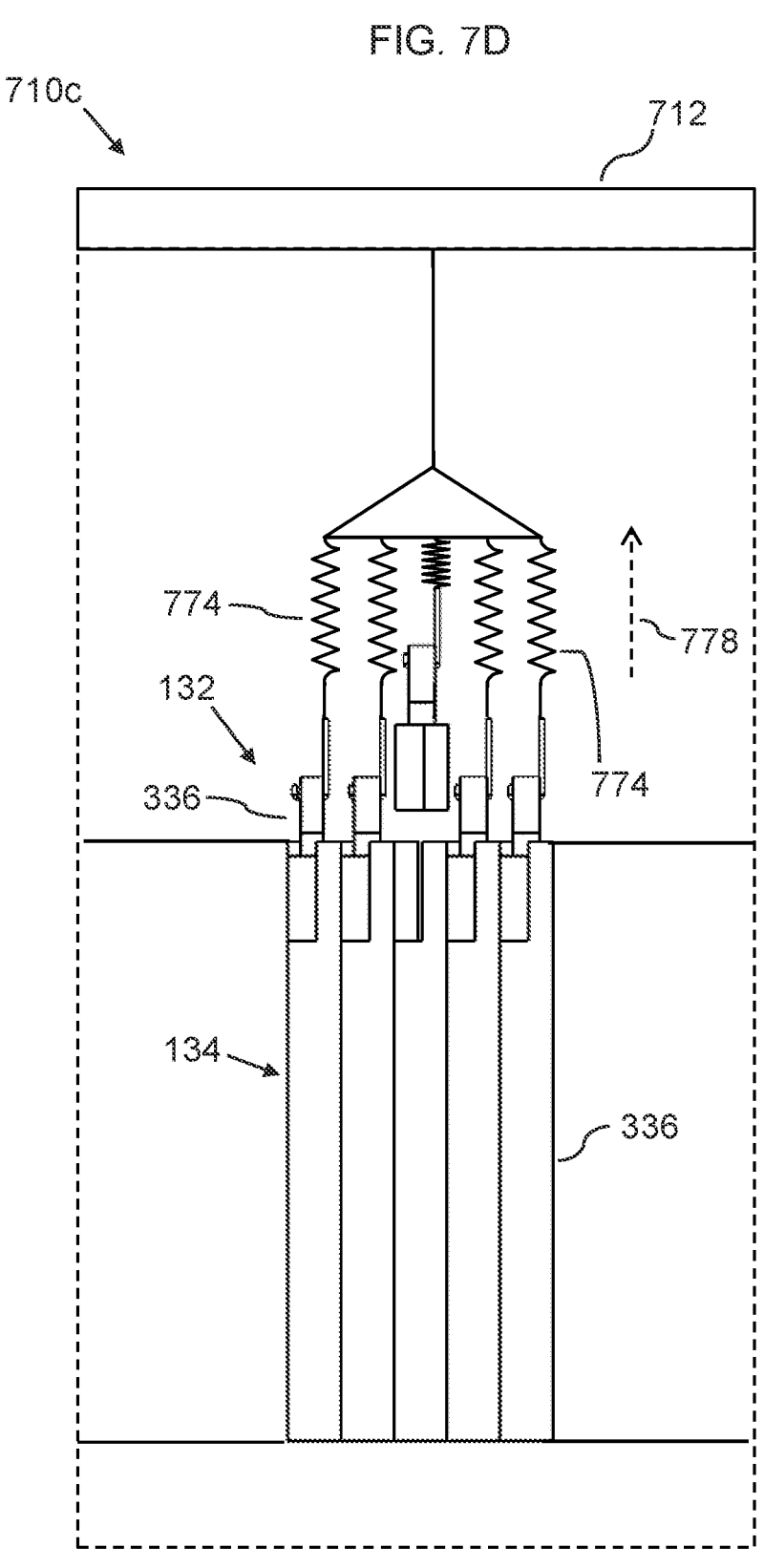

FIG. 7D is a side schematic view of a stacked plate stator device with spring mounted plate assemblies in a disconnected configuration, according to an embodiment of the invention.

Figure 8A:
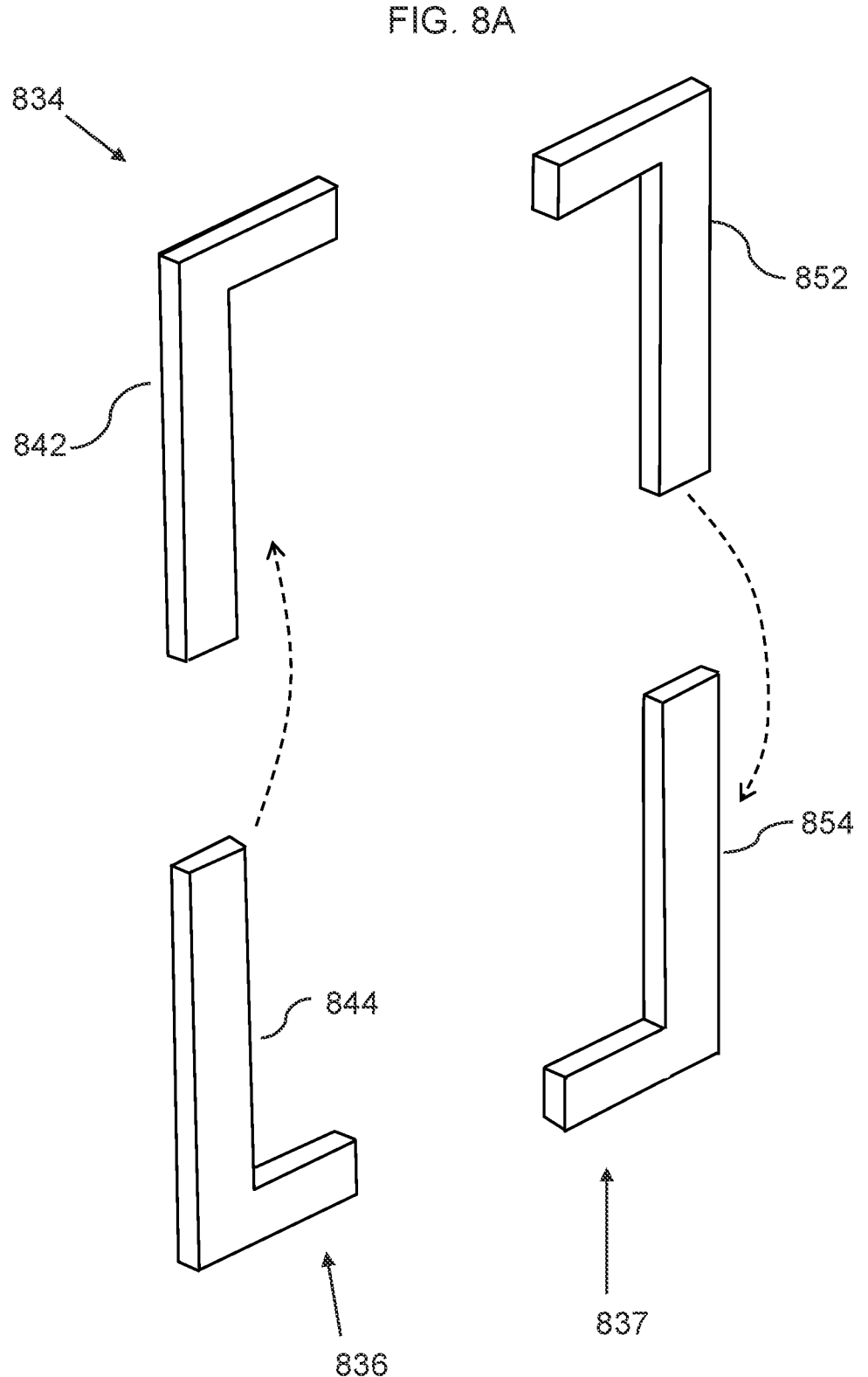

FIG. 8A is an exploded perspective view of components of first and second sub-plates of a plate assembly, according to an embodiment of the invention.

Figure 8B:
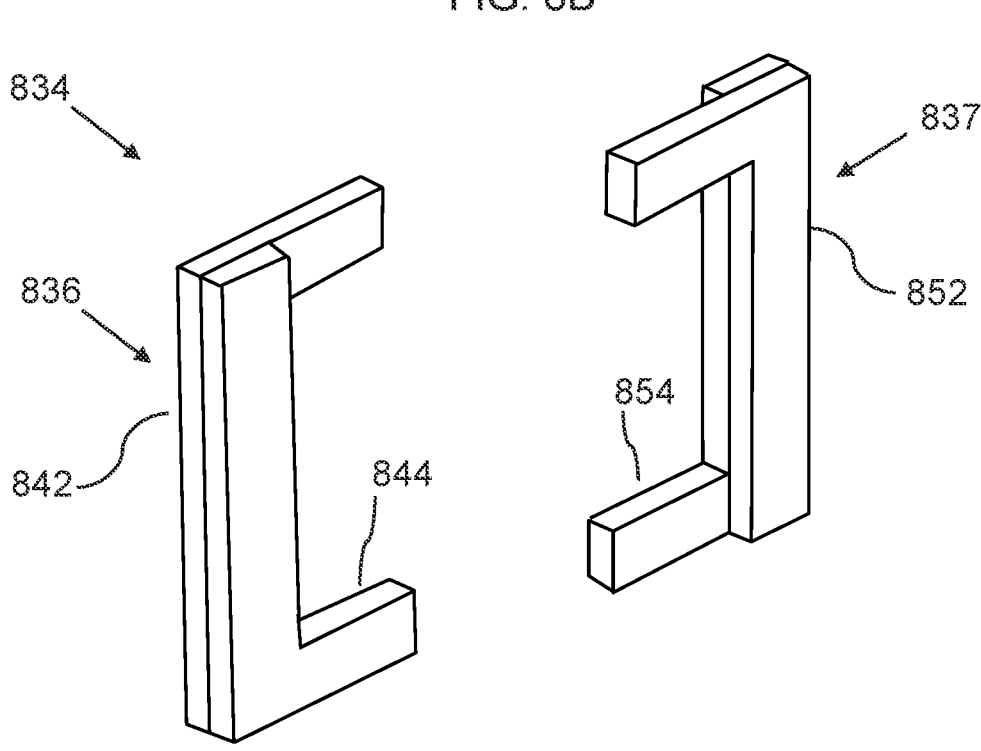

FIG. 8B is a perspective view of first and second sub-plates of a plate assembly in a disconnected configuration, according to an embodiment of the invention.

Figure 8C:
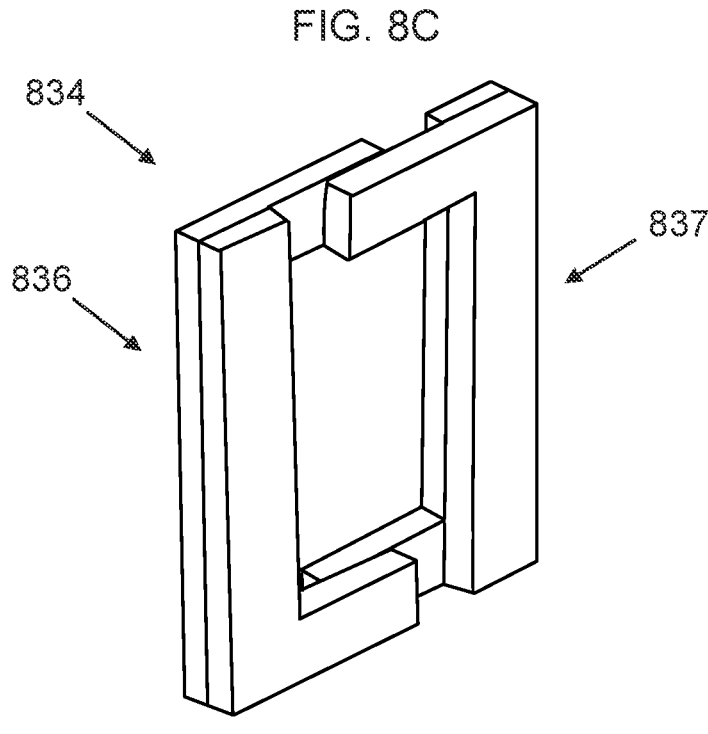

FIG. 8C is a perspective view of first and second sub-plates of a plate assembly in a disconnected configuration, according to an embodiment of the invention.

Figure 9A:
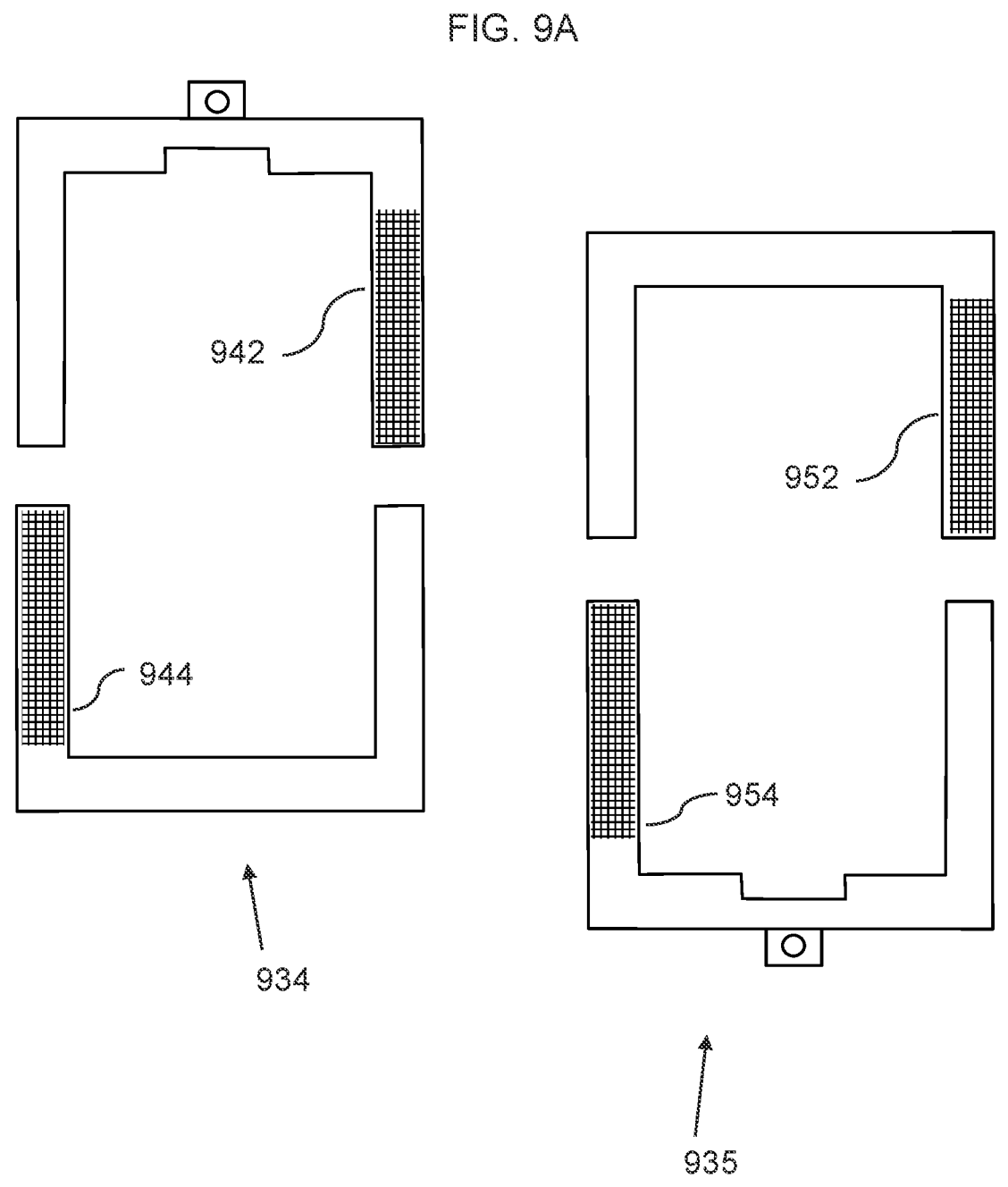

FIG. 9A is a front view of sub-plates of first and second plate assemblies, according to an embodiment of the invention.

Figure 9B:
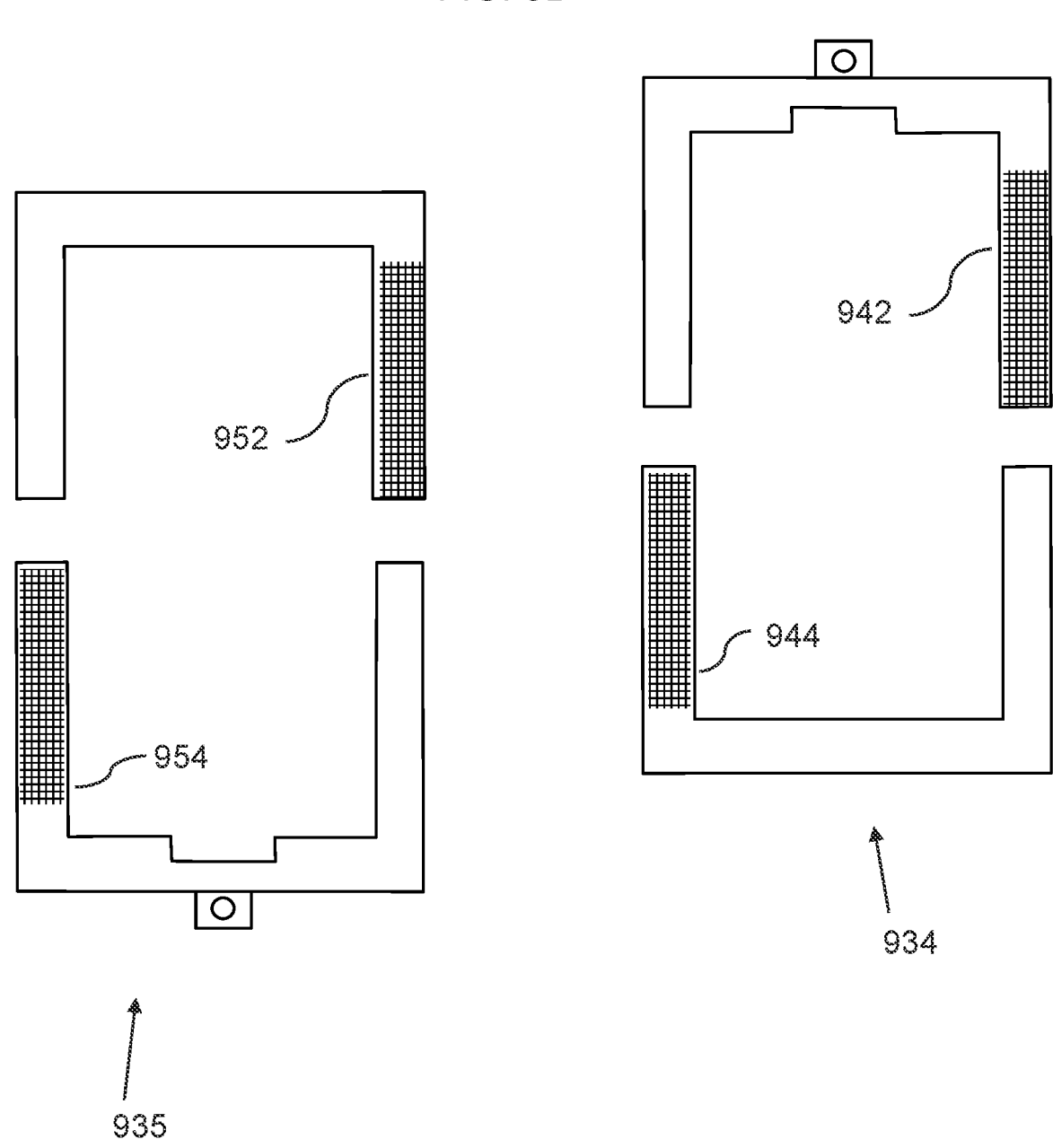

FIG. 9B is a rear view of sub-plates of first and second plate assemblies, according to an embodiment of the invention.

Figure 9C:
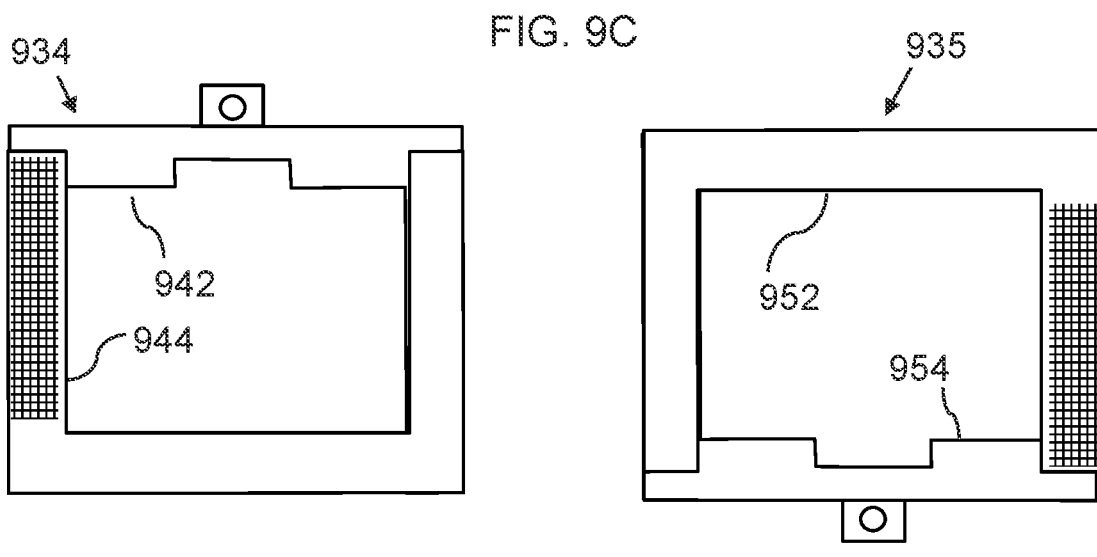

FIG. 9C is a front view of first and second plate assemblies, according to an embodiment of the invention.

Figure 9D:
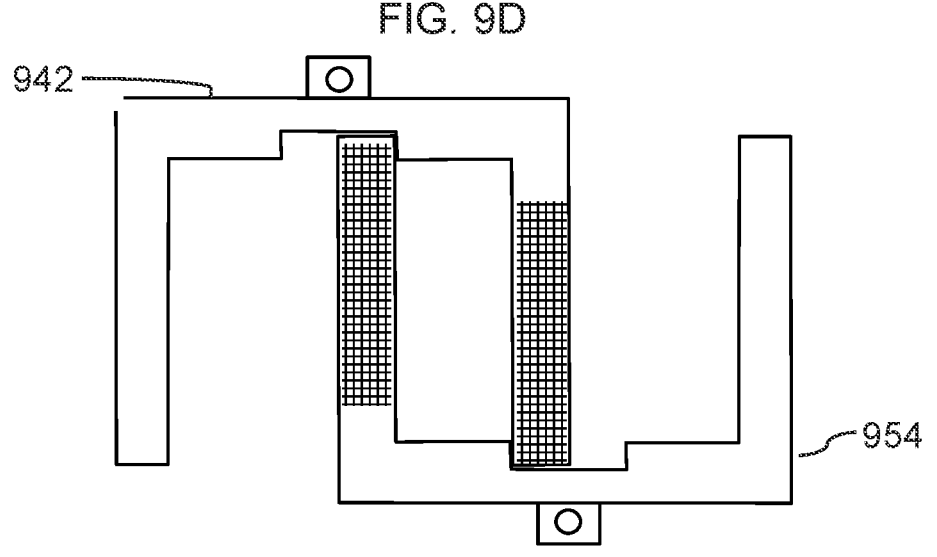

FIG. 9D is a front view of interleaving first and second plate assemblies, according to an embodiment of the invention.

Figure 9E:
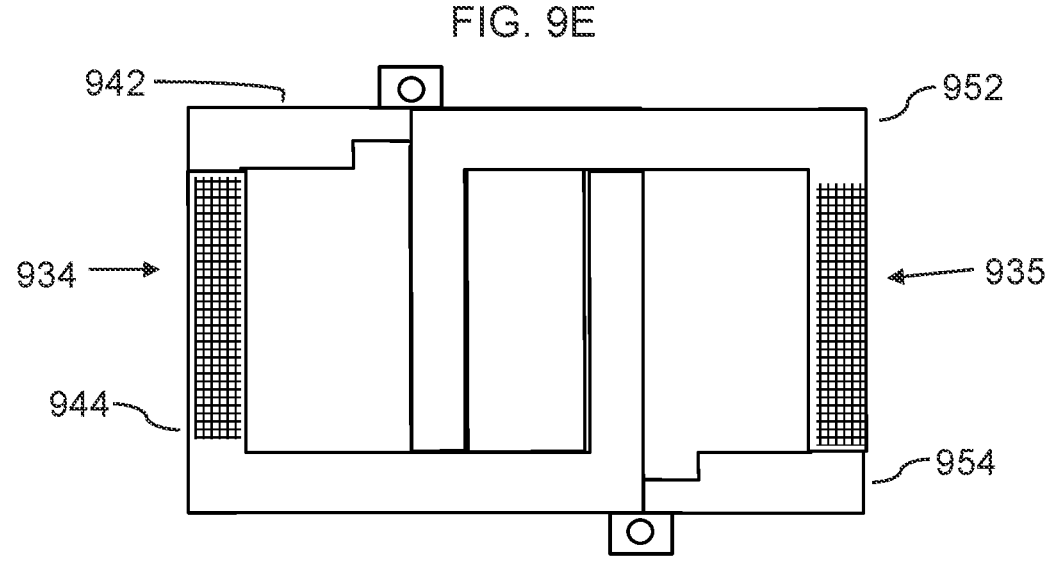

FIG. 9E is a front view of interleaving sub-plates of first and second plate assemblies, according to an embodiment of the invention.

Figures 9F, 9G, 9H, 10:
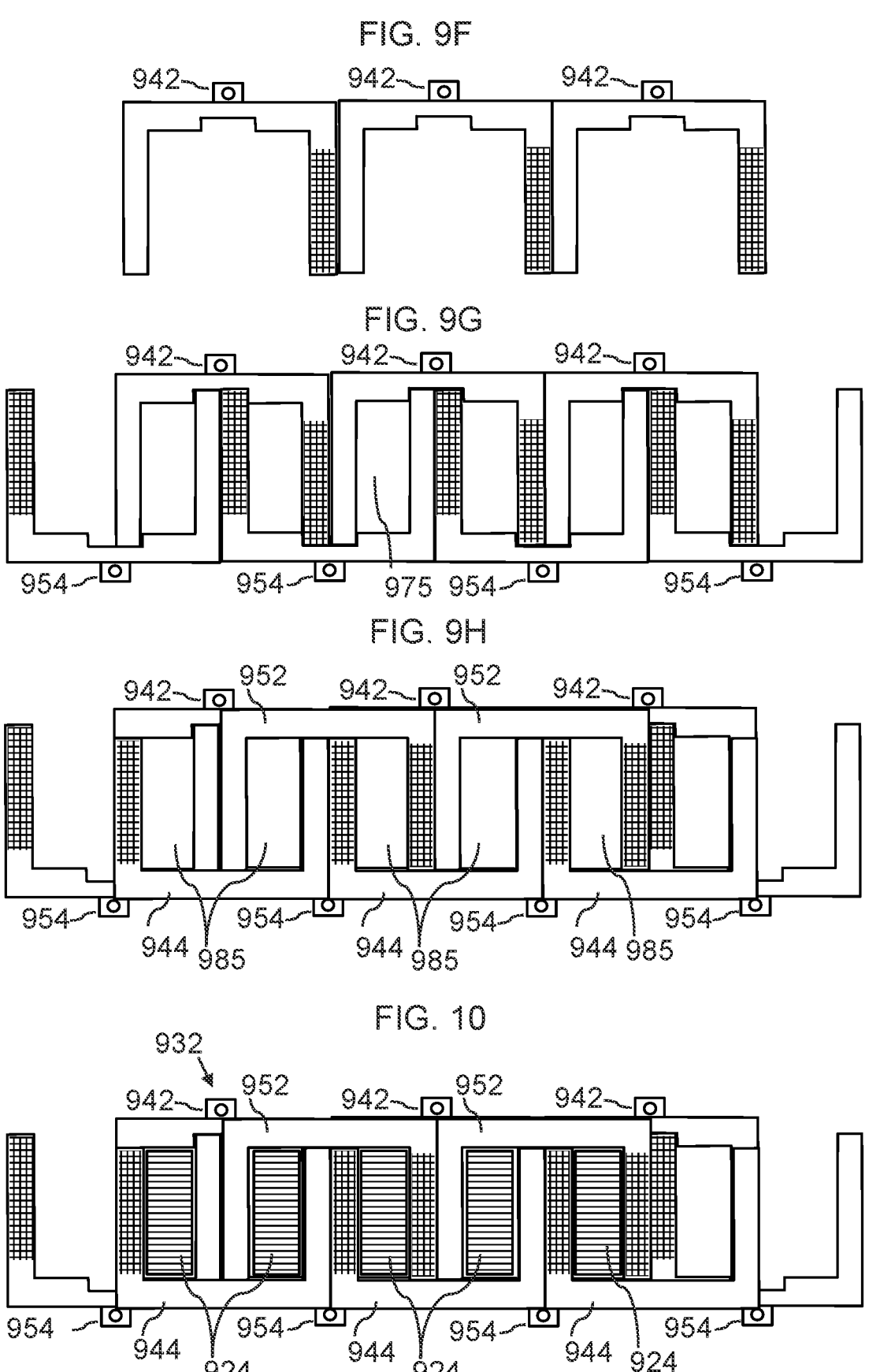

FIG. 9F is a front view of a first step of assembling interleaving first and second plate assemblies, according to an embodiment of the invention.

FIG. 9G is a front view of a second step of assembling interleaving first and second plate assemblies, according to an embodiment of the invention.

FIG. 9H is a front view of a third step of assembling interleaving first and second plate assemblies, according to an embodiment of the invention.

FIG. 10 is a front view of the third step of assembling interleaving first and second plate assemblies showing positioning of stator teeth, according to an embodiment of the invention.

Figure 11:
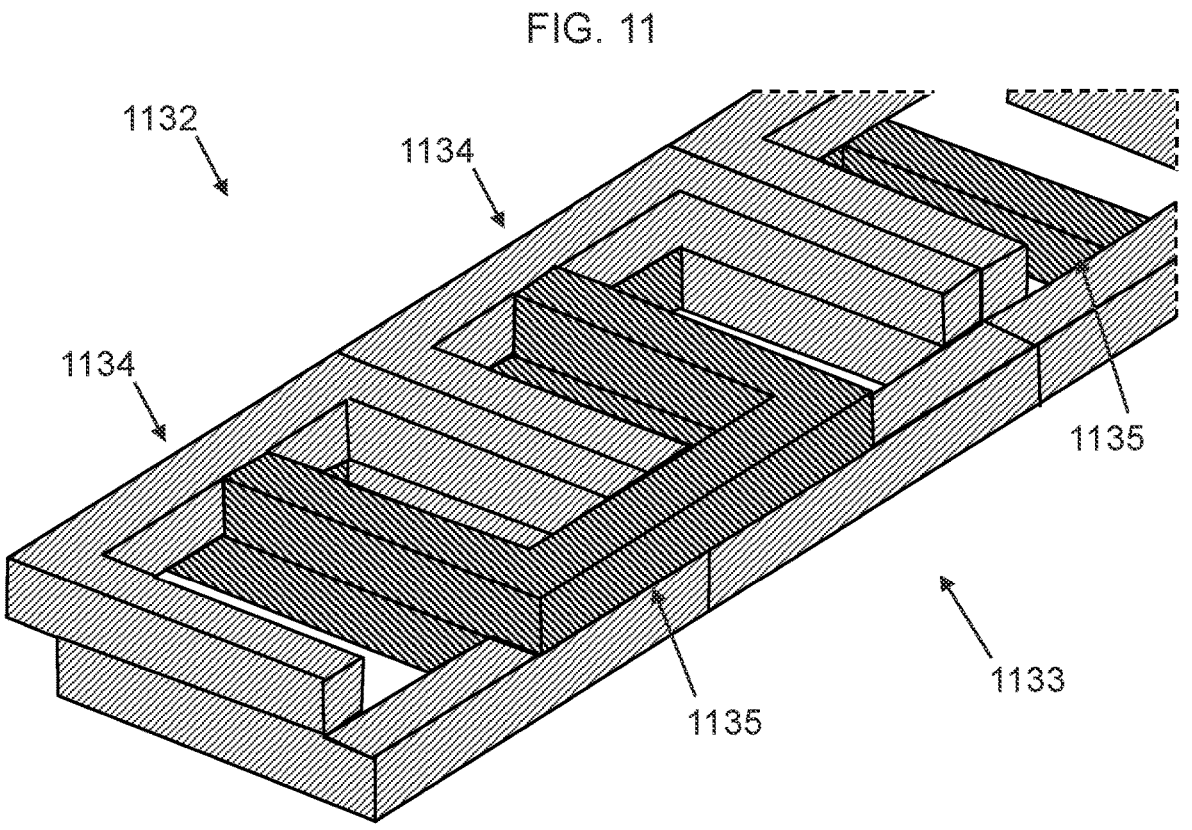

FIG. 11 is a perspective view of interleaving first and second plate assemblies, according to an embodiment of the invention.

Figure 12:
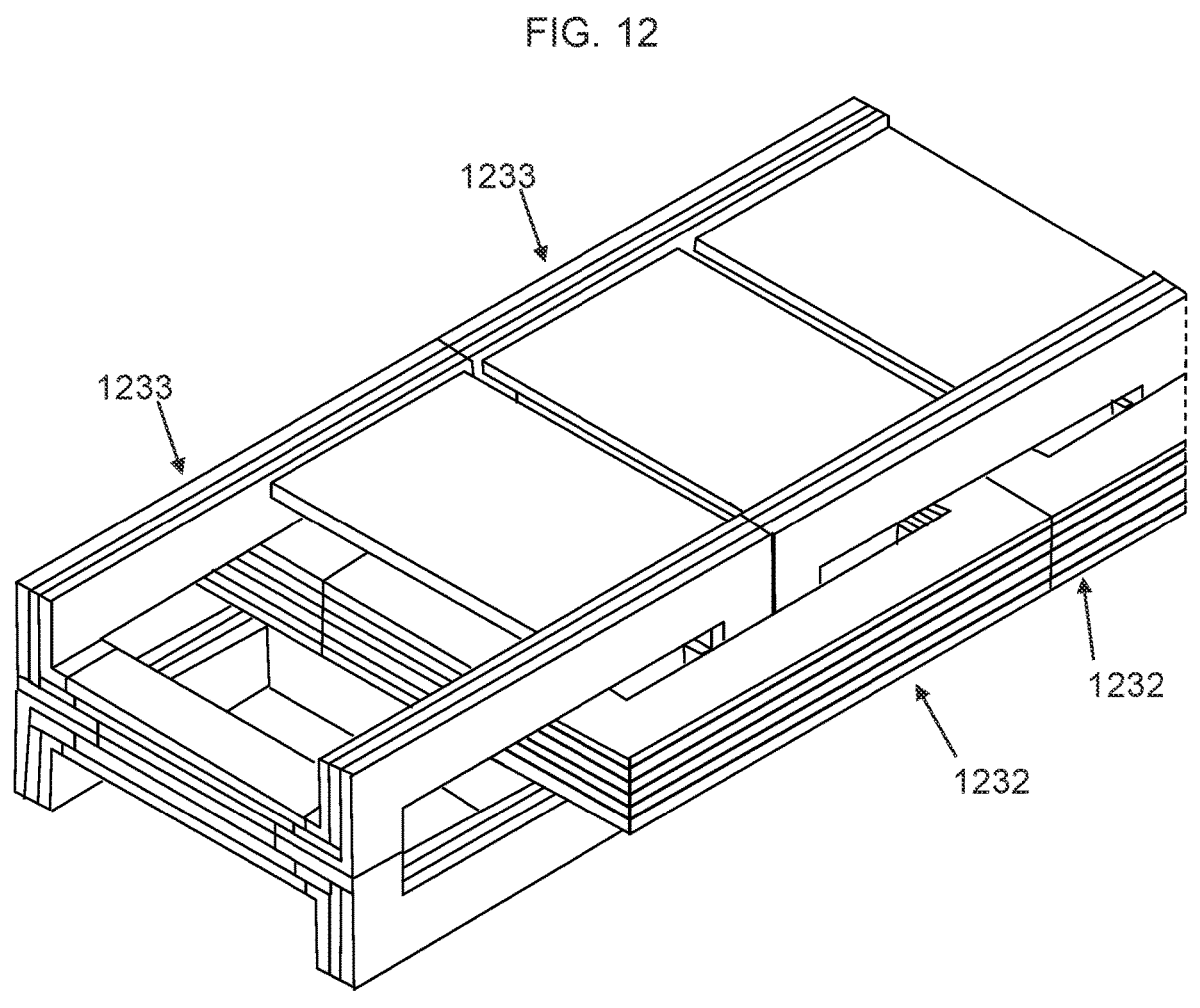

FIG. 12 is a perspective view of interleaving and tilted first and second plate assemblies, according to an embodiment of the invention.

Figure 13A:
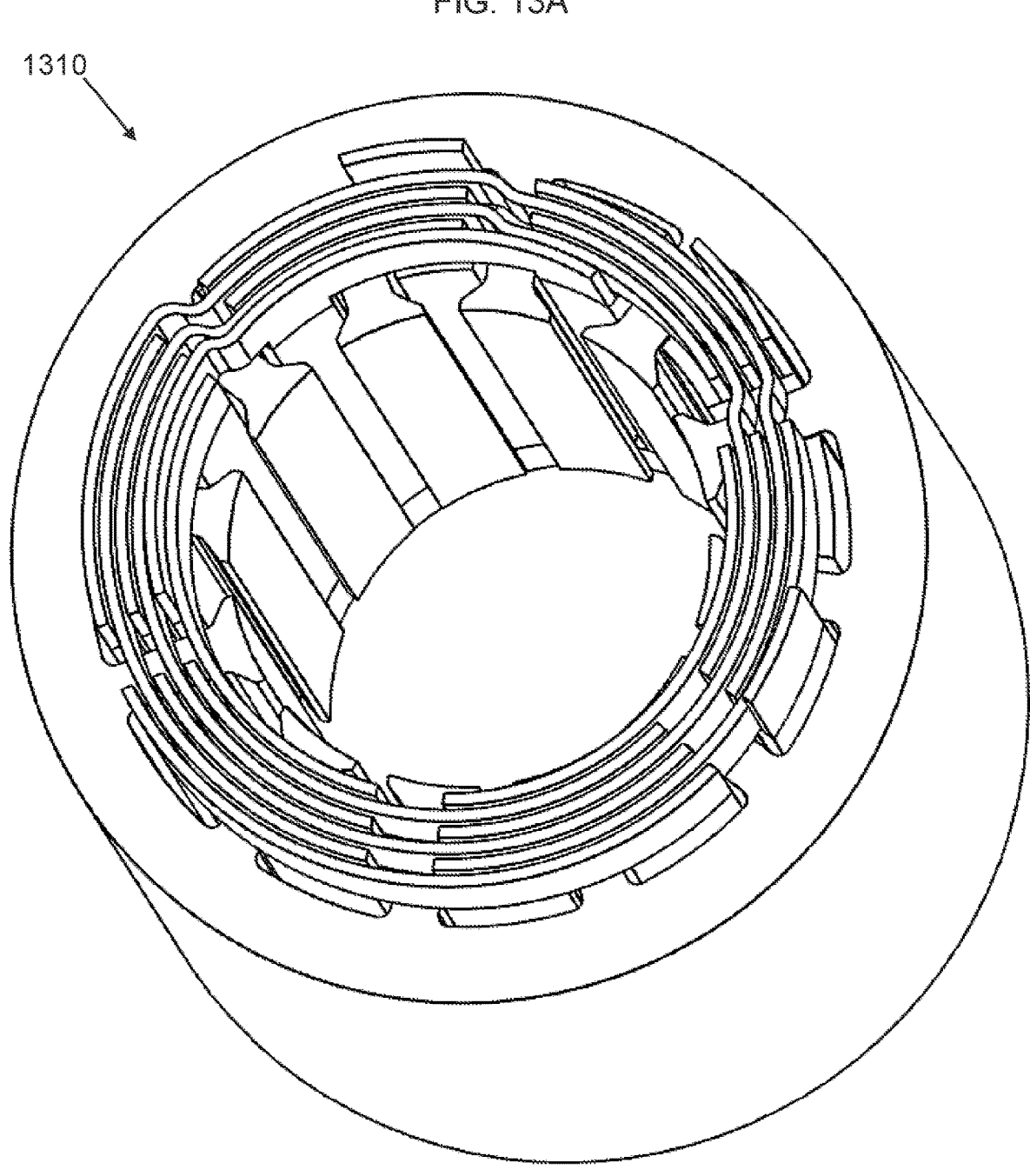

FIG. 13A is a top perspective view of a portion of a stacked plate stator device, according to an embodiment of the invention.

Figure 13B:
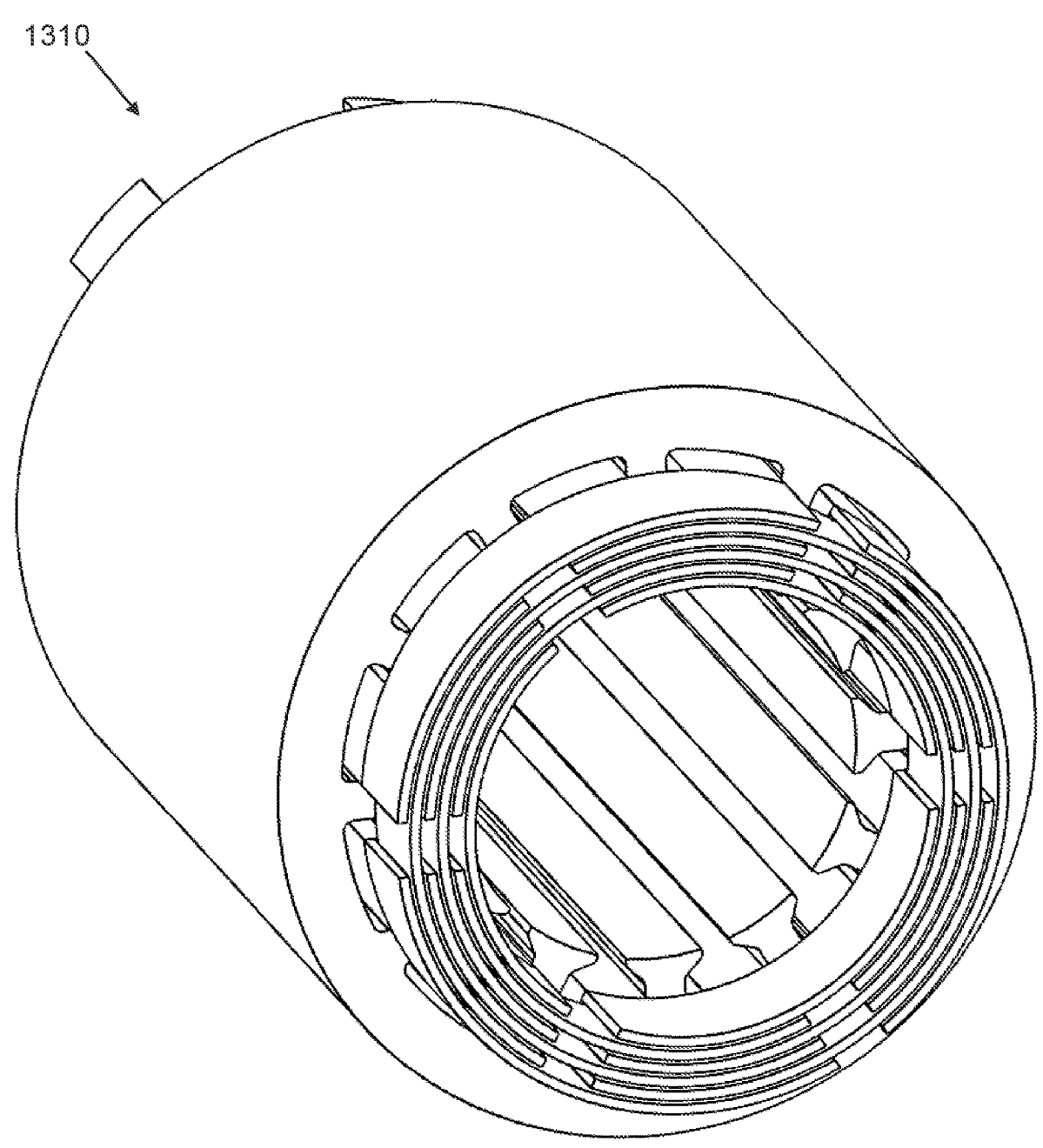

FIG. 13B is a bottom perspective view of a stacked plate stator device, according to an embodiment of the invention.

Figure 13C:

FIG. 13C is an exploded top perspective view of a stacked plate stator device, according to an embodiment of the invention.

Figure 13D:
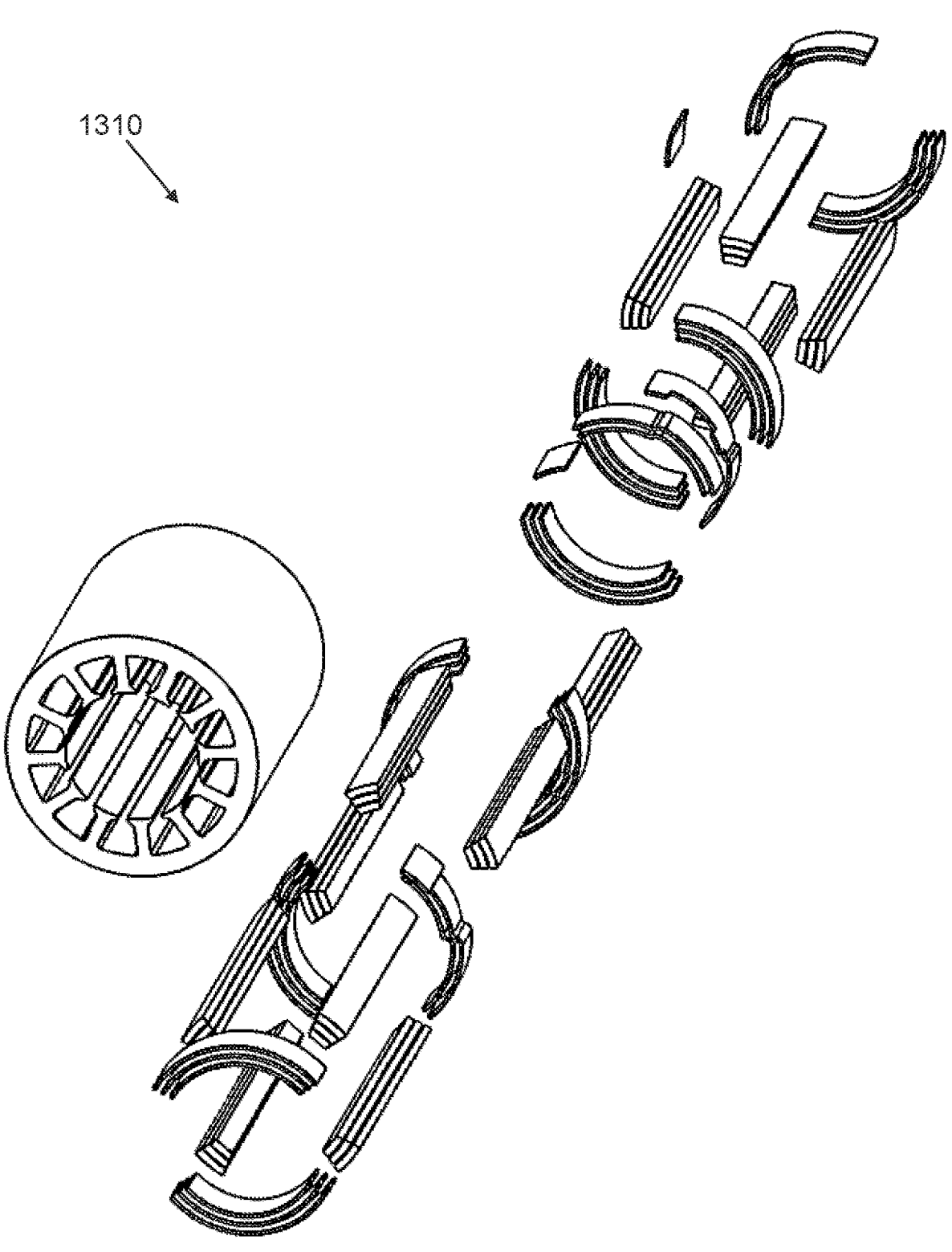

FIG. 13D is an exploded bottom perspective view of a stacked plate stator device, according to an embodiment of the invention.

Figure 14A:
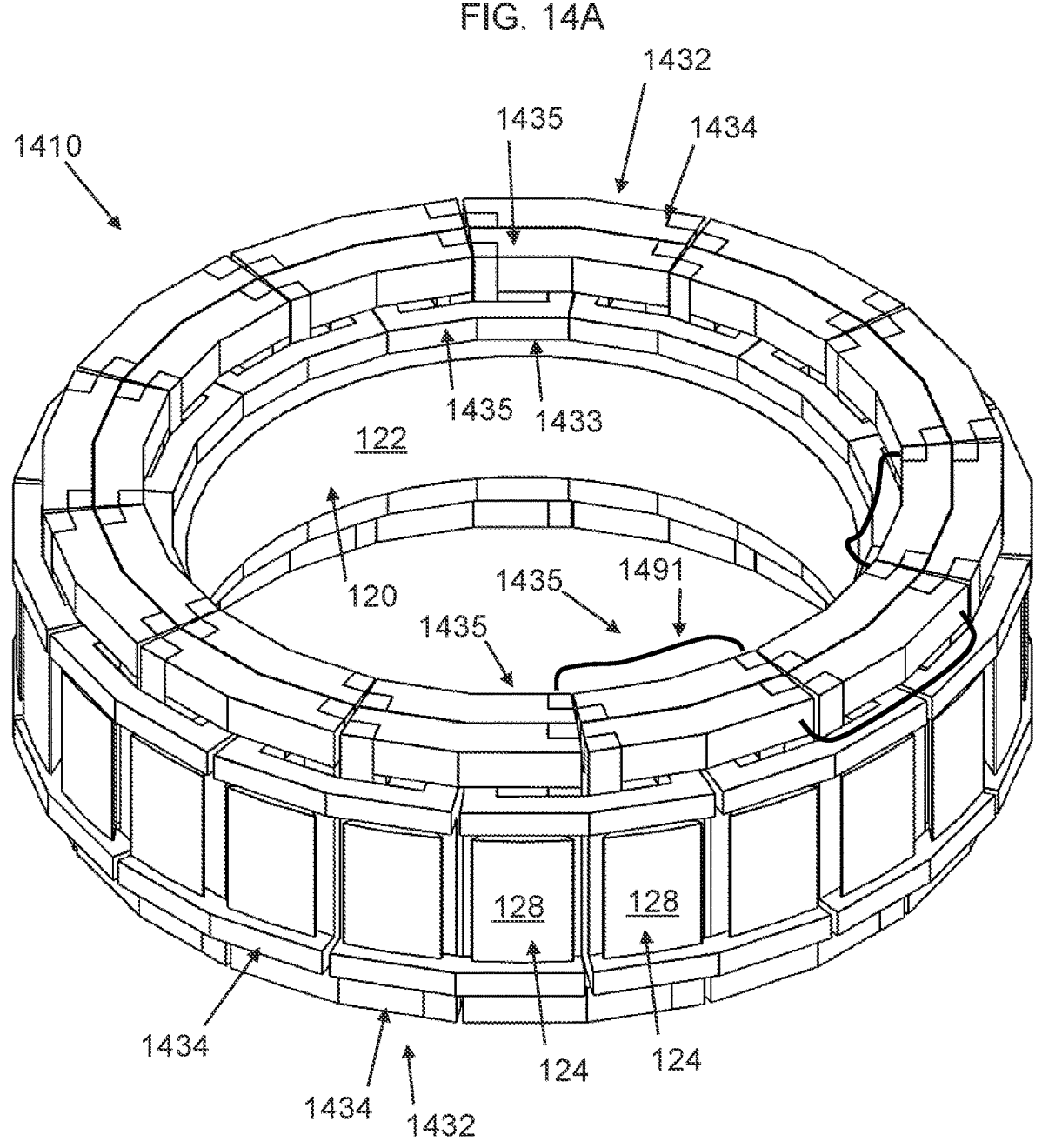

FIG. 14A is a top perspective view of a stacked plate stator device, according to an embodiment of the invention.

Figures 14B, 14C:
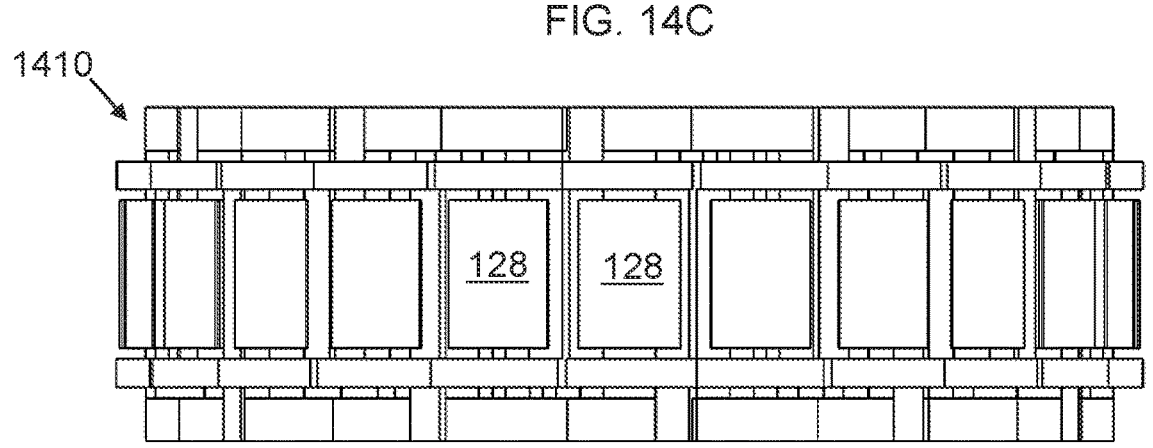

FIG. 14B is a bottom perspective view of a stacked plate stator device, according to an embodiment of the invention.

FIG. 14C is a side view of a stacked plate stator device, according to an embodiment of the invention.

Figures 14D, 14E:
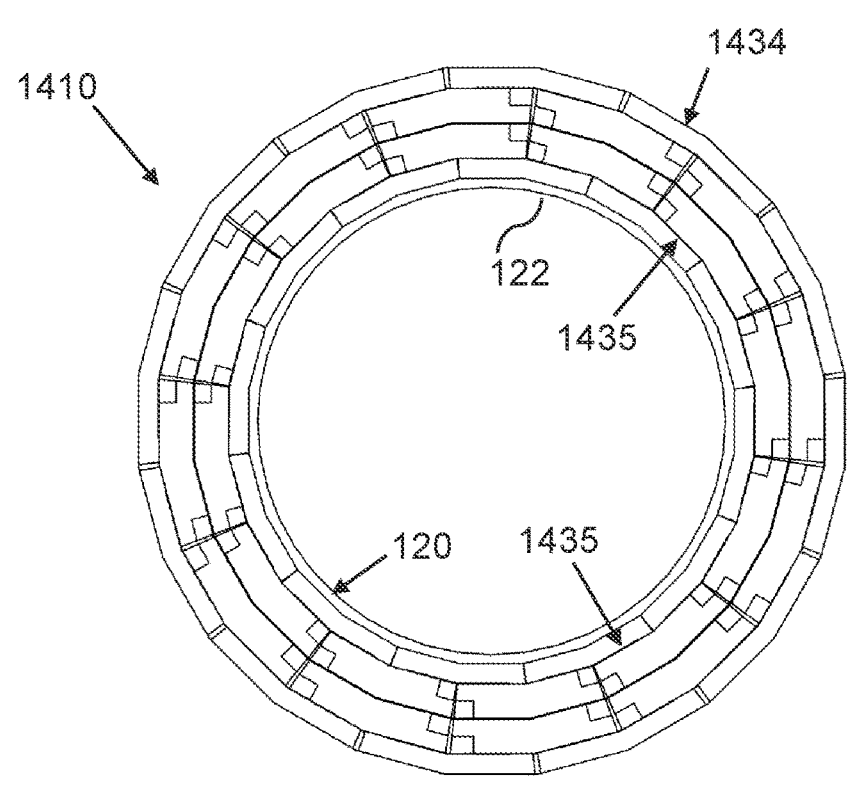

FIG. 14D is a top view of a stacked plate stator device, according to an embodiment of the invention.

FIG. 14E is a bottom view of a stacked plate stator device, according to an embodiment of the invention.

Figure 15A:
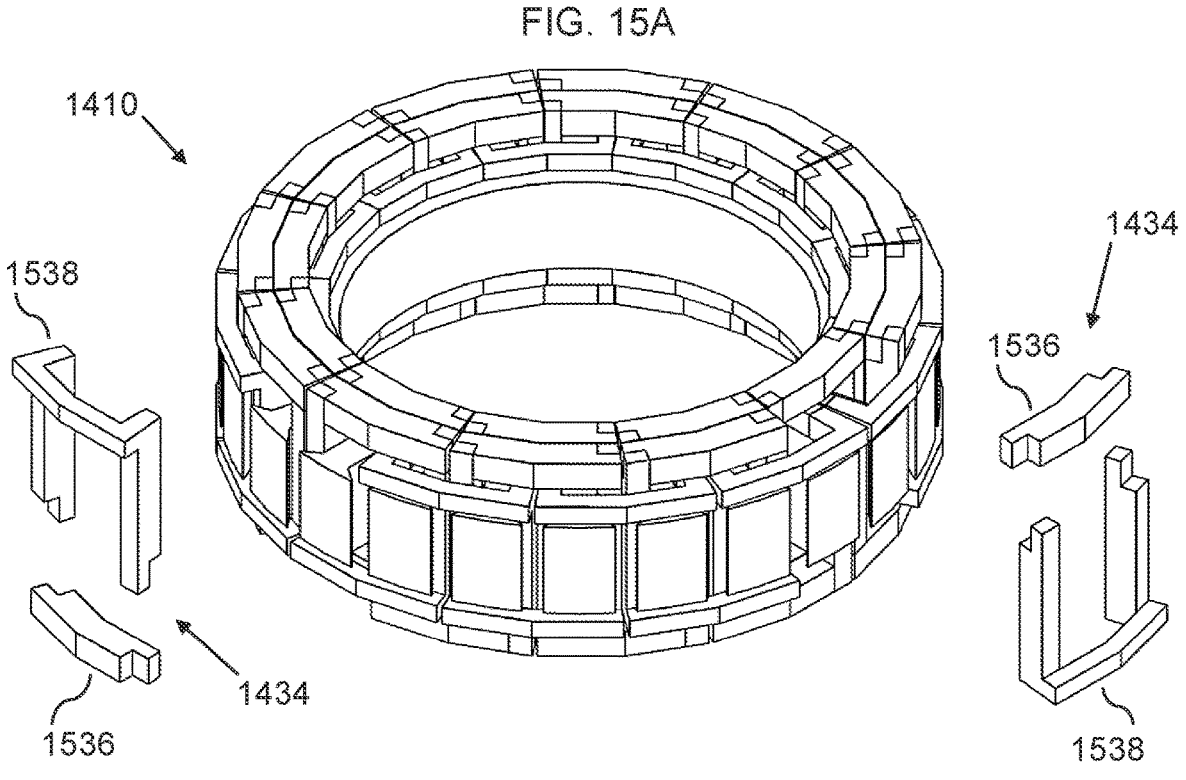

FIG. 15A is a partially exploded top perspective view of a stacked plate stator device, according to an embodiment of the invention.

Figure 15B:
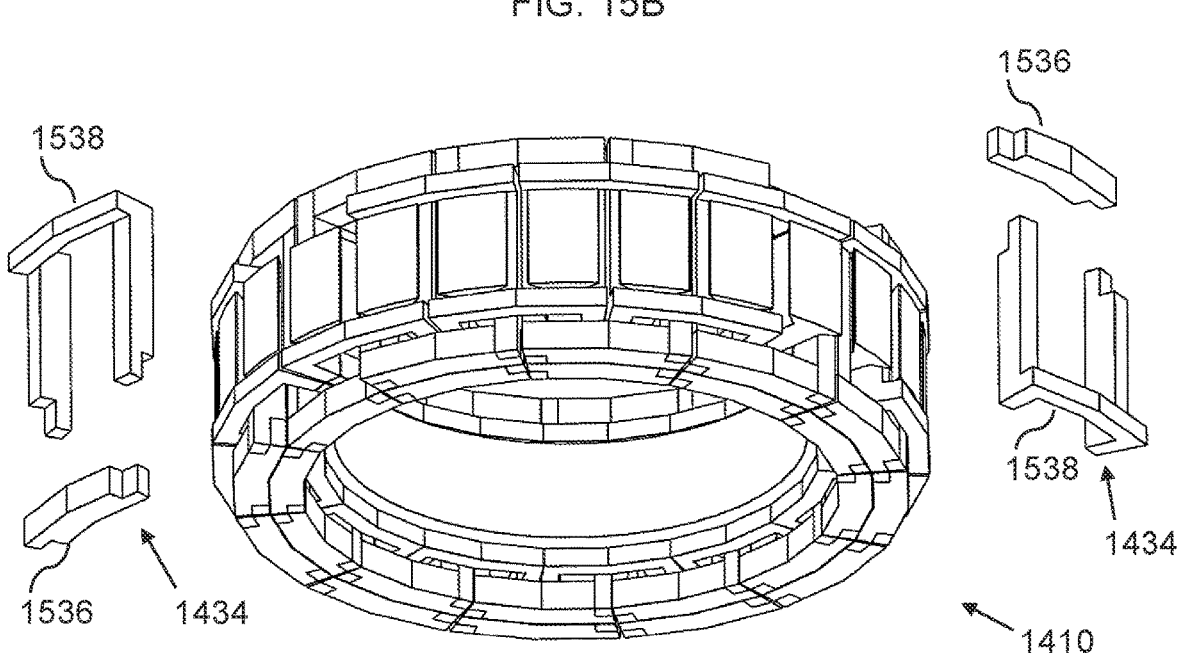

FIG. 15B is a partially exploded bottom perspective view of a stacked plate stator device, according to an embodiment of the invention.

Figures 16A, 16B:
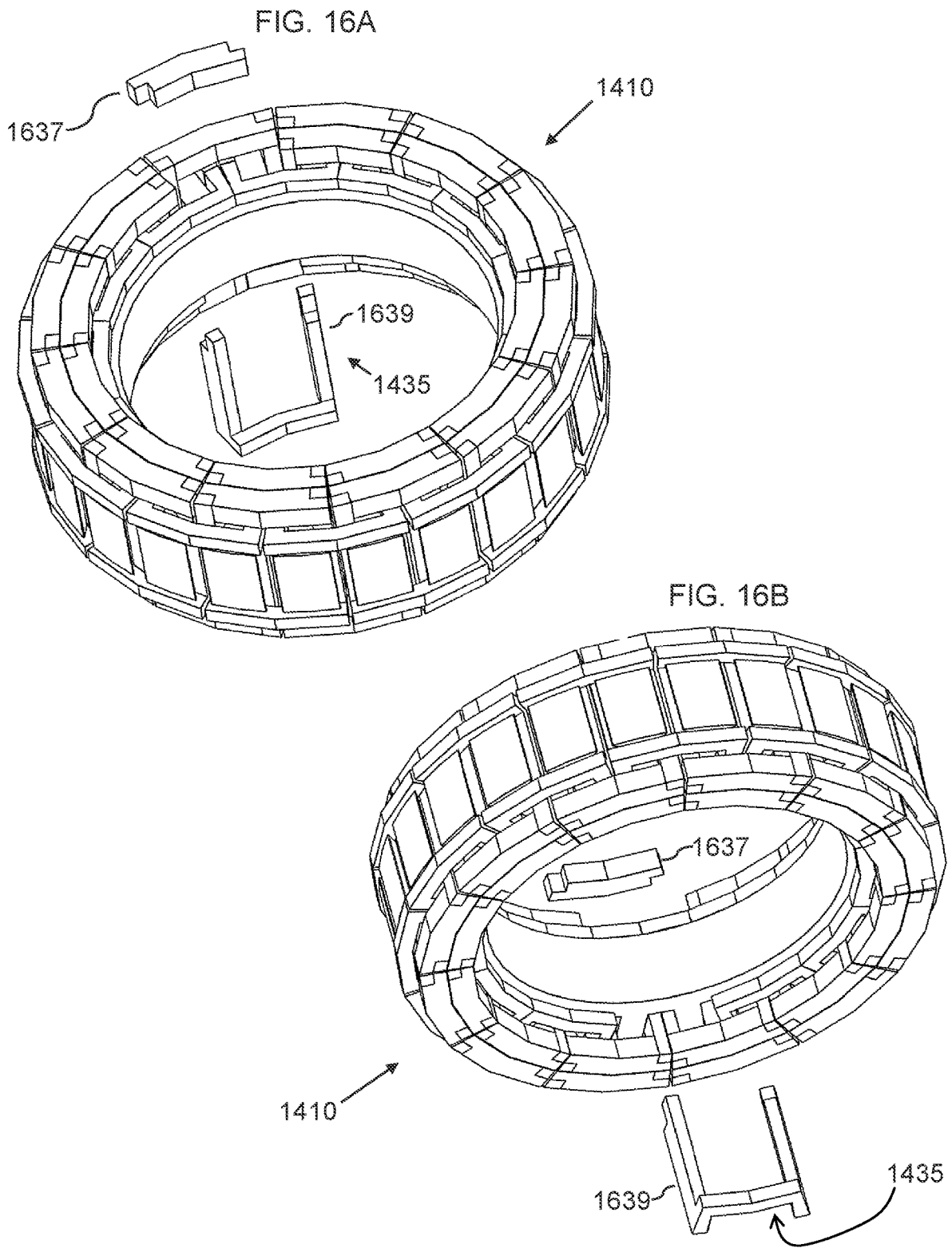

FIG. 16A is a partially exploded top perspective view of a stacked plate stator device, according to an embodiment of the invention.

FIG. 16B is a partially exploded bottom perspective view of a stacked plate stator device, according to an embodiment of the invention.

Figures 17A, 17B:
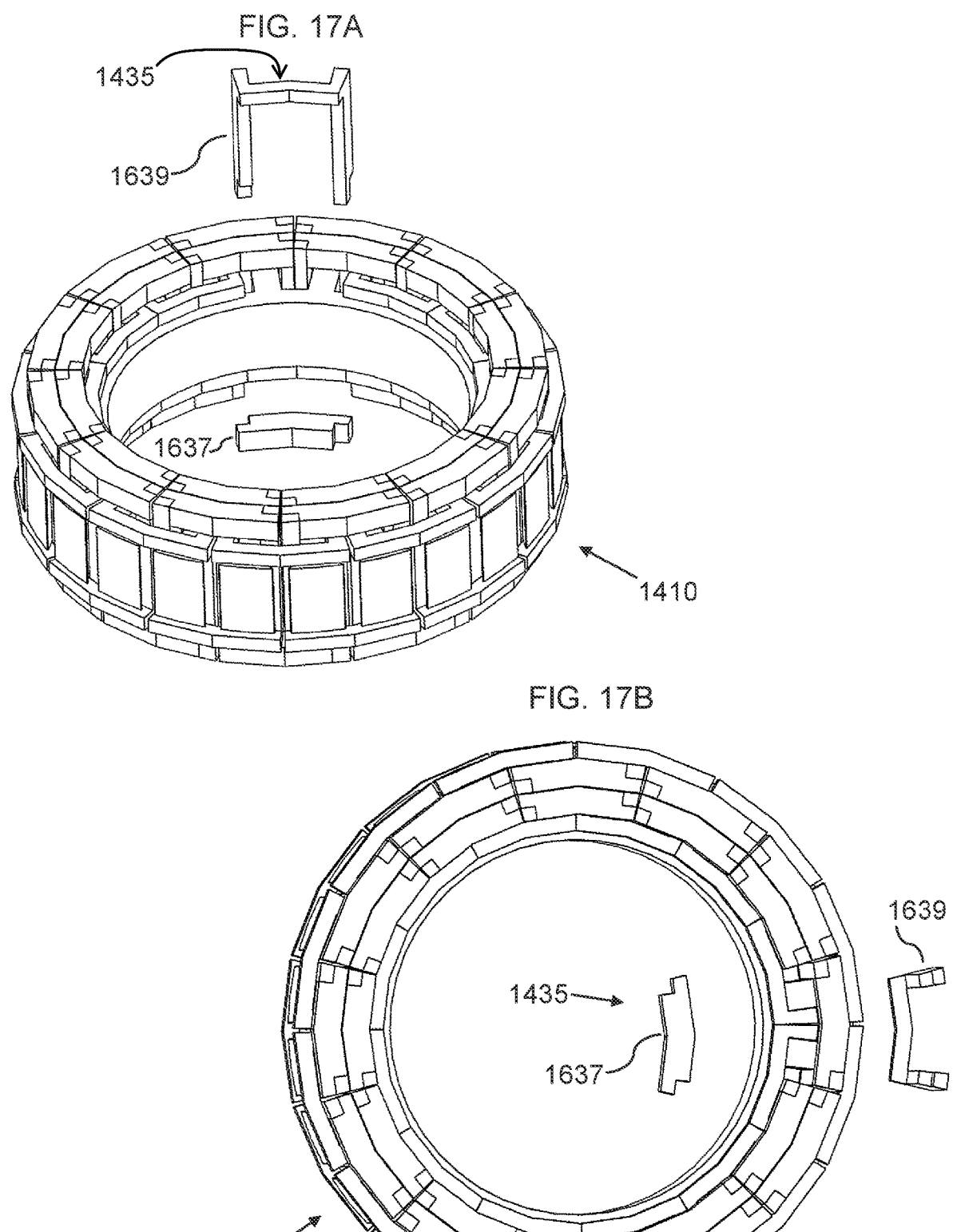

FIG. 17A is a partially exploded top perspective view of a stacked plate stator device, according to an embodiment of the invention.

FIG. 17B is a partially exploded bottom perspective view of a stacked plate stator device, according to an embodiment of the invention.

Figure 18A:
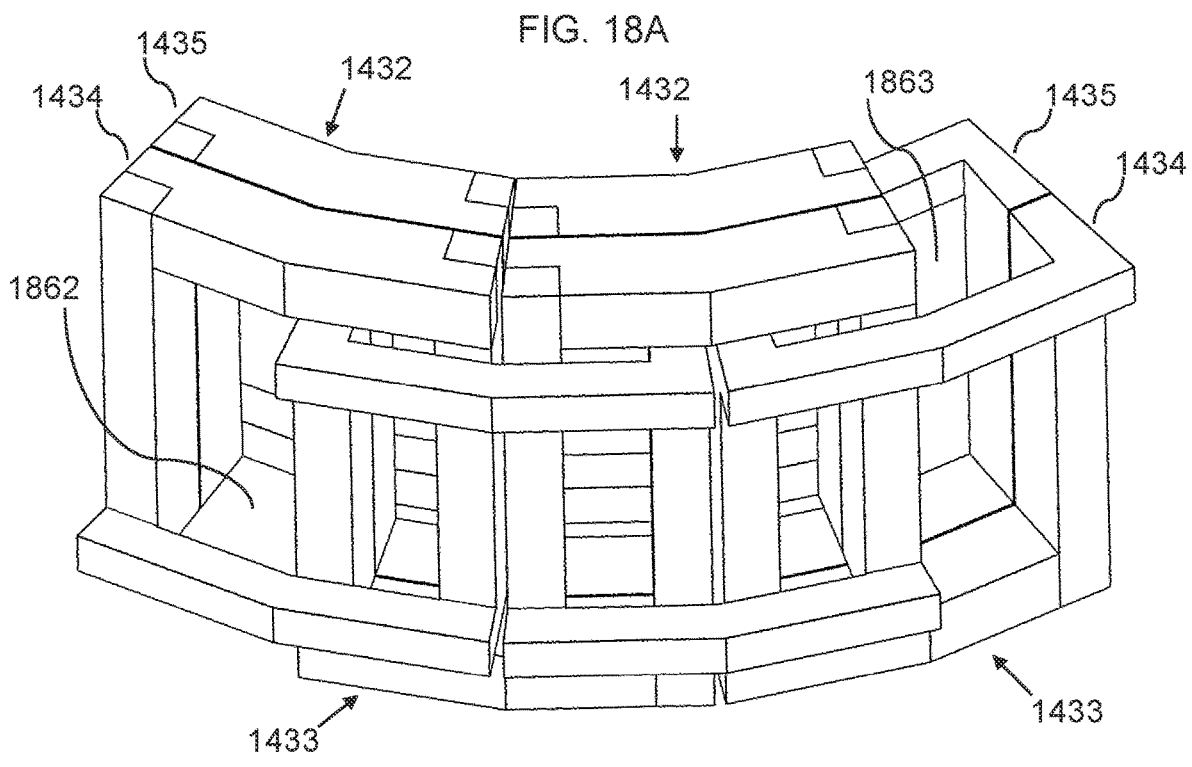

FIG. 18A is a front top perspective view of a portion of a stacked plate stator device, showing two first-phase winding assemblies interleaved with two second-phase winding assemblies, according to an embodiment of the invention.

Figure 18B:
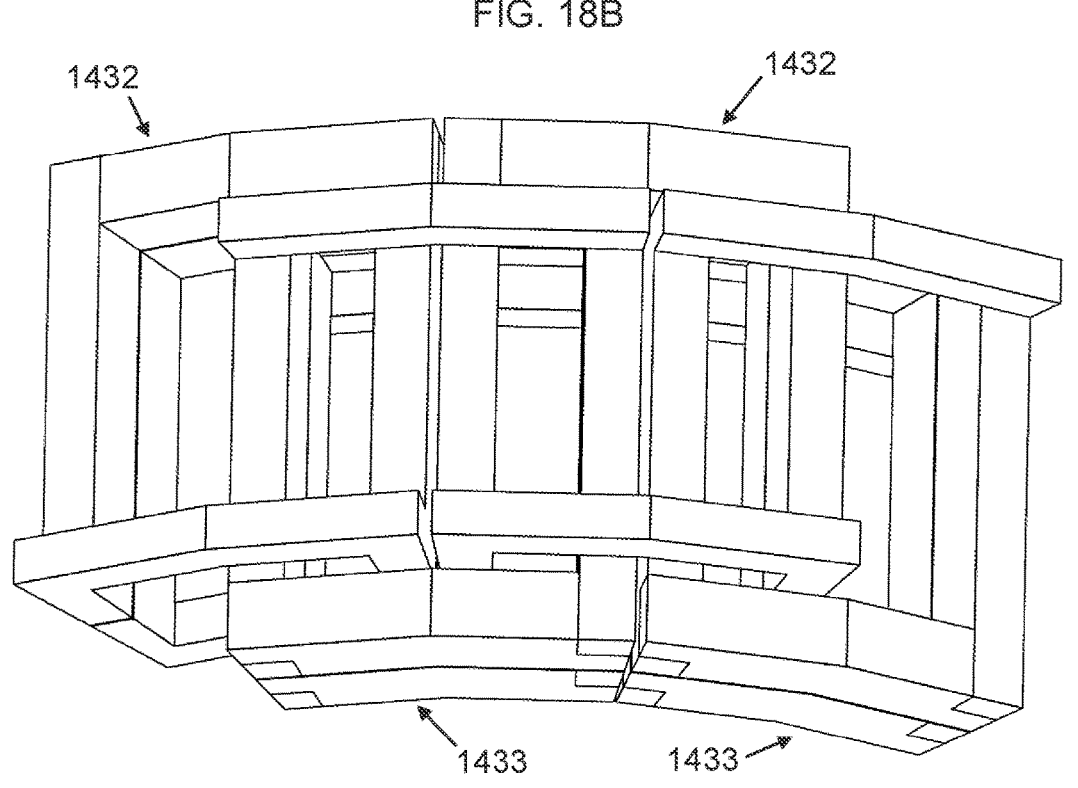

FIG. 18B is a front bottom perspective view of a portion of a stacked plate stator device, showing two first-phase winding assemblies interleaved with two second-phase winding assemblies, according to an embodiment of the invention.

Figure 18C:
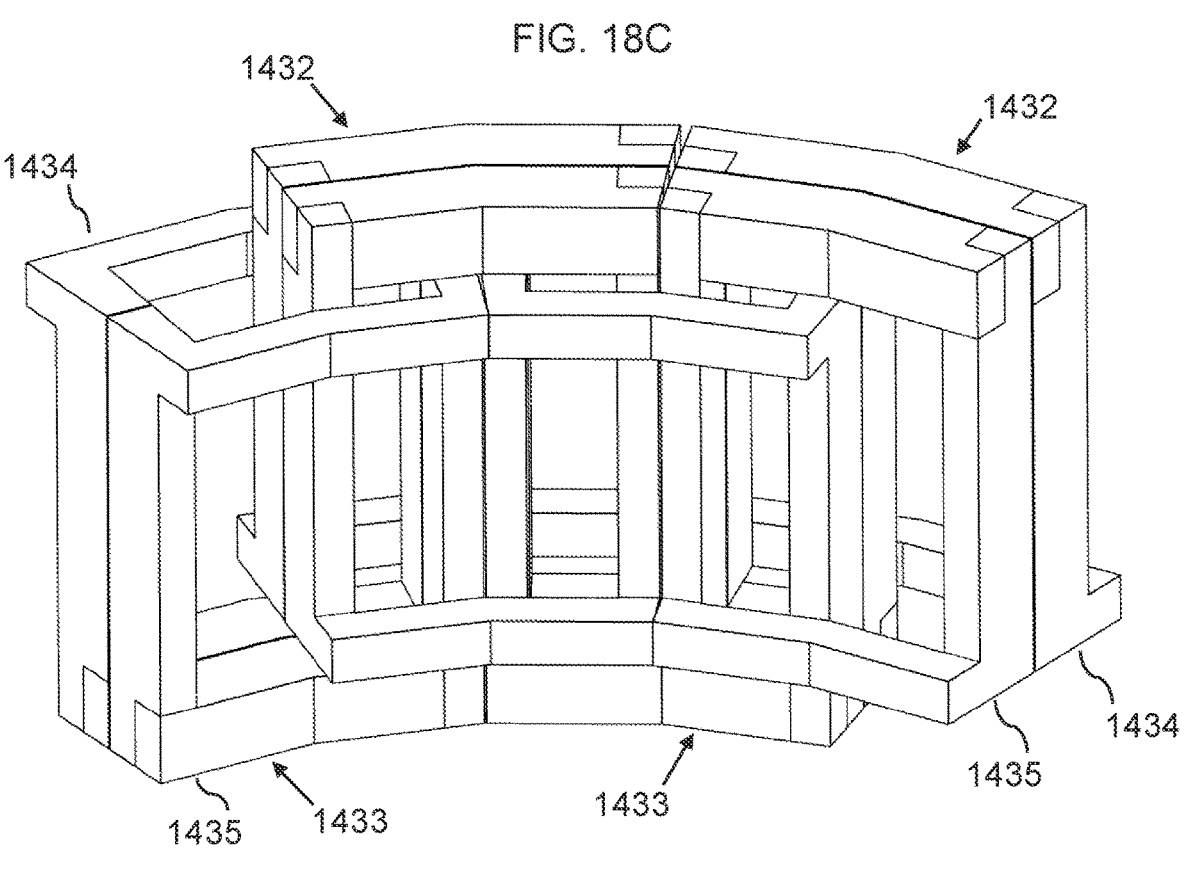

FIG. 18C is a rear top perspective view of a portion of a stacked plate stator device, showing two first-phase winding assemblies interleaved with two second-phase winding assemblies, according to an embodiment of the invention.

Figure 18D:
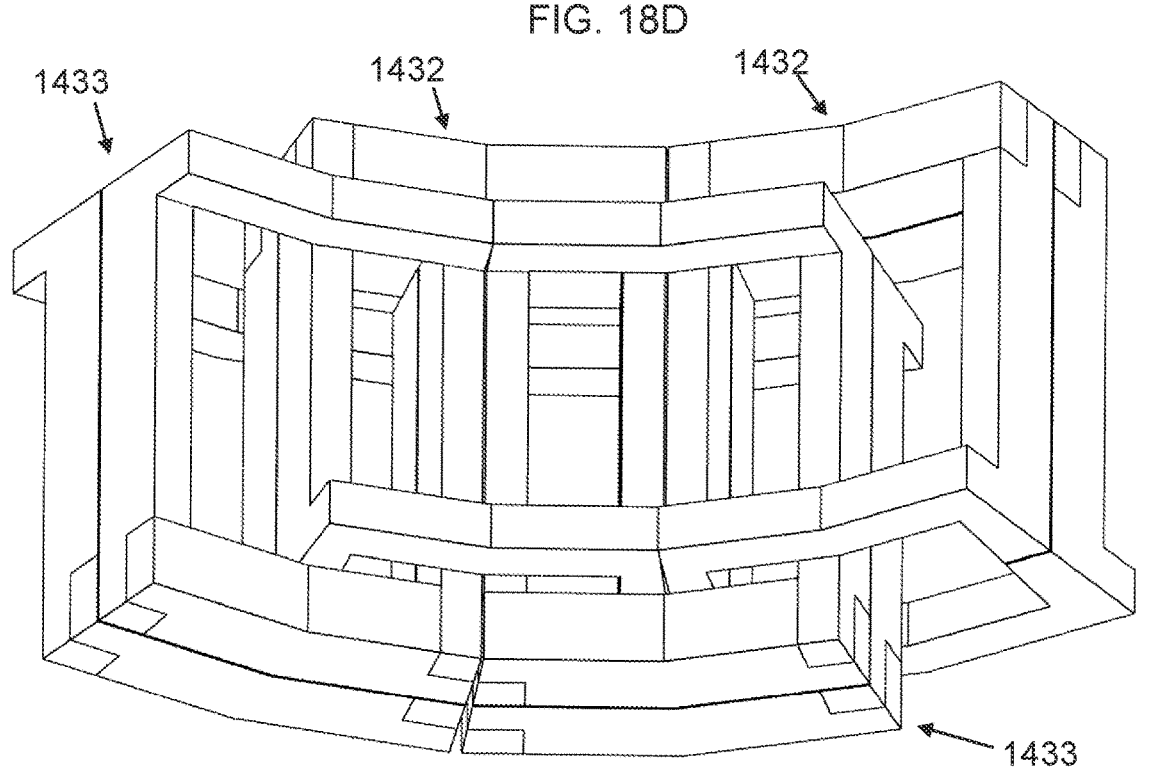

FIG. 18D is a rear bottom perspective view of a portion of a stacked plate stator device, showing two first-phase winding assemblies interleaved with two second-phase winding assemblies, according to an embodiment of the invention.

Figure 19A:
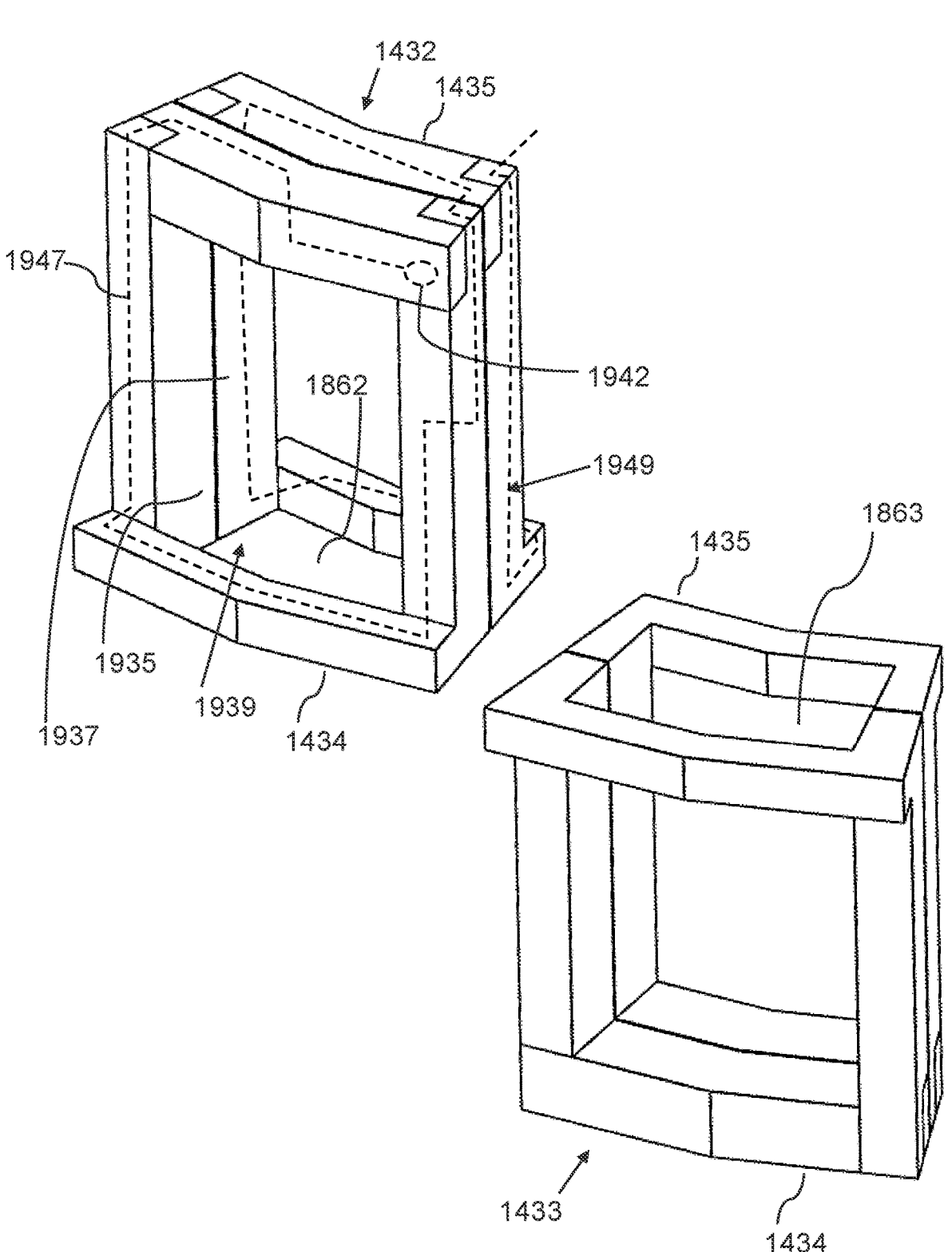

FIG. 19A is a front perspective view of a first-phase winding assembly and a second-phase winding assembly in a separated configuration, according to an embodiment of the invention.

Figure 19B:
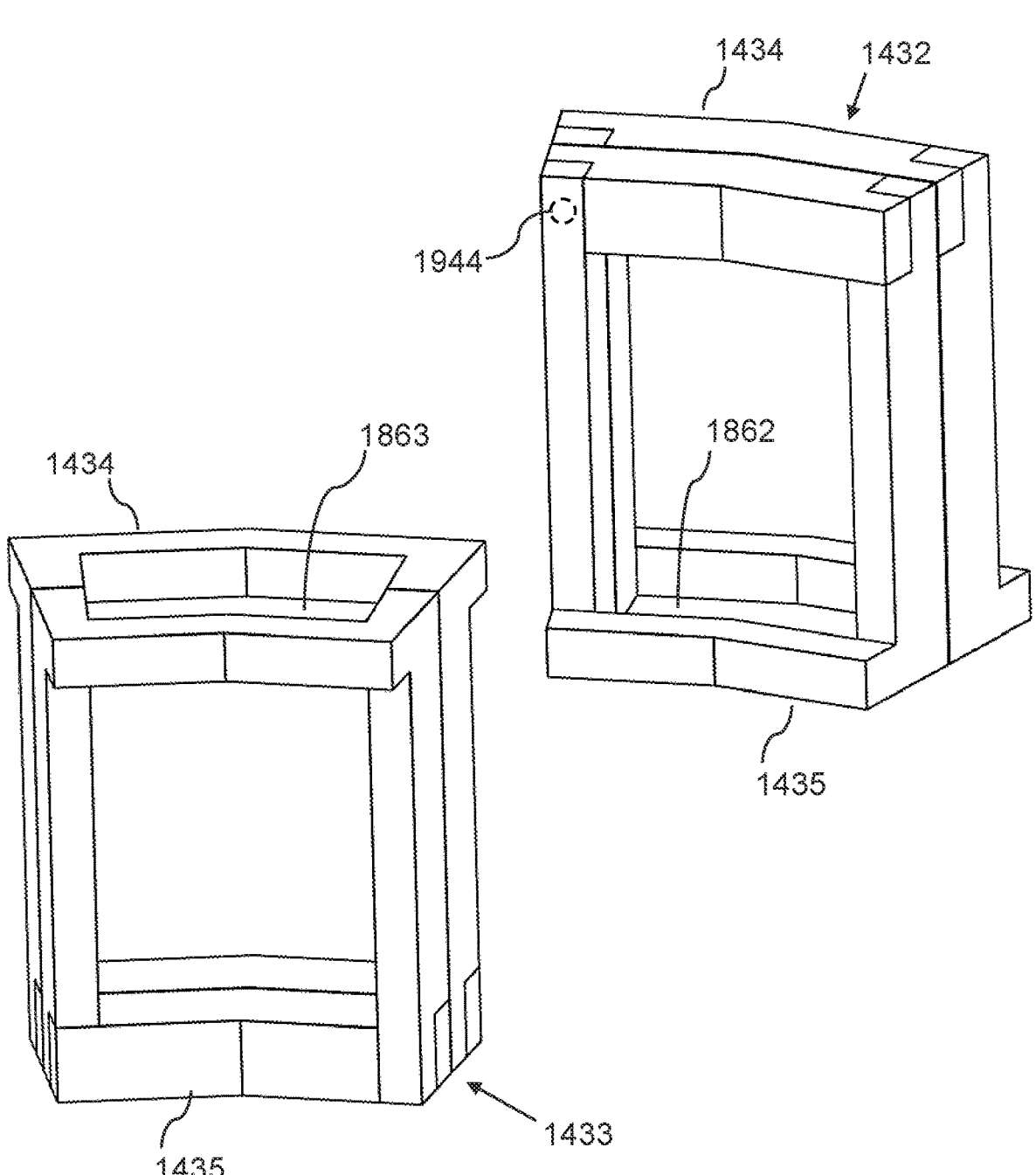

FIG. 19B is a rear perspective view of a first-phase winding assembly and a second-phase winding assembly in a separated configuration, according to an embodiment of the invention.

Figure 19C:
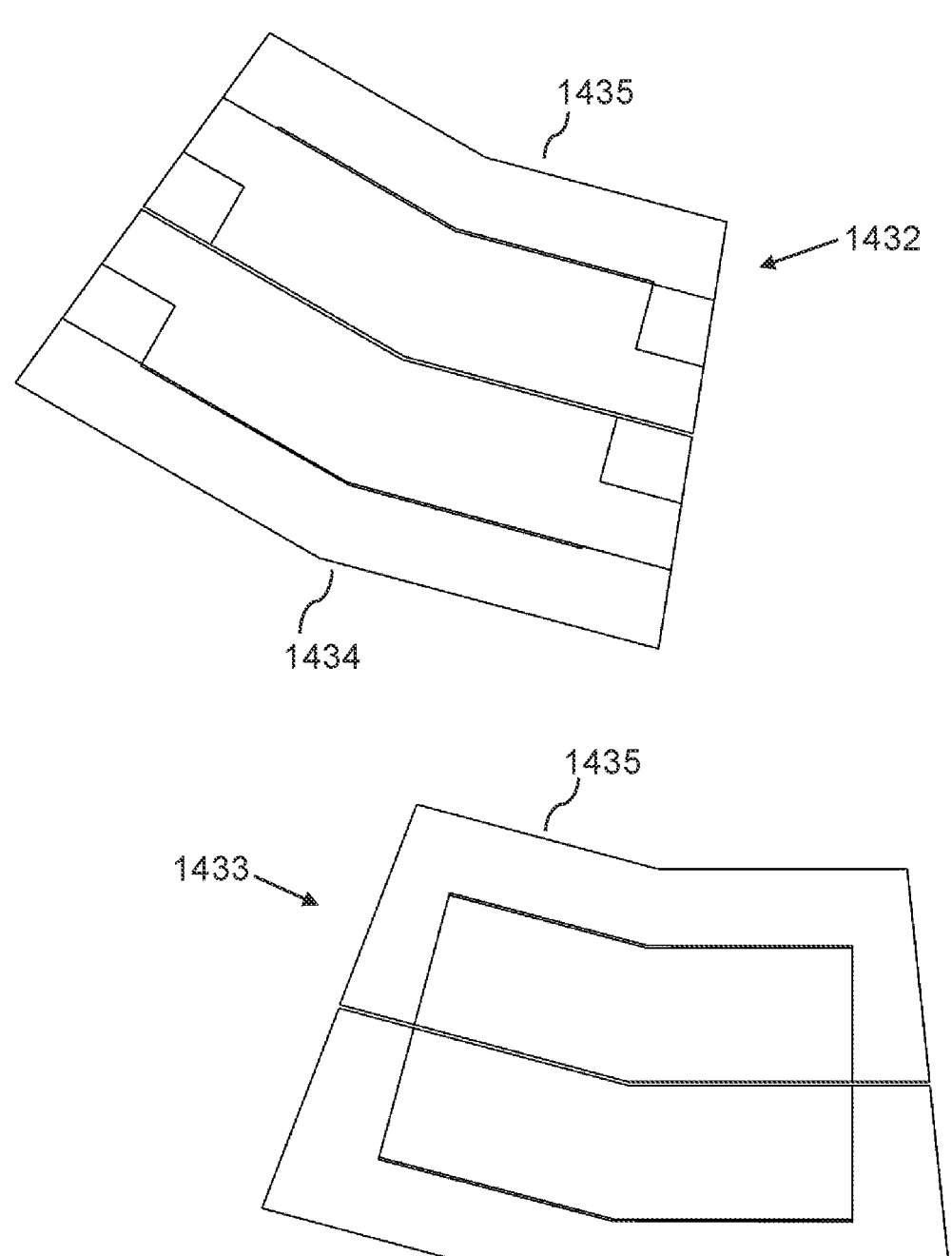

FIG. 19C is a top view of a first-phase winding assembly and a second-phase winding assembly in a separated configuration, according to an embodiment of the invention.

Figures 20A, 20B:
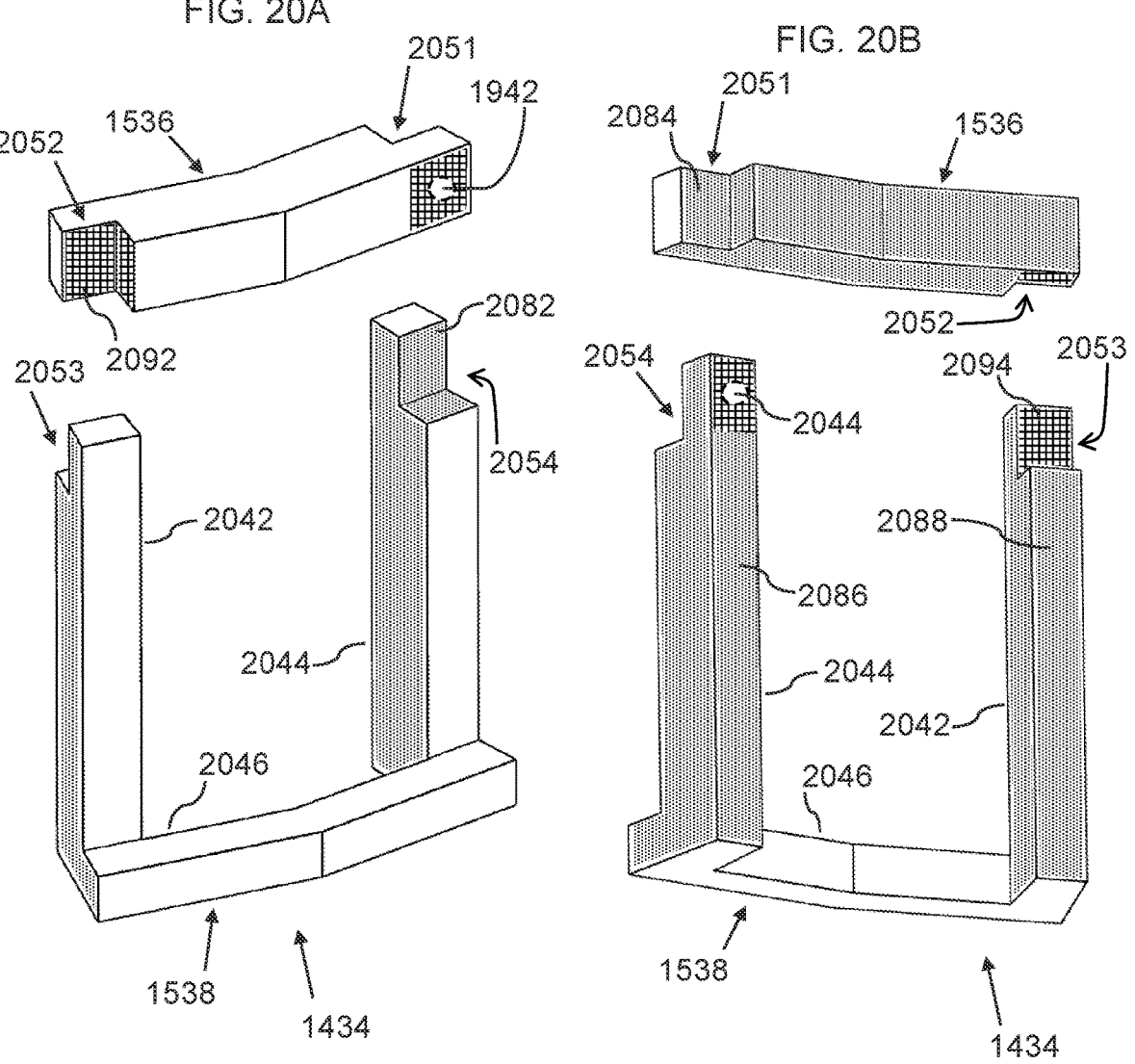

FIG. 20A is an exploded top left front perspective view of a plate assembly of a stacked plate stator device, according to an embodiment of the invention.

FIG. 20B is an exploded bottom right rear perspective view of a plate assembly of a stacked plate stator device, according to an embodiment of the invention.

FIG. 21A is an exploded top front perspective view of a plate assembly of a stacked plate stator device, according to an embodiment of the invention.

FIG. 21B is an exploded bottom rear perspective view of a plate assembly of a stacked plate stator device, according to an embodiment of the invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a stacked plate stator device 110 with reference to FIG. 1A, in such manner that like reference numerals refer to like components throughout; a convention that we shall employ for the remainder of this specification.

In an embodiment, as shown in FIGS. 1A-1F and 6A-6B, a stacked plate electrical device 600, which for example can be an electrical engine or an electrical generator, can include:
   a) a device housing 712;
   b) stacked plate stator device 110, which is configured to be stationary relative to the device housing 712, wherein the stacked plate stator device 110 can include:
      i. a plurality of winding assemblies 132, which can each include:
         1) a plurality of stacked plate assemblies 134, each including a first sub-plate 336 and a second sub-plate 338; and c) an electrical rotor 620, which can include:

i. a circular magnet portion 624, comprising a plurality of magnets (not shown);

ii. a circular support portion 622, which is connected to the circular magnet portion 624;

wherein the electrical rotor 620 is configured to be rotatable 630 relative to the stacked plate stator device 110;

wherein the stacked plate stator device is configured to cause a rotation 630 of the electrical rotor 620, when at least one electrical current is passed through the stacked plate stator device 110; and wherein the stacked plate stator device is configured such that a rotation 630 of the electrical rotor 620, induces at least one electrical current of the stacked plate stator device 110.

In a related embodiment, as shown in FIGS. 1A-1F, 2A-2C, 3A-3C, and 6A-6B, a stacked plate stator device 110, can include:

a) a stator body 120 (also called a stator core), which can be made from a metal alloy with high relative magnetic permeability, such as laminated silicon steel, wherein the stator body 120 can include:

i. a stator support member 122 (also called a stator yoke or back iron), which can be ring-shaped with a central aperture; and ii. at least one stator tooth 124, or a plurality of stator teeth 124, which can each include:

1) a tooth body 126; and 2) a tooth head 128, which is connected to an outer end of the tooth body 126, wherein the tooth head 128 can be laterally wider than the tooth body 126;

such that each stator tooth 124 protrudes radially from the stator support member 122 (either protruding inward, or protruding outward as shown; depending on configuration of the electrical rotor 620); and such that stator slots 129 (or gaps) are formed between consecutive stator teeth 124 in the plurality of stator teeth 124;

b) at least one winding assembly 132, or a plurality 130 of winding assemblies 132, which can each include:

i. at least one plate assembly 134, or a plurality of stacked plate assemblies 134, which can each include:

1) a first sub-plate 336;

2) a second sub-plate 338, such that a second end of the first sub-plate 336 is mechanically and electrically connected to a first end of the second sub-plate 338;

such that each plate assembly 134 forms an interior passageway 335, such that the plurality of stacked plate assemblies form a combined passageway 337 of the at least one winding assembly 132;

such that a second end of the second sub-plate 338 is electrically insulated from a first end of the first sub-plate 336;

wherein the second end of the second sub-plate is adjacent to the first end of the first sub-plate, such that the plate assembly 134 forms a 360-degree turn 537 around the interior passageway 335 (as schematically shown in FIG. 5A);

such that the tooth body 126 of the at least one stator tooth 124 protrudes through the combined passageway 437 of the at least one winding assembly 132;

such that each successive plate assembly 134 is stacked upon a prior plate assembly 134;

such that each successive plate assembly 134 is electrically connected with an immediately preceding plate assembly 134, such that a front conductive entry portion 342 of each successive plate assembly 134 is electrically connected with a rear conductive exit portion 344 of the immediately preceding plate assembly 134, such that the at least one winding assembly 132 forms a spiraling continuous path of conductivity 535 (as schematically shown in FIG. 5A), which spirals around the tooth body 126 of the at least one stator tooth 124.

In various related embodiment, the plurality 130 of winding assemblies 132 can be connected 192, 194 (only some connections shown in FIG. 1A) to generate one phase of power, or several phases of power can be generated with a suitable rotor configuration and corresponding configuration of wiring connectivity of winding assemblies 132.

In related embodiments, the stator body 120 can be electrically isolated from the plurality of winding assemblies 132. The stator body 120 can for example be coated with an electrical insulator, to ensure electrical isolation in addition to insulation coating of winding assemblies 132.

In related embodiments, the plate assemblies 334, including the first and second sub-plates 336, 336 can be made from a non-ferro-magnetic material with high electrical conductivity, such as copper. The first and second sub-plates 336, 336 can for example be cut from a copper sheet or copper plate, using a plasma cutter or water jet cutter, or other suitable cutting methods.

In a related embodiment, each plate assembly 134 can be partially coated with an electrical insulator 480, such that each corresponding stator winding assembly 132 is completely electrically insulated from the stator body 120 and such that each corresponding plate assembly 134 is almost entirely electrically insulated from adjacent plate assemblies 134 in each corresponding stator winding assembly 132, except for the front uninsulated portion (i.e. the front conductive entry portion 342) of the corresponding plate assembly 134 electrically connecting a preceding plate assembly 134 and the rear uninsulated portion (i.e. the rear conductive exit portion 344) electrically connected to a second plate assembly 134 sequentially following it in the stacked plate assemblies 134 forming the stator winding assembly 132.

Thus, in a related embodiment, each corresponding plate assembly 134 can be almost entirely (or partially/sufficiently) electrically insulated from adjacent plate assemblies 134 in each corresponding stator winding assembly 132, except for the front conductive entry portion 342 and the rear conductive exit portion 344. Thus, each corresponding plate assembly 134 can be almost entirely (or partially/sufficiently) coated with an electrical insulator, except for the front uninsulated portion (i.e. the front conductive entry portion 342) of the corresponding plate assembly 134 electrically connecting a preceding plate assembly 134 and the rear uninsulated portion (i.e. the rear conductive exit portion 344). Similarly, the stator body 120 can be coated with an electrical insulator.

In another related embodiment, as shown in FIGS. 4A-4B and 5A-5B, each plate assembly 134 of the stacked plate stator device 110 can be configured such that:

a) an inner/second side of the first end of the first sub-plate 336 is configured with a first notch 451;

b) an outer/first side of the second end of the first sub-plate 336 is configured with a second notch 452;

c) an inner/second side of the first end of the second sub-plate 338 is configured with a third notch 453; and d) an outer first side of the second end of the second sub-plate 338 is configured with a fourth notch 454, such that the first notch 451 and the fourth notch 454 enable a connection of the spiraling continuous path of conductivity 535 from a second sub-plate 338 of an immediately preceding plate assembly 134 to a first sub-plate 338 of a corresponding successive plate assembly 134, as shown in FIG. 5A;

such that the first notch 451, the second notch 452, third notch 453, and the fourth notch 454 facilitate a flow of electricity through the plate assembly 134;

such that outer surfaces of the plate assembly 134 can be flush, as shown in FIGS. 5A and 5B.

In another related embodiment, as shown in FIGS. 4A-4B and 5A-5B, each plate assembly 134 of the stacked plate stator device 110 can be configured with an U-I shape, such that the first sub-plate 336 is I-shaped (i.e. substantially straight or bar-shaped) and the second sub-plate 338 is U-shaped.

Figure 1A:
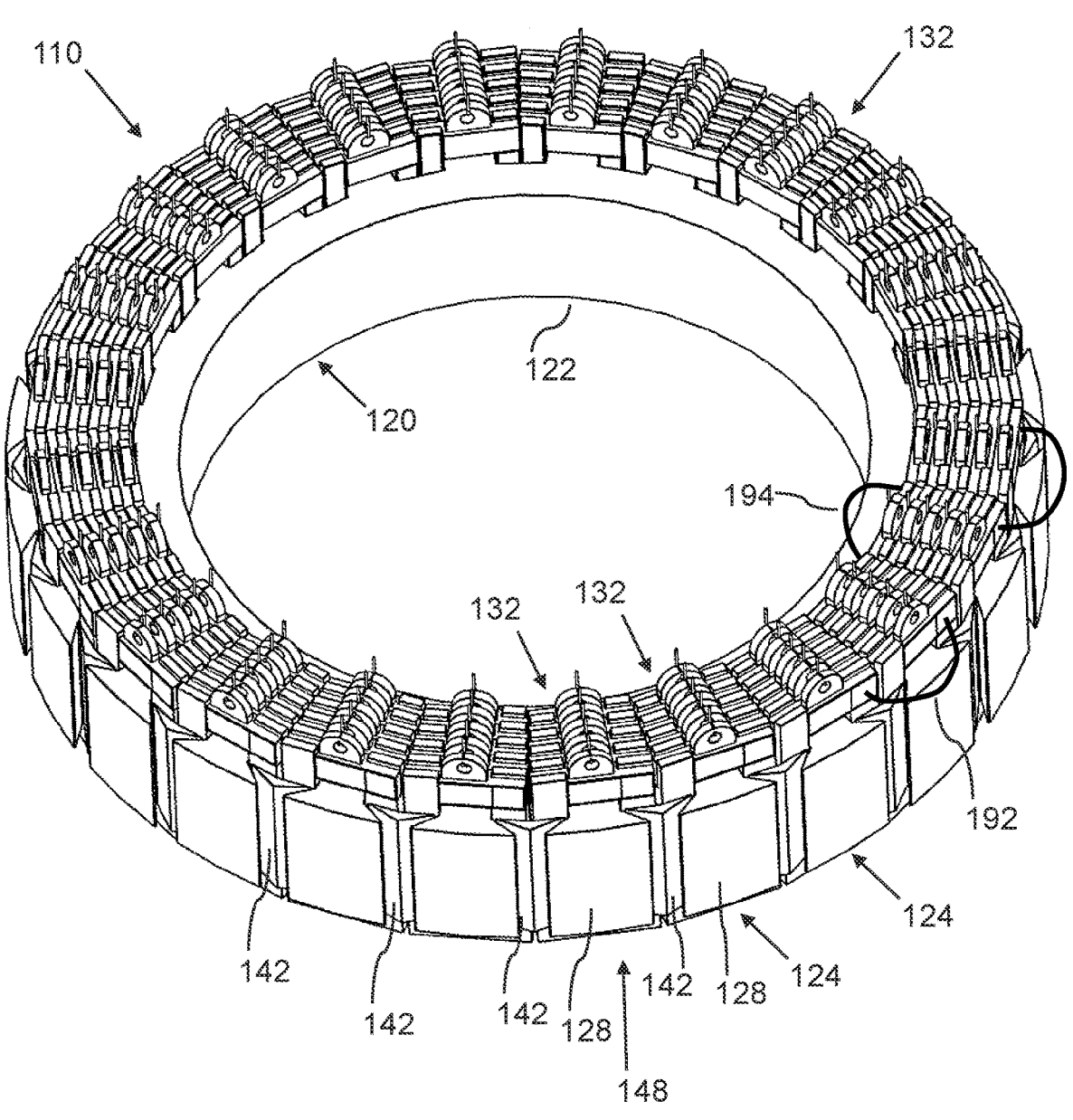
FIG. 1A is a top perspective view of a stacked plate stator device, according to an embodiment of the invention.
Figure 1B:
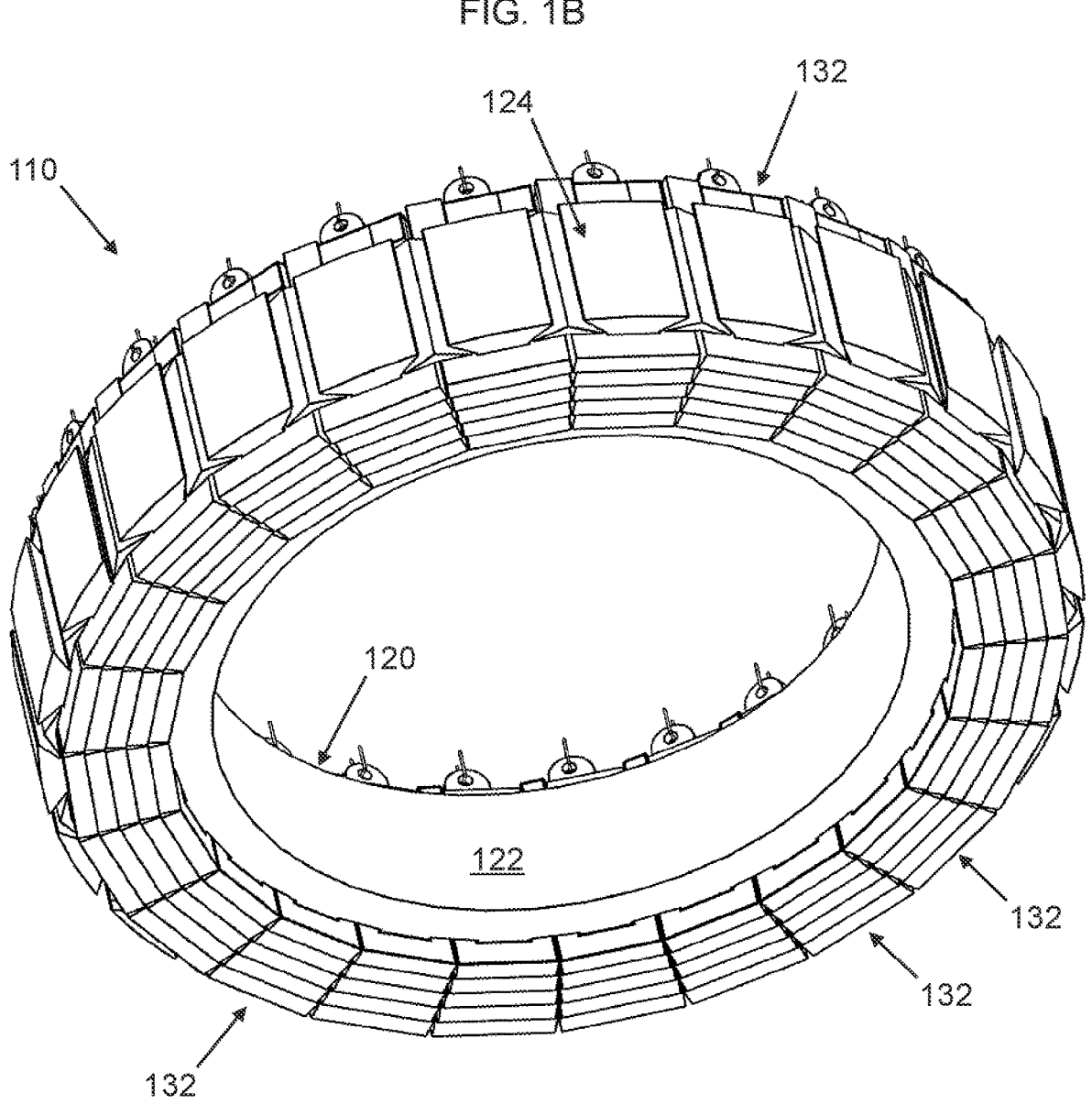
FIG. 1B is a bottom perspective view of a stacked plate stator device, according to an embodiment of the invention.
Figure 1C:
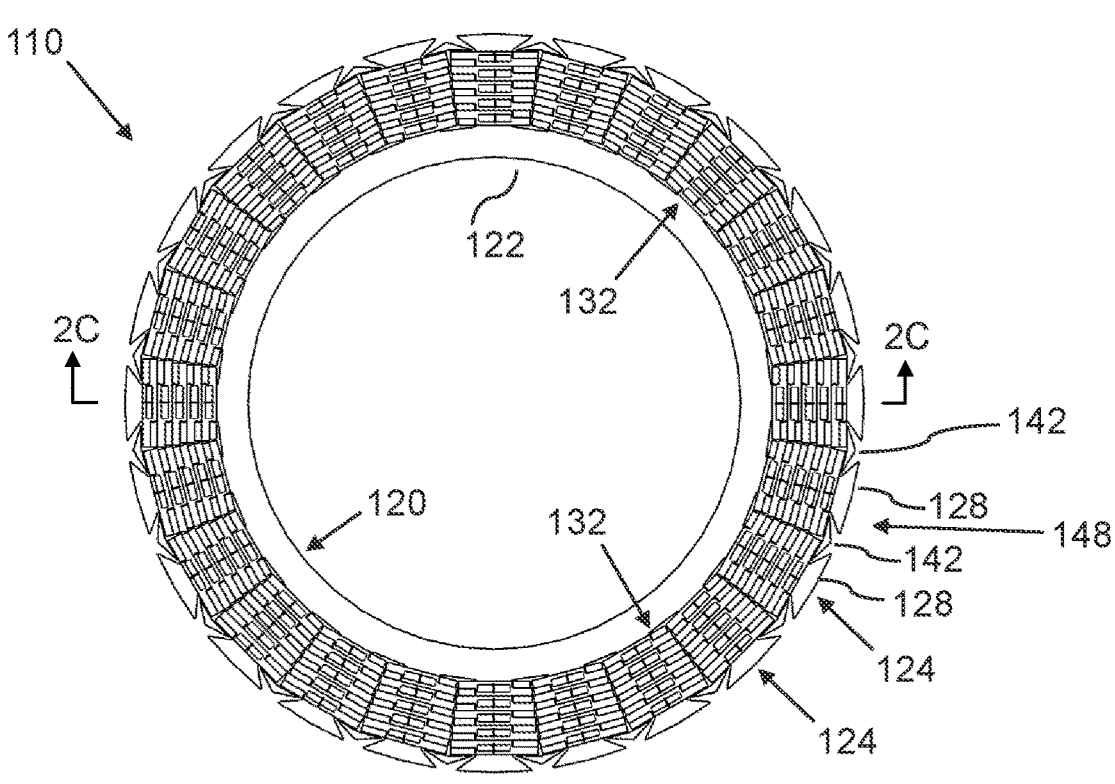
FIG. 1C is a top view of a stacked plate stator device, according to an embodiment of the invention.
Figure 1D:
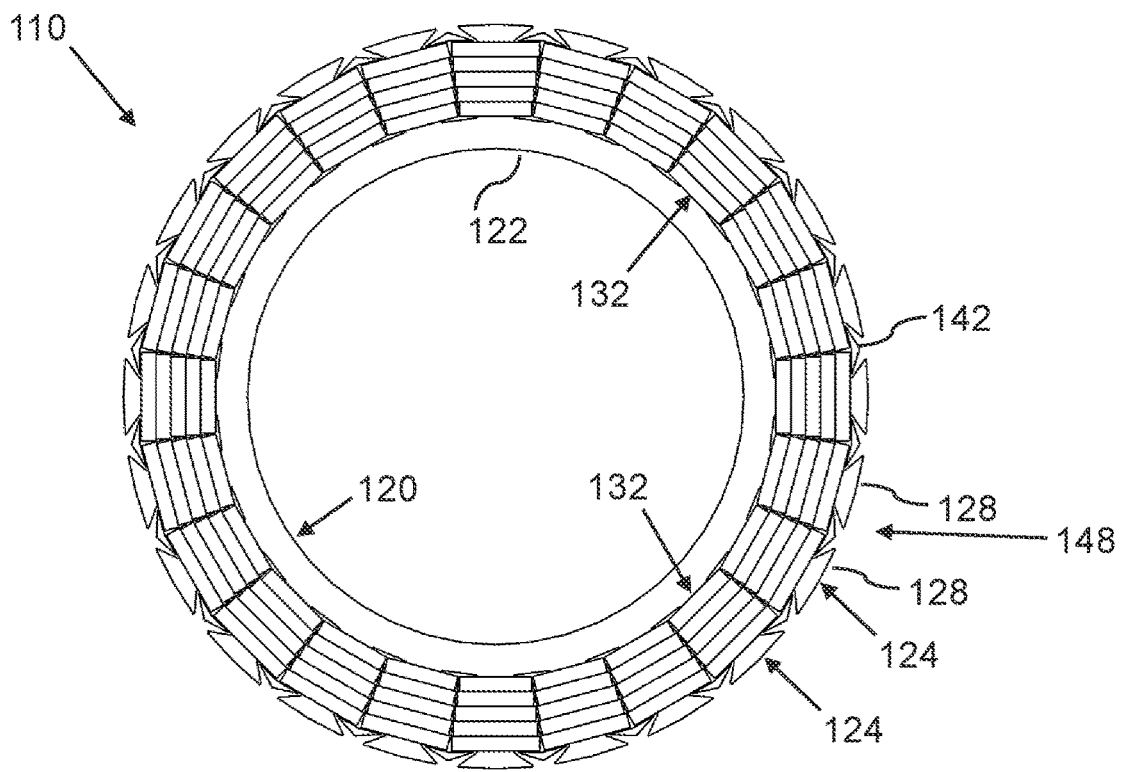
FIG. 1D is a bottom view of a stacked plate stator device, according to an embodiment of the invention.
Figure 1E:
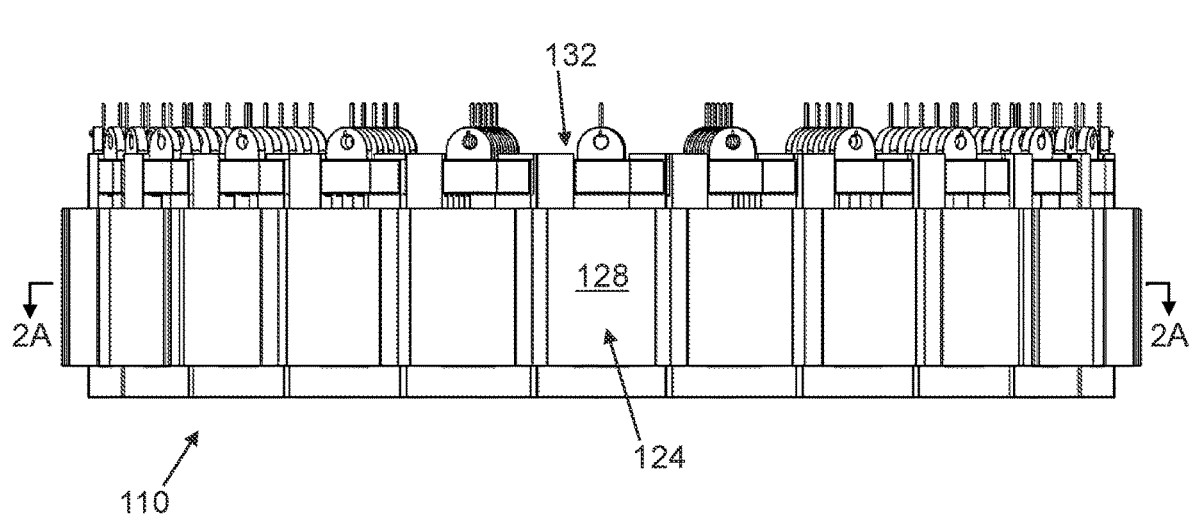
FIG. 1E is a side view of a stacked plate stator device, according to an embodiment of the invention.
Figure 1F:
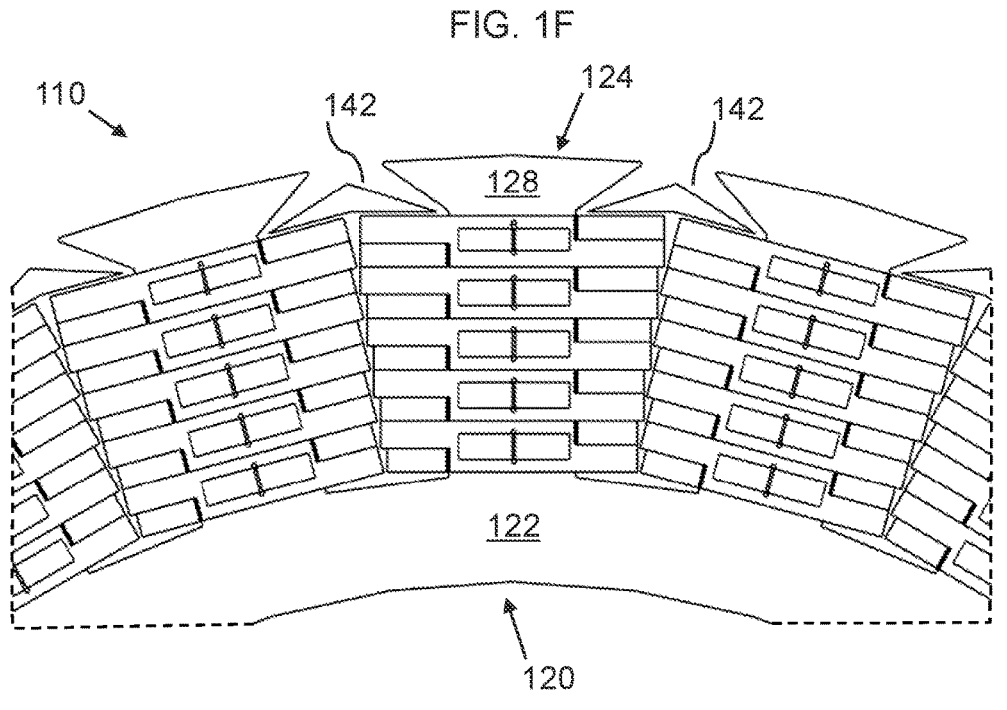
FIG. 1F is a top view of a portion of a stacked plate stator device, according to an embodiment of the invention.
Figure 1G:
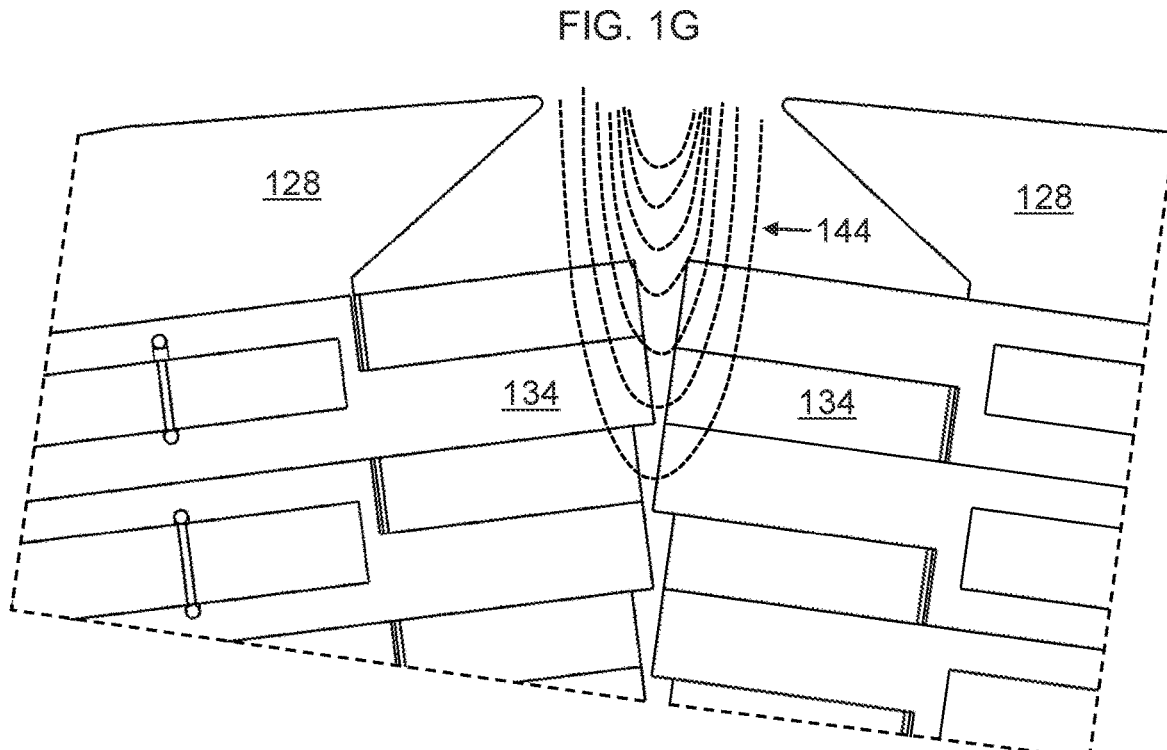
FIG. 1G is a top view of a portion of a stacked plate stator device showing magnetic field lines without a magnetic shield mounted, according to an embodiment of the invention.
Figure 1H:
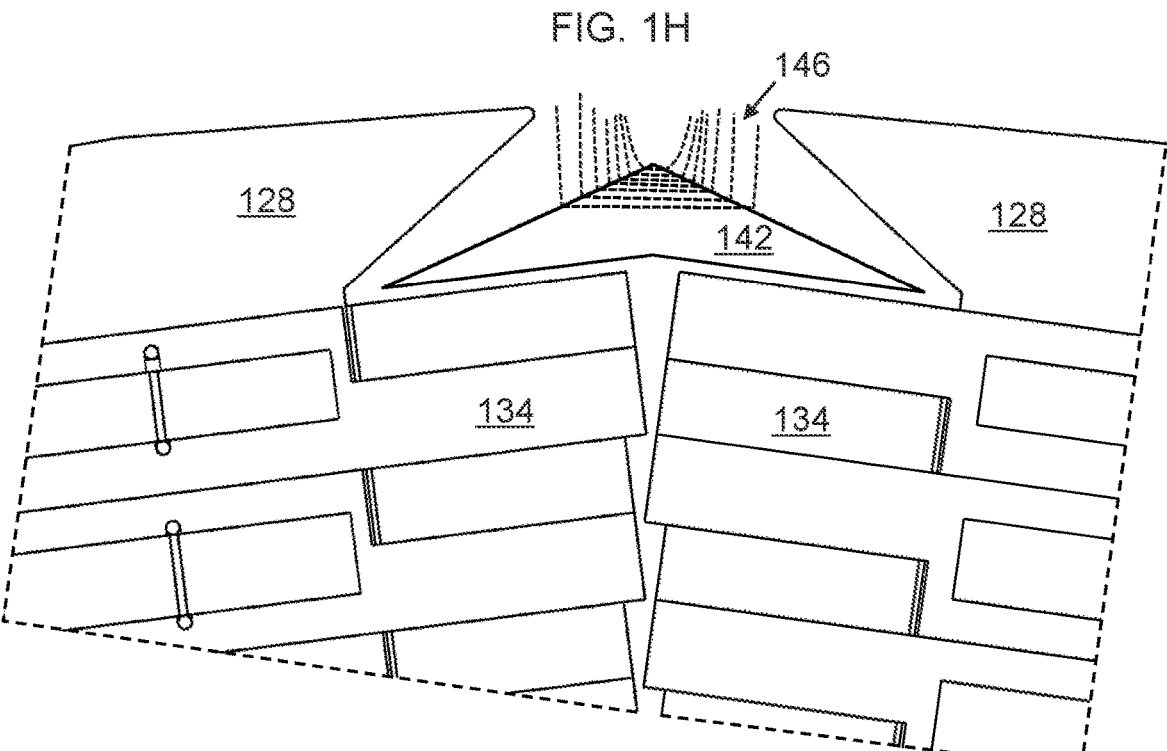
FIG. 1H is a top view of a portion of a stacked plate stator device showing magnetic field lines with a magnetic shield mounted, according to an embodiment of the invention.

In a related embodiment, as shown in FIGS. 1A-1F, the stacked plate stator device 110, can further include:

a) at least one electromagnetic shield 142, or a plurality of electromagnetic shields 142;

wherein the at least one electromagnetic shield 142 (or each corresponding electromagnetic shield 142) is made from a semi-magnetic material, which can for example be a soft magnetic composite of epoxy and iron grains or powder;

wherein the at the at least one electromagnetic shield 142 is electrically isolated from the stator body 120 and the plurality 130 of winding assemblies 132;

such that the at least one electromagnetic shield 142 is mounted between a prior stator tooth and a successive stator tooth, on an outer side of a prior winding assembly 132 and a successive winding assembly 132;

such that the at least one electromagnetic shield 142 is configured to guide an electromagnetic field 144, 146 along a lateral length of the at least one electromagnetic shield 142, as shown in FIG. 1H, such that the at least one electromagnetic shield 142 minimizes electromagnetic field 144, 146 interaction with any of the prior winding assembly 132 and a successive winding assembly 132, to minimize current disruption and minimize risk of cascading disruption to the electromagnetic field 144, 146.

In a further related embodiment, the semi-magnetic material can have a relative magnetic permeability of about 10; or in a range of 4-30, 4-35, 4-100, 10-40, 10-50, 14-100, 10-100, 20-100, 30-100, or 40-100. The semi-magnetic material can for example be an iron grain or powder compound, such as iron grains suspended in an electrically non-conductive epoxy compound or other type of electrically non-conductive resin/polymer compound.

Figures 2A, 2B:
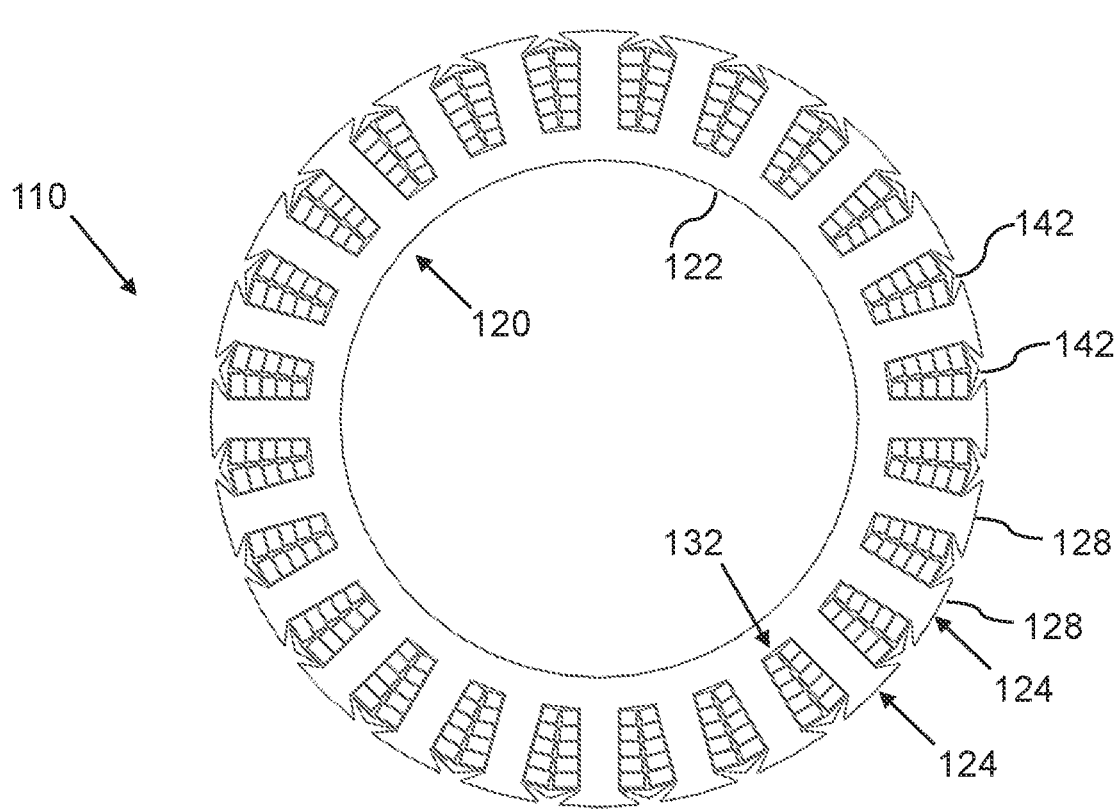
FIG. 2A is a cross-sectional view of a stacked plate stator device taken along section line 2A-2A of FIG. 1E, according to an embodiment of the invention.
FIG. 2B is a cross-sectional view of a portion of stacked plate stator device taken along section line 2A-2A of FIG. 1E, according to an embodiment of the invention.
Figure 2C:
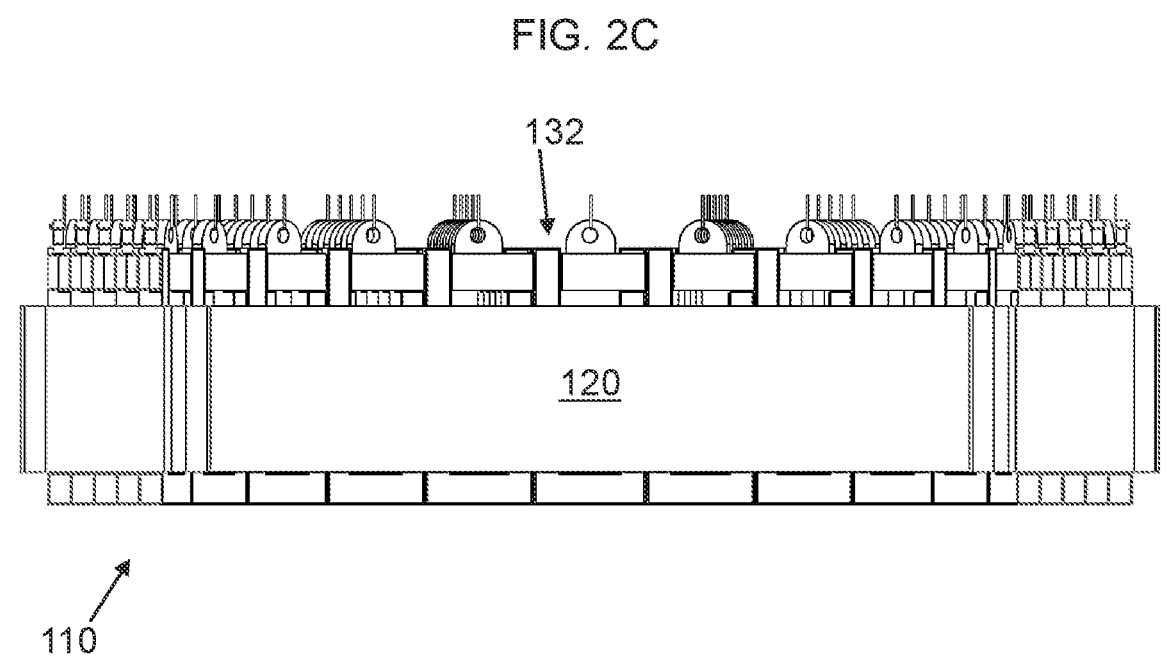

In related embodiment, as shown in FIGS. 1D, 1F, and 2B, the tooth head 128 of each stator tooth 124 can be vertically elongated and radially widening, such that the tooth head 128 widens from an inner end of the tooth head 128 to an outer end of the tooth head 128; and each electromagnetic shield 142 can be vertically elongated and radially narrowing from an inner end of the corresponding electromagnetic shield 142 to an outer end of the corresponding electromagnetic shield 142; such that a plurality of tooth heads 128 of the plurality of stator teeth overlap radially with the plurality of electromagnetic shields 142 to form an overlapping peripheral electromagnetic shield 148 around an outer periphery of the stacked plate stator device 110.

In a related embodiment, each plate assembly 134 in the stacked plate assemblies 134 can be electrically and mechanically connected, one to the next, with solder; and each sub-plate 336 of each plate assembly 134 can be electrically and mechanically connected, one to the next, with a connecting solder 472, as shown in FIGS. 4A and 4B.

In another related embodiment, each plate assembly 134 can further include a connecting solder 472, such that the second end of the first sub-plate 336 is connected to the first end of the second sub-plate 338 with the connecting solder 472.

In a further related embodiment, at least a portion of each plate assembly 134 can be configured with pre-tension 778 (i.e., a pre-tension force), such that at least the portion of each plate assembly 134 is pulled out of a corresponding winding assembly 132, if connecting solder melts (typically due to overload or short-circuit), such that electrical connectivity of the spiraling continuous path of conductivity 535 is broken, thereby stopping the flow of current, which thereby stops the overload or short-circuit, and prevents further meltdown of parts of the stacked plate stator device 110.

In a yet further related embodiment of a stacked plate stator device 110, 710a, 710b, as shown in FIGS. 7A and 7B, each winding assembly 132 can further include:

a) at least one spring 772, which is connected to at least the portion of each plate assembly 134, such that the at least one spring 772 is configured with the pre-tension 778;

such that at least the portion of each plate assembly 134 is pulled out of a corresponding winding assembly 132, if connecting solder melts (typically due to overload or short-circuit), such that electrical connectivity of the spiraling continuous path of conductivity 535 is broken, thereby stopping the flow of current, which thereby stops the overload or short-circuit, and prevents further meltdown of parts of the stacked plate stator device 110.

In a further related embodiment of a stacked plate stator device 110, 710c, as shown in FIGS. 7C and 7D, each winding assembly 132 can further include:

a) a plurality of springs 774, which are each configured with pre-tension 778, wherein each corresponding spring 774 in the plurality of springs 774 is connected to a spring mounting aperture 439 of a first sub-plate 336 of a corresponding plate assembly 134 in the plurality of stacked plate assemblies 134;

such that the first sub-plate 336 is pulled out of the corresponding winding assembly 132, as shown in FIG. 7D, if connecting solder melts (typically due to overload or short-circuit), such that electrical connectivity of the spiraling continuous path of conductivity 535 is broken, thereby stopping the flow of current, which thereby stops the overload or short-circuit, and prevents further meltdown of parts of the stacked plate stator device 110.

In a related embodiment, the plurality of winding assemblies 132 can be configured to be concentrated, such that each winding assembly 132 is mounted around solely one corresponding stator tooth 124.

In another related embodiment, as shown in FIGS. 11 and 12, the plurality of winding assemblies 132 can be configured to be distributed, such that each winding assembly 132 is mounted around at least two adjacent stator teeth 124 in the plurality of stator teeth 124.

In a further related embodiment, as shown in FIGS. 11 and 12, the plurality of winding assemblies 132 can be further configured to be interleaved, such that each successive winding assembly 132 shares a corresponding intermediate stator tooth 124 with a prior winding assembly 132.

In a yet further related embodiment, the plurality of winding assemblies 132 each comprising a plurality of stacked plate assemblies, can be further configured to be radially stacked and non-interleaving, such that each successive winding assembly 132 is non-interleaving and radially stacked with the immediately preceding winding assembly 132 on the corresponding intermediate stator tooth 124.

In another yet further related embodiment, as shown in FIGS. 11 and 12, the plurality of winding assemblies can be further configured to be interleaved, such that successive plate assemblies of each successive winding assembly is radially interleaved with preceding plate assemblies of the prior winding assembly on the corresponding intermediate stator tooth 124.

In a further related embodiment, as shown in FIG. 11, corresponding winding assemblies 1133 in the plurality of winding assemblies 1132, 1133 can be further configured, such that outer ends of plate assemblies 1134 of the selected second winding assemblies 1133 are bent and upward or downward tilted, such that outer ends of the selected second winding assemblies 1134 are perpendicularly oriented and interleaving, relative to corresponding winding assemblies 1132 in a plurality of first winding assemblies 1132.

Thus, in related embodiment, as shown in FIG. 12, the plurality of winding assemblies 1232, 1233 can further include:

a) a plurality of first winding assemblies 1232, each comprising a plurality of corresponding first plate assemblies; and b) a plurality of second winding assemblies 1233, each comprising a plurality of corresponding second plate assemblies;

wherein inner and outer ends of the corresponding second plate assemblies of the second winding assemblies are configured to be bent and upward or downward tilted, such that the inner and outer ends are perpendicularly oriented and interleaving, relative to the corresponding first winding assemblies in the plurality of first winding assemblies.

In another embodiment, as shown in FIGS. 14A-14E, 15A-15B, 16A-16B, 17A-17B, 18A-18D, 19A-19C, 20A-20B, 21A-21B and 22A-22B, a two-phase distributed and interleaved stacked plate stator device 1410, can include:

a) a stator body 120 (also called a stator core), which can include:

i. a stator support member 122 (also called a stator yoke or back iron), which can be ring-shaped with a central aperture; and ii. a plurality of stator teeth 124, which can each include:

1) a tooth body 126; and 2) a tooth head 128, which is connected to an outer end of the tooth body 126, wherein the tooth head 128 can be laterally wider than the tooth body 126;

such that each stator tooth 124 protrudes radially from the stator support member 122 (either protruding inward, or protruding outward as shown; depending on configuration of the electrical rotor 620); and such that stator slots 129 (or gaps) are formed between consecutive stator teeth 124 in the plurality of stator teeth 124;

b) a plurality of first winding assemblies 1432, wherein each corresponding first winding assembly 1432 can include:

i. an outer first plate assembly 1434, which can include:

1) a primary outer first sub-plate 1536; and 2) a primary outer second sub-plate 1538, such that a second end of the primary outer first sub-plate 1536 is mechanically connected to a first end of the primary outer second sub-plate 1538; and ii. an inner first plate assembly 1435, which can include:

1) a primary inner first sub-plate 1637; and 2) a primary inner second sub-plate 1639, such that a second end of the primary inner first sub-plate 1637 is mechanically connected to a first end of the primary inner second sub-plate 1639;

such that the outer first plate assembly 1434 and the inner first plate assembly 1435 form a first combined passageway 337 of the corresponding first winding assembly 1432;

such that a second end of the primary outer second sub-plate 1538 is electrically insulated from a first end of the primary outer first sub-plate 1536 and such that the first end of the primary outer second sub-plate 1538 is electrically connected to the second end of the primary outer first sub-plate 1536, such that the outer first plate assembly 1434 forms a 360-degree turn 537 around a first outer interior passageway 335 (as schematically shown in FIG. 5A);

such that a second end of the primary inner second sub-plate 1639 is electrically insulated from a first end of the primary inner first sub-plate 1637 and such that the first end of the primary inner second sub-plate 1639 is electrically connected to the second end of the primary inner first sub-plate 1637, such that the inner first plate assembly 1435 forms a 360-degree turn 537 around a first inner interior passageway 335 (as schematically shown in FIG. 5A);

such that a first pair of two tooth bodies 126 of the plurality of stator teeth 124 protrude through the first combined passageway 137 of the corresponding first winding assembly 1432;

c) a plurality of second winding assemblies 1433, wherein each corresponding second winding assembly 1433 can include:

i. an outer second plate assembly 1434, which can include:

1) a secondary outer first sub-plate 1536; and 2) a secondary outer second sub-plate 1538, such that a second end of the secondary outer first sub-plate 1536 is mechanically connected to a first end of the secondary outer second sub-plate 1538; and ii. an inner second plate assembly 1435, which can include:

1) a secondary inner first sub-plate 1637; and 2) a secondary inner second sub-plate 1639, such that a second end of the secondary inner first sub-plate 1637 is mechanically connected to a first end of the secondary inner second sub-plate 1639;

such that the outer second plate assembly 1434 and the inner second plate assembly 1435 form a second combined passageway 337 of the corresponding second winding assembly 1433;

such that a second end of the secondary outer second sub-plate 1538 is electrically insulated from a first end of the secondary outer first sub-plate 1536 and such that the first end of the secondary outer second sub-plate 1538 is electrically connected to the second end of the secondary outer first sub-plate 1536, such that the outer second plate assembly 1434 forms a 360-degree turn 537 around a second outer interior passageway 335 (as schematically shown in FIG. 5A);

such that a second end of the secondary inner second sub-plate 1639 is electrically insulated from a first end of the primary inner first sub-plate 1637 and such that the first end of the secondary inner second sub-plate 1639 is electrically connected to the second end of the secondary inner first sub-plate 1637, such that the inner first plate assembly 1435 forms a 360-degree turn 537 around a second inner interior passageway 335 (as schematically shown in FIG. 5A);

such that a second pair of two tooth bodies 126 of the plurality of stator teeth 124 protrude through the second combined passageway 137 of the corresponding second winding assembly 1433;

such that the corresponding first winding assembly 1432 and the corresponding second winding assembly 1433 are interleaved, such that the corresponding first winding assembly 1432 and the corresponding second winding assembly 1433 share an intermediate tooth body 126;

such that each successive first plate assembly 1434 is stacked with a prior first plate assembly 1434;

such that each successive first plate assembly 1434 is electrically connected with a prior first plate assembly 134, such that a front conductive entry portion 342 of each successive first plate assembly 1434 is electrically connected with a rear conductive exit portion 344 of a prior first plate assembly 1434, such that the at least one first winding assembly 1432 forms a first spiraling continuous path of conductivity 535 (as schematically shown in FIG. 5A), which spirals around the tooth body 126 of the at least one stator tooth 124 and conducts a first phase of electrical power;

such that each successive second plate assembly 1435 is stacked with a prior second plate assembly 1434;

such that each successive second plate assembly 1435 is electrically connected with a prior second plate assembly 134, such that a front conductive entry portion 342 of each successive second plate assembly 1435 is electrically connected with a rear conductive exit portion 344 of a prior second plate assembly 1434, such that the at least one second winding assembly 1433 forms a second spiraling continuous path of conductivity 535 (as schematically shown in FIG. 5A), which spirals around the tooth body 126 of the at least one stator tooth 124 and conducts a second phase of electrical power.

In a related embodiment, with an alternative and simplified description, as shown in FIGS. 14A-14E, 15A-15B, 16A-16B, 17A-17B, 18A-18D, 19A-19C, 20A-20B, 21A-21B and 22A-22B, a two-phase distributed and interleaved stacked plate stator device 1410, can include:

a) a stator body 120, which can include:
  i. a stator support member 122, which can be ring-shaped with a central aperture; and
  ii. a plurality of stator teeth 124, which can each include:
    1) a tooth body 126; and
    2) a tooth head 128, which is connected to an outer end of the tooth body 126, wherein the tooth head 128 can be laterally wider than the tooth body 126;

such that each stator tooth 124 protrudes radially from the stator support member 122 (either protruding inward, or protruding outward as shown; depending on configuration of the electrical rotor 620); and such that stator slots 129 (or gaps) are formed between consecutive stator teeth 124 in the plurality of stator teeth 124;

b) a combined plurality of general winding assemblies 1432, 1433 wherein each corresponding general winding assembly 1432, 1433 can include:
  i. an outer plate assembly 1434, which can include:
    1) an outer first sub-plate 1536; and
    2) an outer second sub-plate 1538;
    such that a second end of the outer first sub-plate 1536 is mechanically and electrically connected to a first end of the outer second sub-plate 1538;
    such that a second end of the outer second sub-plate 1538 is electrically insulated from a first end of the outer first sub-plate 1536;
    wherein the second end of the outer second sub-plate is adjacent to the first end of the outer first sub-plate, such that the outer plate assembly 1434 forms a 360-degree turn 1947 around a first outer interior passageway 1935 of the outer plate assembly 1434 (as schematically shown in FIG. 19A); and
  ii. an inner plate assembly 1435, which can include:
    1) an inner first sub-plate 1637; and
    2) an inner second sub-plate 1639;
    such that a second end of the inner first sub-plate 1637 is mechanically and electrically connected to a first end of the inner second sub-plate 1639;
    such that a second end of the inner second sub-plate 1639 is electrically insulated from a first end of the inner first sub-plate 1637;
    wherein the second end of the inner second sub-plate is adjacent to the first end of the inner first sub-plate, such that the inner plate assembly 1435 forms a 360-degree turn 1947 around a first inner interior passageway 1937 (as schematically shown in FIG. 19A);

such that the outer plate assembly 1434 and the inner plate assembly 1435 are stacked radially with a rear of the outer plate assembly 1434 positioned adjacent to a front of the inner plate assembly 1435;

such that the outer plate assembly 1434 and the inner plate assembly 1435 form a general combined passageway 1939 of the corresponding general winding assembly 1432, 1433;

such that the outer plate assembly 1434 is electrically connected with the inner plate assembly 1435 (in connections points 2044 and 2142), such that a front conductive entry portion 1942 of the outer plate assembly 1434 is electrically connected with a rear conductive exit portion 1944 of an inner plate assembly 1435, such that the corresponding general winding assembly 1432, 1433 forms a first spiraling continuous path of conductivity 1949 (as schematically shown in FIGS. 19A and 19B), which spirals around a corresponding pair of two tooth bodies 126 of the plurality of stator teeth 124;

such that a corresponding pair of two tooth bodies 126 of the plurality of stator teeth 124 protrude through the general combined passageway 1939 of the corresponding general winding assembly 1432, 1433;

wherein the combined plurality of general winding assemblies 1432, 1433 comprises:

I. a first plurality of first winding assemblies 1432, which are oriented in a first vertical orientation with the outer first sub-plate 1536 and the inner first sub-plate 1637 positioned on a top end of each corresponding first winding assembly 1432;

such that the first winding assemblies 1432 are successively laterally electrically connected to conduct a first phase of electrical power 1491, as shown in FIG. 14A (showing only a portion of the first phase connections); and II. a second plurality of second winding assemblies 1433, which are oriented in a vertically opposing second vertical orientation with the outer first sub-plate 1536 and the inner first sub-plate 1637 positioned on a bottom end of each corresponding second winding assembly 1433;

such that the second winding assemblies 1433 are successively laterally electrically connected to conduct a second phase of electrical power 1492, as shown in FIG. 14B (showing only a portion of the second phase connections);

such that the second plurality of second winding assemblies 1433 is interleaved with the first plurality of first winding assemblies 1432; and In a further related embodiment, as shown in FIGS. 20A-20B and 21A-21B, each first and second plate assembly 1434, 1435 of the stacked plate stator device 1410 can be configured such that:

a) an inner/second side of the first end of the first sub-plate 1536, 1637 is configured with a first notch 2051, 2151;

b) an outer/first side of the second end of the first sub-plate 1536, 1637 is configured with a second notch 2052, 2152;

c) an inner/second side of the first end of the second sub-plate 1538, 1639 is configured with a third notch 2053, 2153; and d) an outer/first side of the second end of the second sub-plate 1538, 1639 is configured with a fourth notch 2054, 2154;

such that the first notch 2051, 2151 and the fourth notch 2054, 2154 enable a connection of the spiraling continuous path of conductivity 1949 from a second sub-plate 1538, 1639 of an immediately preceding plate assembly 1434 to a first sub-plate 1536, 1637 of a corresponding successive plate assembly 1435, as shown in FIG. 19A;

such that outer surfaces of the first and second plate assembly 1434, 1435 can be flush, as shown in FIGS. 19A-19B.

In related embodiments, various directions of electrical flows can be configured to flow through the first winding assemblies 1432 and second winding assemblies 1433, with corresponding appropriate electrical connection areas 1942, 2092, 2094, 1944 (such as exposed copper, that can be soldering points, indicated by cross-hatching), and minimum necessary insulated areas 2082, 2084, 2086, 2088, 2182, 2184 (indicated by stippling), as shown in FIGS. 20A-20B and 21A-21B; similar to the insulation/copper connection schematics shown in FIGS. 4A and 4B. Alternatively, all surfaces that are not electrical connection areas 1942, 2092, 2094, 2044, 2142, 1944 can be coated with insulation to ensure electrical isolation. Interconnections between a prior winding assembly 1432, 1433, and a successive winding assembly 1432, 1433 can flow such that an output electric flow from the rear conductive exit portion 1944 of the prior winding assembly 1432, 1433, as shown in FIG. 19A, connects 1491, 1492 with an input electric flow to a front conductive entry portion 1942 of the successive winding assembly 1432, 1433 and then flows to the rear conductive exit portion 1944 of the successive winding assembly 1432, 1433.

In a related embodiment, as shown in FIGS. 19A-19B and 20A-20B, the outer plate assembly 1434 can be configured such that the outer first sub-plate 1536 is an outer convex horizontally curved segment (which can be composed of two angle-connected straight segments as shown or can be fully curved) and the outer second sub-plate 1538 can be vertically u-shaped; and the inner plate assembly 1435 can be configured such that the inner first sub-plate 1637 is an outer convex horizontally curved segment (which can be composed of two angle-connected straight segments as shown or can be fully curved) and the inner second sub-plate 1639 can be vertically u-shaped.

In a further related embodiment, as shown in FIGS. 19A-19B and 20A-20B, each corresponding general winding assembly 1432, 1433 can be configured such that:

a) the outer second sub-plate 1538 can comprise:

i. a left outer vertical portion 2042;

ii. a right outer vertical portion 2044; and iii. an outward bent outer horizontal portion 2046, which is mounted between a lower end of the left outer vertical portion 2042 and a lower end of the right outer vertical portion 2044; and b) the inner second sub-plate 1639 can comprise:

i. a left inner vertical portion 2052;

ii. a right inner vertical portion 2054; and iii. an inward bent inner horizontal portion 2056, which is mounted between a lower end of the left inner vertical portion 2052 and a lower end of the right inner vertical portion 2054;

such that the outward bent outer horizontal portion 2046 and the inward bent inner horizontal portion 2056 in combination create an interleaving opening 1862, 1863, which enables the interleaving of the second plurality of second winding assemblies 1433 with the first plurality of first winding assemblies 1432.

In a related embodiment, as shown in FIGS. 19A-19B and 20A-20B, the outward bent outer horizontal portion 2046 can be configured as an outer convex horizontally curved segment (which can be composed of two angle-connected straight segments as shown or can be fully curved), which is mounted between a front side of the lower end of the left outer vertical portion 2042 and a front side of the lower end of the right outer vertical portion 2044; and the inward bent inner horizontal portion 2056 can be configured as an outer convex horizontally curved segment (which can be composed of two angle-connected straight segments as shown or can be fully curved), which is mounted between a rear side of the lower end of the left inner vertical portion 2052 and a rear side of the lower end of the right inner vertical portion 2054.

In various embodiments, the stacked plate stator device 110 is directed to a novel form of stator winding resulting in increased fill factor of the stator slots that not only reduces the motor's resistive loss but also the thermal resistivity or temperature gradient, as the net thermal resistance between the coil of wires and stator goes approximately with (1-fill factor). The higher thermal and electrical conductivity both allow higher power density. By limiting the thickness of the individual plate assemblies 134 of the stator winding enhanced operation of the electrical device can be achieved at higher frequencies.

In various embodiments, the stacked plate system 100 and stacked plate stator device 110 provide a stator winding comprising a plurality of stacked plate assemblies 134 stacked and interleafed one upon the other, thereby significantly increasing the fill factor of each stator device 110 and thus increasing the efficiency of the electric device. More particularly, each plate assembly 134 comprises one turn of the stator winding and each plate assembly 134 are sequentially electrically connected to the plate assemblies 134 on either side thereof forming a single continuous path of electrical conductivity through the stator winding. Each plate assembly 134 comprises individual sub-plates 336 of conductive material coated with an insulating material with selected regions uncoated whereby each sub-plate 336 can be electrically connected to an adjacent sub-plate 336 within each plate assembly 134 and to sub-plates 336 in adjacent plate assemblies 134 thereto. The stacked plate assemblies 134 can be arranged within the stator to provide for both concentrated and distributed stator windings. The resulting stacked and interleafed plate assemblies 134 yield a stacked plate stator device slot fill factor of at least 50-70%. The stacked plate assemblies 134 have conductor thickness sized 1 mm to achieve optimum performance at frequencies up to 1 KHz to minimize the production of eddy currents in the stator winding and decrease in conductance. These improvements in stator design significantly improve the overall operating efficiency of the electrical device.

Thus, in such various embodiments, the stacked plate system 100 and stacked plate stator device 110 provide different levels of embodiment configurations, which can include:

a) a first level of configuration, which can include:
  i. different patterns of soldering conductive plate elements (such as copper sheets) together into a conductive "coil" using a LEGO™ or origami style of connecting plates;
  ii. adding semi-magnetic shields to the top plates to direct the electromagnetic fields;
  iii. exerting a pulling force on soldered connections so they come apart if they get hot;
b) a second level of configuration, which can include a multitude of ways to configure and assemble the plate pieces to form coils. These connections can surround one tooth (concentrated) or more teeth (distributed); and
c) a third level of configuration, which includes options for routing the end turns or return paths of distributed windings. If only two phases are used, it is possible to tilt alternate phases to make room for the other coil where the default is to interleave these turns.

In a related embodiment, FIGS. 1A-1F and 3A-3B show a stator body 120 of a stacked plate stator device 110. The stator body 120 can be substantially ring-shaped and can include a plurality of teeth 124 radially spaced about the stator circumference with resulting slots or gaps 129 between the teeth 124. Those skilled in the art will appreciate that linear electric devices comprise similar features and the innovations of the various embodiment of the stacked plate stator device 110 are applicable to such devices also. In conventional electric devices windings of insulated copper wire are wound around each tooth 124, wherein the amount of wire that can be wound around each tooth 124 filling the gaps 129 is defined as the fill factor. Conventional wire wound stators have fill factors of about 30% while as we shall demonstrate herein the stacked plate assembly 134 windings of the stacked plate stator device 110 can have a fill factor of at least 50-70%.

Figure 3A:
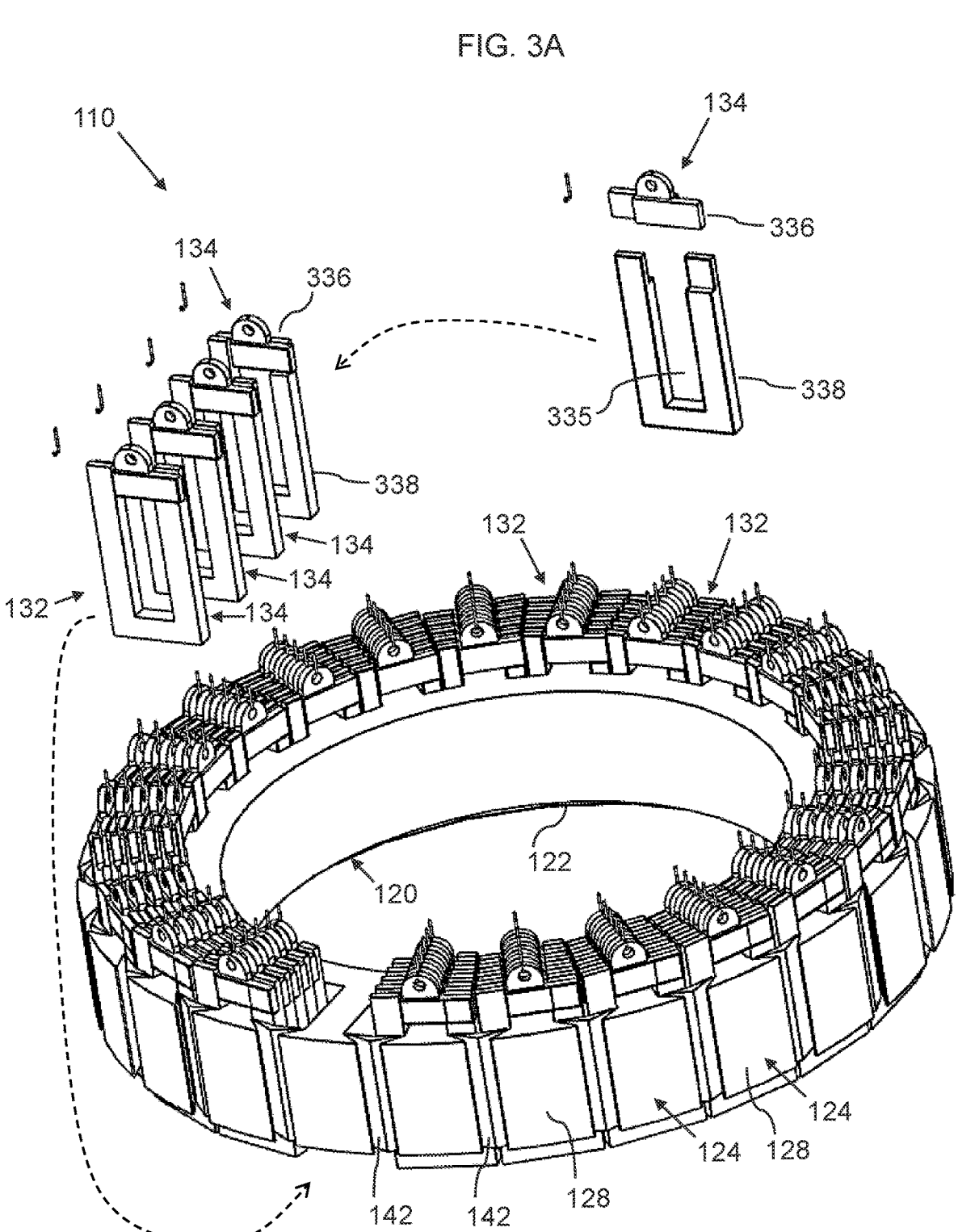
FIG. 3A is a top perspective partially exploded view of a stacked plate stator device, according to an embodiment of the invention.
Figure 3B:
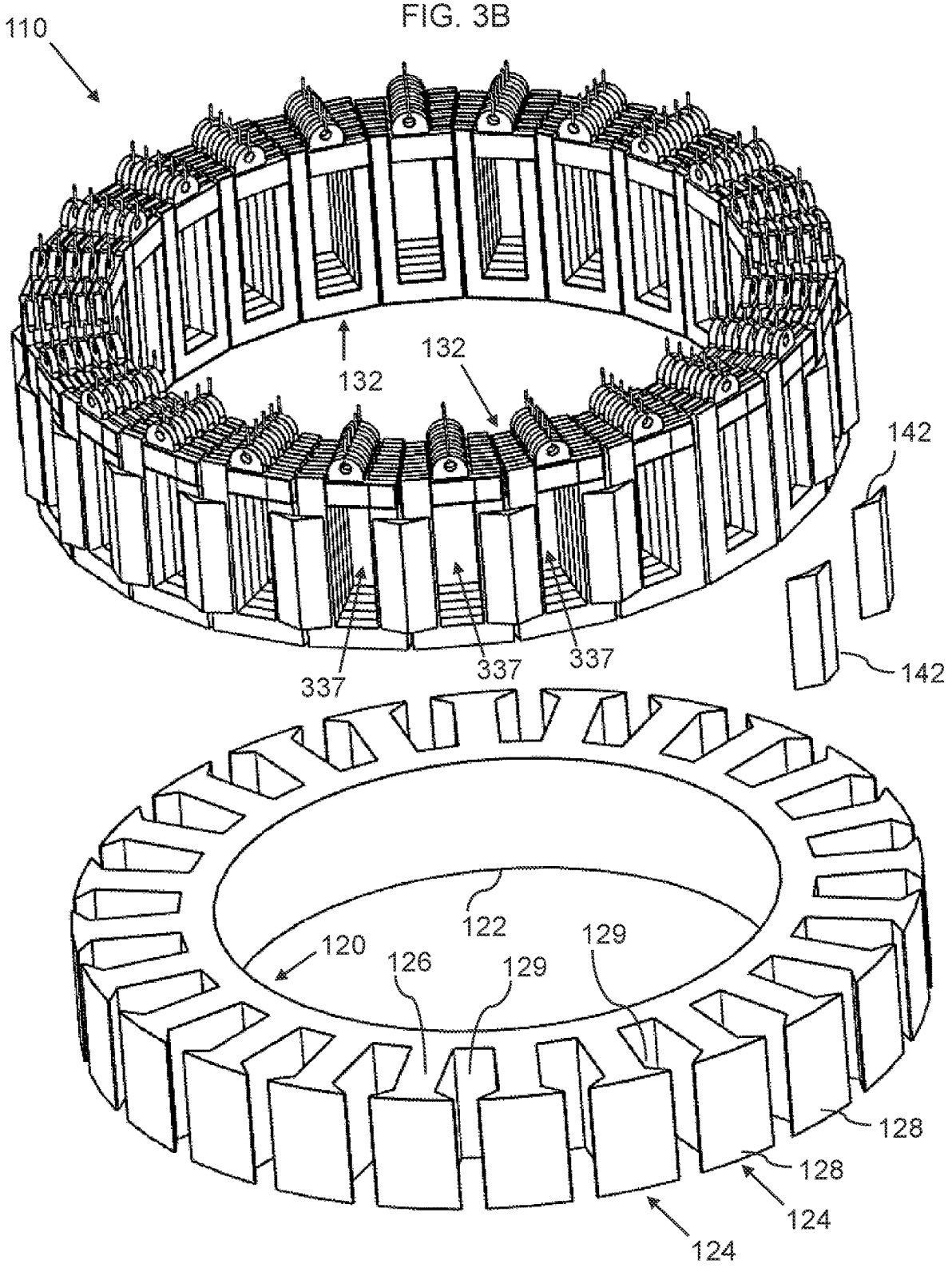
FIG. 3B is a top perspective partially exploded view of a stacked plate stator device, according to an embodiment of the invention.
Figure 3C:
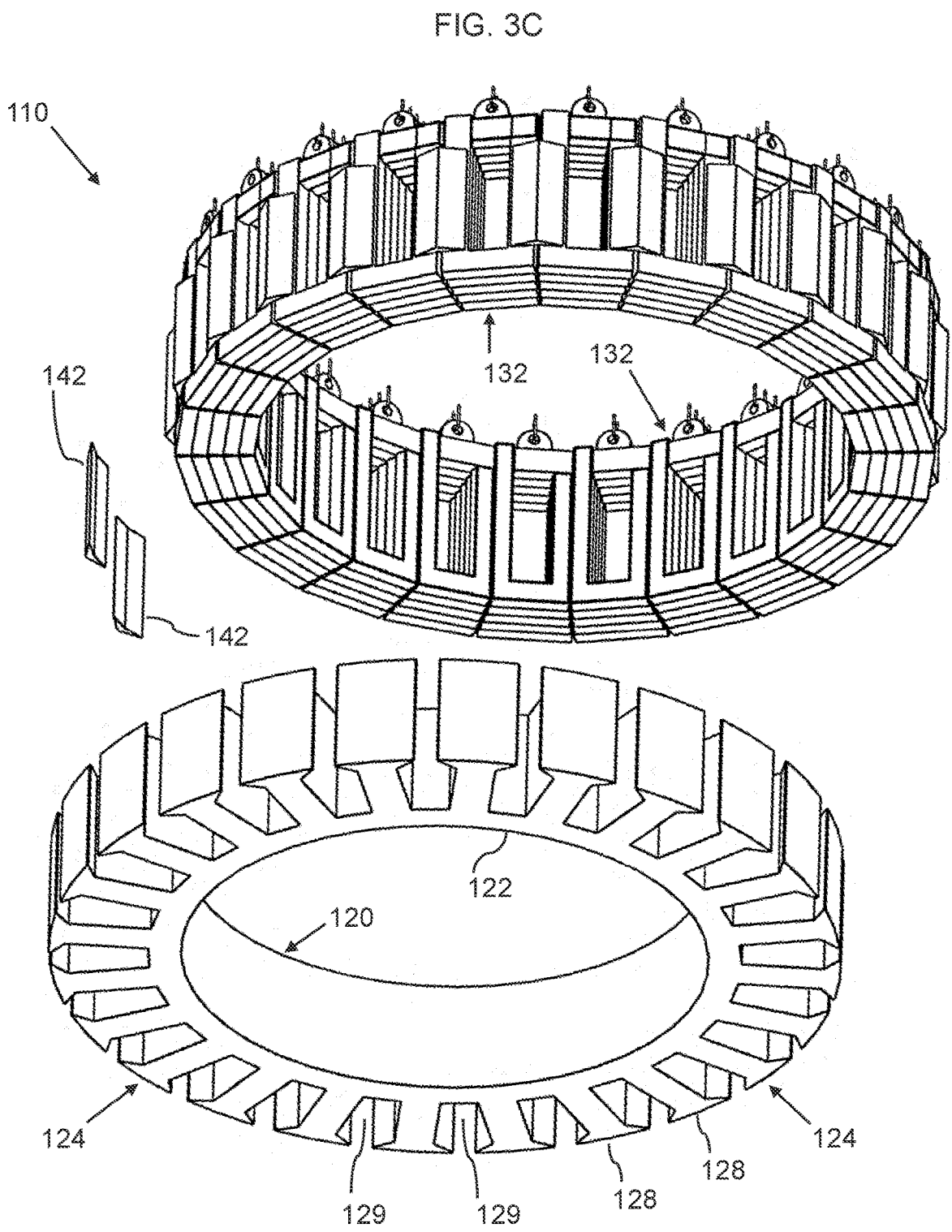
FIG. 3C is a bottom perspective partially exploded view of a stacked plate stator device, according to an embodiment of the invention.

In various related embodiments, a variety of shaped sub-plates 336 can be used to construct individual plate assemblies 134 to form plate assemblies 134 (similar to windings) around the teeth 124 of the stacked plate stator device 110 depicted in FIG. 3B that result in an increased fill factor of at least 50%. Those skilled in the art will appreciate that a variety of shapes can be employed, including C-, U-, I-, J-, F-, -H, -T, -W, -E and L-shapes. Such shaped sub-plates 336 can be cut or punched from thin sheets of copper, preferably of less than or equal to 1 mm thickness.

In a related embodiment, a combination of U-shaped and I-shaped sub-plates 336 can be laser cut from a sheet of copper preferably less than 1 mm thick. By cutting thin sheets or plate assemblies 134 to closely fit the slot 129 cross section to form each plate assembly 134 (i.e. turn) of the winding assembly 132 (i.e. coil), we can assure a very high slot 129 fill factor limited only by tolerances and insulation thickness and reduce skin effects as the frequency of the electrical device increases. The sub-plates 336, once cut, can then be coated on one side with an insulator 480, such as a ceramic insulator. For example, the shapes can be insulated with KAPTON™ or a liquid coating like CERAKOTE H900™.

In a further related embodiment, FIGS. 4A and 4B show an exploded view of a U-shaped sub-plate 336 and an I-shaped sub-plate 338, which can be combined to form a plate assembly 134. The U-shape and I-shape ends are thinned to form staggered lap joints. A central passageway 335 is formed by the combined U-shaped sub-plate 336 and I-shaped sub-plate 338 sized to circumscribe the tooth 124 of the stacked plate stator device 110.

In a related embodiment, FIG. 3A depicts a stacked plate stator device 110 with a plurality of congruently stacked plate assemblies 134 positioned thereabout with one winding assembly 132 of stacked plate assemblies 134 removed. The resulting complete winding assembly 132 composed of a plurality of stacked plate assemblies 134 having both I-shaped and U-shaped sub-plates 336 each forming a single continuous path of electrical conductivity through the plate assemblies 134. Winding assemblies 132 of this configuration are referred to as concentrated. In concentrated windings each stacked set of sub-plates 336 wraps around a single stator tooth 124 climbing one plate thickness at each turn. Preferably each plate assembly 134 should be thin enough to avoid skin thickness effects and the copper portion of each sub-plate 336 can have a thickness of no more than 1 mm.

In a further related embodiment, FIG. 1F shows a stator tooth 124 with a plurality of stacked plate assemblies 134 congruently stacked one upon the other, each formed from a U-shaped sub-plate 336 and an I-shaped sub-plate 338. The adjacent plate assemblies 134 are sized to fit within the slot 129 between the stator teeth 124. The resulting winding assembly 132 (i.e., complete winding) comprises a plurality of stacked plate assemblies 134 to form a single continuous path of electrical conductivity from one plate assembly 134 to the next plate assembly 134.

In a yet further related embodiment, the I-shaped end of the winding assembly 132 of stacked plate assemblies 134 in FIG. 1F can be sequentially dipped in a pool of molten solder to provide both physical strength and electrical continuity between uninsulated materials in the sub-plates. Capillary action of the fluxed exposed copper surfaces of the sub-plates 336 allows all of the connections to be formed in situ simultaneously, as the insulating coating prevents solder from adhering except in the desired locations. The transition upward (or downward) in the slot 129 is accomplished at the solder joint by switching the conducting side. Ideally the end turn thickness is preserved, and the solder joint has enough contact area to have insignificant effect on the coil resistance. Particular care must be exercised at the top of the slot 129 as the flux lines can become distorted, increasing AC copper loss. The use of conventional wires for the turns at the top of the slot 129 and slot wedges can help keep the flux lines parallel to the thin direction of the plate assembly 134, or alternatively a semi-magnetic material can be mounted atop the stacked plate assemblies 134 to achieve such result, as shall be discussed further below.

In another further related embodiment, FIG. 1F shows a cross sectional view of a stator with stacked layers of plate assemblies 134 mounted around teeth 124 with slots 129 (or gaps) between each tooth 124. Each plate assembly 134 can include insulated coatings on copper material comprising each plate assembly 134 and unused space in the gap 129 thus defining the fill factor. By cutting sub-plates 336 from thin sheets sized to closely fit the slot 129, cross sections of slots 129 can substantially increase the fill factor of conductive material in the gap or slot 129. Very high slot 129 fill factors of at least 50-70% can be achieved limited only by tolerances and insulation thickness.

In a related embodiment, FIG. 1A depicts a stacked plate stator device 110 with a plurality of stacked U-shaped sub-plates 336 positioned around one tooth 124. In related embodiments, selected winding assemblies 132 can be configured with some top coil turns using conventional copper wire mounted around at least one tooth 124.

Another embodiment using a pair of L-shaped sub-plates 336 is depicted in FIGS. 8A and 8B which shows a partially exploded view of the components of a plate assembly 834 comprising two sets of L-shaped sub-plate portions, including left L-shaped sub-plate-portions 842, 844 and right L-shaped sub-plate portions 852, 854. Sub-plate portion 842 underside (not shown) can be coated with an insulating material, while the top side is exposed copper and leg can be coated with an insulating material. Sub-plate portion 844 underside (not shown) can be completely exposed copper and the top side can be completely coated with the insulating material. Sub-plate portion 852 underside (not shown) can be completely coated with an insulating material and the cross-hatched top side is completely exposed copper. Sub-plate portion 854 can be completely coated with an insulating material on its underside (not shown) and its top side can be coated with an insulating material except for a portion of the leg, which is exposed copper. In related embodiments:

a) Left sub-plate portions 842 and 852 can be individually positioned such that the copper exposed portions thereof align with right sub-plate portions 844 and 854 respectively to form left and right sub-plates 836 and 837 as depicted in FIGS. 8A and 8B. When left and right sub-plates 836 and 837 are mounted one above the other such that the corresponding uninsulated locations match, a single continuous path of electrical current is provided through one plate assembly to the other. The left and right sub-plates 836 and 837 are then mounted one with the other to form a completed plate assembly 834 as depicted in FIG. 8B. A plurality of such plate assemblies 834 can then be congruently stacked one upon the other to form a complete winding assembly for a stacked plate stator device;

b) Skin thickness effect is the tendency of an alternating electric currents to be distributed within the conductor such that the current density is largest near the surface of the conductor and decreases exponentially with greater depths in the conductor. The current flows mainly in the skin of the conductor, i.e. between the outer surface of the conductor and a level called skin depth. The skin depth varies inversely with the square root of the current frequency. The resulting eddy currents from high field frequencies increase the effective resistance, or conversely decrease the conductance of the windings. In a concentrated winding, the coil wraps around a single stator tooth, climbing one plate assembly 834 thickness at each turn. The plate assemblies 834 should be thin enough to avoid "skin thickness effects"; and c) When two or more conductors are placed near to each other, then their electromagnetic fields interact with each other and such interaction is referred to as the "proximity effect". Due to this interaction, the current in each of them is redistributed such that the greater current density is concentrated in that part of the strand most remote from the interfering conductor. If the conductors carry the current in the same direction, then the magnetic field of the halves of the conductors which are close to each other is cancelling each other and hence no current flow through that portion of the conductor. The current is crowded in the remote half portion of the conductor. When the conductors carry the current in the opposite direction, then the close part of the conductor carries, the more current and the magnetic field of the far off half of the conductor cancel each other. Thus, the current is zero in the remote half of the conductor and crowded at the nearer part of the conductor.

In yet another embodiment, a distributed winding comprising stacked and interleaved plate assemblies 134 will be described. For ease in visualizing the construction of a distributed winding composed of the stacked and interleaved plate assemblies 134, a linear stator array of teeth 124 and slots 129 will be used. Those skilled in the art will appreciate that whether the array is linear or radial they are equivalent. Thus, in related embodiments:

a) FIGS. 9A and 9B include two sets of insulated C-shaped sub-plates, i.e. a left first set 942, 944 and a right second set 952, 954. The set of left and right sub-plates can be configured with selected uncoated, uninsulated copper portions (shown with crotch-hatching) of each sub-plate to ensure connectivity.

b) FIG. 9C depicts a first left plate assembly 934 composed of sub-plate 942 being overlaid congruently atop sub-plate 944 and a first right plate assembly 935 composed of sub-plate 952 being overlaid congruently atop sub-plate 954 in such a fashion that corresponding exposed areas of both sub-plates 942, 944 and sub-plates 952, 954 face each other and thereby form a connected electric loop or winding. However, to interleave the stacks (i.e. winding assemblies 932, 933) of left and right plate assemblies 934 and 935, a series of intermediate steps are required.

c) As shown in FIG. 9D, a first intermediate step, as shown comprises using a first left sub-plate 942 and a second right sub-plate 954 mounted with respect to each other such that the two sub-plates 942, 954 are interleaved and the area defined by the enclosed space is sized to match the width of the teeth 924 in the stator.

d) As shown in FIG. 9E, A second intermediate step comprises the addition of left second sub-plate 944 and right first sub-plate 952 mounted atop their respective counterpart sub-plate 942 and 954, such that each now form a completed plate assembly 934 and 935 respectively and each defining a singular and distinct path of continuity in left plate assembly 934 and right plate assembly 935 respectively, as shown in FIG. 9B. Now it can be seen that the plate assemblies 934 and 935 are structurally interleaved and define three interior passageways, which can be of equal dimensions.

e) In some embodiments, as shown in FIG. 9F, for a more manufacturable sequencing, a linear array of left first sub-plates 942 can be mounted adjacent to one another but without making electrical contact.

f) as shown in FIG. 9G, A linear array of right first sub-plates 952 can be mounted adjacent to one another, but without making electrical contact and interleaved with the left first sub-plates 942. Note once again that the interior opening 975 defined by the interleaved sub-plates 336 is sized to match the width of the stator teeth 124 of the stator body 120 of the stacked plate stator device 110.

g) A next layer or loop of the winding can be by adding left first sub-plates 942, 944 and right second sub-plates 952, 954 employing the same sequence for assembling used to make the first layer in FIGS. 9F and 9G and now forming both stacked and interleaved plate assemblies 934 for a distributed winding assembly 932.

h) As shown in FIG. 9H, as a consequence of the stacking and interleafing of adjacent plate assemblies 934 and 935, interior passageways 985 are formed and circumscribe the stator teeth. The resulting complete winding is composed of a plurality of stacked plate assemblies 934 and 935 each now define a single continuous path of electrical conductivity. By continuing this construction technique subsequent layers or turns in the winding can be formed.

i) FIG. 10 depicts two sets of teeth 924 shown with the first set in the completed stack of left plate assemblies 934. Since the completed stack of left first plate assemblies 934 spans two teeth 924 in the first set and two teeth 924 in the second set 926 in the completed right plate assembly 935, the resulting winding assembly 132 is referred to as a distributed winding assembly 132. On closer inspection of each upper completed first/left and second/right plate assemblies 934, 935 there are two first and second interleaved plate assemblies 934, 935 mounted beneath, such that each only includes one of the two teeth 924.

In another related embodiment, FIG. 11 shows a 2-phase distributed winding composed of separate stacks of first and second stacked and interleaved plate assemblies 1134, 1135. The first stacked plate assemblies 1134 form a winding assembly 1132 that is connected to (or generates/receives) a first phase of electric power and the second stacked plate assemblies 1135 are connected to a second phase. As with the earlier U/I plate assembly shapes, the stacked plate stator device is configured with insulating alternate layers of plate assemblies 1134, 1135, such that a current winds its way up the corresponding winding assembly 1132, 1133. Note that the first and second phases have to share the space at the ends of the stator. The main advantage of a distributed winding is that there can be an integer number of slots per pole (here two) and this helps with harmonics. 3-phase distributed windings can also be manufactured, but are more complicated as each plate assembly must span three teeth.

In a related tilted plate embodiment, as shown in FIG. 11, the distributed end turns can be interleaved at each turn or some phase ends can be tilted to make room for others as this reduces both the voltage potential and the capacitance between adjacent turns.

In a further related embodiment, a distributed winding of the coil can span multiple slots. The required interleaving of coils makes the formed plate assembly 134 winding more complex as the phase count increases. FIGS. 13A-13D show a 4 pole 12 slot, 3-phase winding with interconnects. Another embodiment can be configured as a 2 pole, 6 slot 129 plate assembly wound high-speed motor where the coil spans the diameter of the stator at each turn. Low pole count motors have a significant end turn resistance, and this technique allows the end pieces to be thicker than the copper in the slots while a conventional winding uses uniform cross-sectional area for the entire length.

In a related embodiment, which comprises an electromagnetic shield 142, wide plate assemblies 134 in a stator winding are subject to eddy currents which increase their effective resistance if there is a field perpendicular to the width causing the current to circulate within the plate. FIG. 1G depicts a cross section of adjacent stacked plate assemblies 134 within the gap between the teeth 124 of the stator and the field lines which can be seen to seriously distort from their otherwise horizontal direction at the top of the stacked plates. In FIG. 1H, inserting a shield or wedge M of semi-magnetic material, such as iron filings in an epoxy mix, into the slot 129 atop the upper most plate assembly 134 in the stacked plate assemblies 134 results in the straightening the skewed field lines that are seen in FIG. 1G, thus reducing these additional AC losses in the winding. Alternatively, the top few turns can use round wires to reduce AC loss where the field is most deformed.

In a related embodiment of an upper-lower multi-layer winding with plates, those skilled in the art will recognize that with multilayer, concentrated windings, sometimes a slot 129 can be shared by coils from different phases. The resulting current mismatch can create a vertical field component which isn't present in single layer windings and this causes extra loss. The effect goes with the square of the cosine of the phase difference so more than three electrical phases can be used to reduce the average effect. Two coils can also be wound using upper/lower regions within the slot 129 instead of side by side to minimize this effect (with round wires the field direction and winding order doesn't matter as much).

In relation to another embodiment, it is well-known by those skilled in the art that stator winding failures can result in failures of the electrical device. A 'shorted turn' in a winding is the most difficult failure because it creates a large drag and there's no easy way to remove it. The stacked and soldered plate assemblies 134 of the present invention can be spring loaded, such that that if shorted the additional drag will quickly heat the winding to the solder melting point and the plate assemblies 134 will be jettisoned to create an open circuit instead of a more troublesome short. In relation to this, the following further related embodiments are depicted:

a) FIGS. 3A-3B and 4A-4B depicts a stacked and interleaved set of plate assemblies 134 wherein alternating plate assemblies 134 on either side of the stack include an integral holed bracket 338, which comprises a spring mounting aperture 439.

b) FIG. 7B shows a single tensile spring-loaded string L attached to each holed bracket K for one set of stacked and interleaved plate assemblies 134 which would pull out all of the U-shapes together once plate assemblies 134 in the stack plate assemblies 134 if they become hot enough to melt the solder.

c) FIGS. 7A and 7C shows multiple tensile spring-loaded lines with one attached to each bracket 338 for one set of stacked and interleaved plates. If any plate assembly 134 which gets hot enough to melt the solder connections the corresponding tensile spring-loaded line L pulls such plate assembly 134 straight out like pulling cards from a deck with a string leaving the remaining plate assemblies 134 in the stack in place.

Thus, in various related embodiments, the stacked plate stator device 110 can be configured such that:

a) Armature coils are formed by connecting them turn by turn with solder instead of using a continuous wire. The advantage is better slot 129 packing which means lower electrical and thermal resistance so the motor is more efficient and runs cooler. However, AC copper loss due to eddy currents can occur if a conductor is thick in a direction perpendicular to field lines within the slot 129 when operating at high commutation frequencies.

b) Formed conductors at high electrical speeds can be configured such that the electromagnetic field aligns with the copper shape. The common hairpin winding is simple version of such a formed conductor, which uses uniform but noncircular wire and butt welds to connect the end turns. However, hairpin windings are not used in concentrated windings. Motors which are designed for hairpins use slots 129 with uniform slot width, wherein the slots may get wider as the radius increases. The plate assemblies 134 are instead designed to form fit to the slot 129 area, maximizing fill.

c) Plate assemblies 134, which are configured as a concentrated winding (coils surround only one tooth) are easiest to visualize. Current flows up or down the slot 129 as it jumps from plate assembly 134 to plate assembly 134 with selective insulation. Since the coil is trapped by a wide hammerhead 128 (also called a shoe or head) at the top of the tooth 124, the coil must be formed in-situ. The formed copper turns are placed in the slot 129 and then connected with solder. The plate assemblies 134 can use L or U-I shapes, can be wider at the ends than in the slot 129 and can be nested or intertwined like pseudo Roebel bars. Litz wires are an extreme example of intertwining wires, which are used in an attempt to balance the inductance and electromagnetic field in each parallel conductor of the bundle to minimize eddy current loss at the expense of slot fill for each slot 129.

d) A semi-magnetic shield suspended in the slot 129 can help ensure that the field lines align with the copper by steering the fringing field between stator hammerheads without greatly increasing the leakage inductance.

e) With multilayer, concentrated windings, sometimes a slot 129 is shared by coils from different phases. The resulting current mismatch can create a vertical field component which isn't present in single layer windings and this causes extra loss. The effect goes with the square of the cosine of the phase difference so more than 3 electrical phases can be used to reduce the average effect. Two coils can also be wound using upper/lower regions within the slot 129 instead of side by side to minimize this effect (with round wires the field direction and winding order doesn't matter as much)

f) Distributed plate assembly 134 windings are also possible with 2 or more phases but the configuration gets more complicated as greater slot 129 spans imply more end turn length to manage.

g) The distributed end turns can be interleaved at each turn or some phase ends can be tilted to make room for others as this reduces both the voltage potential and the capacitance between adjacent turns.

h) With low slot 129 count, the end turns can be routed across the center of the rotor to minimize their length but this means that the rotor is trapped.

i) Soldered plate assemblies 134 can be used with axial or toroidal flux motors as well.

j) The plate assemblies 134 can be preloaded after soldering so that if they experience overheating due to a shorted turn or other fault during operation, they will disengage, preventing current flow and further heating. Fault tolerance is otherwise difficult in permanent magnet high reliability motors.

Thus, in various related embodiments, the stacked plate stator device 110 can be manufactured such that:

a) The conductors (typically made from copper, right or aluminum) start as large sheets of thin conducting metal and individual turn pieces or plate assemblies 134 are cut into trees using CNC, laser, waterjet, EDM, punch etc. to ease batch processing. Alternatively, additive manufacturing could be used.

b) Soldering the plate assemblies 134 can use resistance, induction, convection conduction or radiant heating with pre-applied solder pastes or by dipping some or all of the pre-tinned connections into a solder bath in one operation.

c) Since lap joints are used for soldering, the plate assemblies 134 all have half their normal thickness at the joints. They can be thinned at the joints using CNC or preferentially thickened with additive manufacturing or two thinner plate assemblies 134 can be laminated to create a full thickness except at the lap joint before or during coil assembly.

d) The conductor pieces can be insulated in one operation while on the tree and insulation only needs to be applied on one side of the tree. The pieces can be sprayed or dipped into a polymer bath or insulating tape such as KAPTON™ polyimide tape can be applied to the whole tree before or after cutting.

e) The coil connections can be tested by applying a fixed current and monitoring the temperature and voltage distribution along the path. Likewise, the AC resistance can be tested by applying an AC current. In most cases a rotor need not be present as the effect of the magnet field is usually small relative to the armature field effect.

Thus, in various related embodiments, the stacked plate stator device 110 can include:

a) A stator winding for an electrical device, comprising:
   i. a pair of sub-plates 336 electrically connected one-to-the-other forming a plate assembly 134 having a single continuous path of conductivity there through wherein such plate assembly 134 comprises a first 3600 turn of a stator winding and such turn has an interior passageway sized to accept a stator tooth 124 within; and
   ii. a plurality of such plate assemblies 134 congruently stacked one upon the other, wherein the plate assemblies 134 are sequentially, electrically connected one-to-the-other forming a complete winding about a stator tooth 124 and having a single, continuous path of conductivity there through.

b) The stator winding assembly 132, further including an electromagnetic shield 142 made from a semi-magnetic material, such that the electromagnetic shield 142 can be mounted atop the uppermost plate assembly 134 of the stacked plates.

c) The stator winding assembly 132, wherein the semi-magnetic material can include iron filings (such as iron grains or other iron pieces) in an epoxy mixture.

d) The stator winding assembly 132, wherein each plate assembly 134 in the stacked plate assemblies 134 is electrically and mechanically connected, one to the next, with solder.

e) The stator winding assembly 132, further including means for removing at least a portion of any plate assembly 134 in the winding assembly 132 of stacked plate assemblies 134 if the solder connecting such plate assembly 134 to the adjacent plate assemblies 134 becomes hot enough to melt the solder.

f) The stator winding assembly 132, wherein the means for removing any plate assembly 134 comprises a tensile loaded spring attached to at least one such plate.

g) The stator winding assembly 132, wherein the pairs of individual sub-plates 336 are each configured with a corresponding shape selected from the group consisting of the shapes "C", "U", "I", "J", "F", "H", "T", "E", "W" and "L".

h) The stator winding assembly 132, wherein the selected sub-plates 336 have a thickness sized to minimize skin effect losses at operating frequencies of the electrical device.

i) The stator winding assembly 132, wherein each plate assembly 134 is electrically insulated from all other plate assemblies 134 in each stator winding assembly 132 except for a first uninsulated portion thereof electrically connecting a first plate assembly 134 sequentially preceding it and a second uninsulated portion thereof electrically connected to a second plate assembly 134 sequentially following it in the stacked plate assemblies 134 forming the stator winding assembly 132.

j) The stacked plate stator device 110, wherein the fill-factor for the stator winding assembly 132 is between 50-70%.

k) The stacked plate stator device 110, wherein the fill-factor for the stator winding assembly 132 is at least 70%.

In various further related embodiments, the stacked plate stator device 110 can include:

a) A stator winding assembly 132 mounted about a stator tooth 124 of an electrical device, comprising:

i. a plurality of conductive plate assemblies 134 congruently stacked one upon the other and forming a single continuous path of conductivity there through, wherein;

1) each plate assembly 134 includes an interior passageway 335 sized to accept a stator tooth 124; and 2) each plate assembly 134 is electrically insulated from all other plate assemblies 134 except for a first portion 342 of each plate assembly 134 making electrical contact with the plate assembly 134 sequentially before it, at a corresponding location, and a second portion 344 of each plate assembly 134 making electrical contact with the plate assembly 134 sequentially after and below it, at a corresponding location, such that a single continuous path of electrical conductivity 535 exists between the first plate assembly 134 and the last plate assembly 134 in the stator winding assembly 132.

b) The stator, wherein the width of each plate assembly 134 in the winding assembly 132 of plate assemblies 134 varies with its radial location from the axial centerline of the stator.

c) The stator, wherein the width of each plate assembly 134 in the winding assembly 132 of plate assemblies 134 varies with its radial location with respect to corresponding plate assemblies 134 in each stack of plates.

Various other further related embodiments of the stacked plate stator device 110 can include:

a) A stacked plate stator device 110 with distributed windings, comprising:

i. a plurality of stacked plate assemblies 134 each comprising sub-plates 336 wherein at least a portion of each sub-plate 336 is coated with an insulating material and each plate assembly 134 has an interior passageway there through sized to accept at least one tooth 124 of the stator;

ii. a first set of plate assemblies 134 congruently stacked one upon such that uninsulated portions thereof match one another forming first winding in the stator having a single continuous path of conductivity there through; and iii. a second set of plate assemblies 134 congruently stacked one upon the other, such that the uninsulated portions thereof match one another forming second winding in the stator having a single continuous path of conductivity there through;

iv. wherein, the plate assemblies 134 of the first and second windings are alternatively interleaved and spaced about the stator teeth.

b) The stacked plate stator device 110, wherein the plate assemblies 134 of conductive material having thickness sized to minimize skin effect losses due the operating frequency of the electrical device.

c) The stacked plate stator device 110, wherein the plate's conductive material has a thickness of at most 1 mm.

d) The stacked plate stator device 110, wherein the selected shapes of the sub-plates 336 are selected from shapes "C", "U", "I", "J", "F", "H", "T", "W", "E" and "L".

e) The stacked plate stator device 110 configured as a multiple phase stator.

Here has thus been described a multitude of embodiments of the stacked plate system 100 and the stacked plate stator device 110, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent and should be considered fully included in this specification and the claims appended hereto. Accordingly, since numerous modifications and variations will readily occur to those skilled in the art, the invention is not limited to the exact construction and operation illustrated and described, and thus, all suitable modifications and equivalents may be resorted to, falling within the scope of the invention.

What is claimed is:

1. A stacked plate stator device, comprising:

a) a stator body, comprising:

a stator support member; and a plurality of stator teeth, wherein each stator tooth comprises:

a tooth body;

such that each stator tooth protrudes radially from the stator support member; and such that stator slots are formed between consecutive stator teeth in the plurality of stator teeth; and b) a plurality of winding assemblies, which each comprise:

a plurality of stacked plate assemblies, which each include:

a first sub-plate; and a second sub-plate, such that a second end of the first sub-plate is mechanically and electrically connected to a first end of the second sub-plate;

such that each plate assembly forms an interior passageway, such that the plurality of stacked plate assemblies form a combined passageway of the plurality of winding assemblies;

such that the second end of the second sub-plate is electrically insulated from the first end of the first sub-plate;

wherein the second end of the second sub-plate is adjacent to the first end of the first sub-plate, such that the plate assembly forms a 360-degree turn around the interior passageway;

such that the tooth body protrudes through the combined passageway of the winding assembly;

such that each successive plate assembly is stacked after a prior plate assembly;

such that each successive plate assembly is electrically connected with an immediately preceding plate assembly, such that a front conductive entry portion of each successive plate assembly is electrically connected with a rear conductive exit portion of the immediately preceding plate assembly, such that each winding assembly forms a spiraling continuous path of conductivity, which spirals around the tooth body of the stator tooth;

wherein each plate assembly further comprises a connecting solder, such that the second end of the first sub-plate is connected to the first end of the second sub-plate with the connecting solder; and wherein at least one portion of each plate assembly is configured with a pre-tension, such that the at least one portion of each plate assembly is pulled out of a corresponding winding assembly, when at least one portion of the connecting solder is melted, such that electrical connectivity of the spiraling continuous path of conductivity is broken.

2. The stacked plate stator device of claim 1, wherein each corresponding plate assembly is entirely electrically insulated from adjacent plate assemblies in each corresponding stator winding assembly, except for the front conductive entry portion and the rear conductive exit portion.

3. The stacked plate stator device of claim 2, wherein each corresponding plate assembly is at least partially coated with an electrical insulator, except for the front conductive entry portion and the rear conductive exit portion.

4. The stacked plate stator device of claim 1, wherein:

an inner side of the first end of the first sub-plate is configured with a first notch; and an outer side of the second end of the second sub-plate is configured with a second notch;

such that the first notch and the second notch enable a connection of the spiraling continuous path of conductivity from the second sub-plate of the immediately preceding plate assembly to the first sub-plate of the successive plate assembly.

5. The stacked plate stator device of claim 1, further comprising:

a plurality of electromagnetic shields;

wherein each corresponding electromagnetic shield in the plurality of electromagnetic shields is made from a semi-magnetic material, which is configured with a relative magnetic permeability in a range of 4-30;

wherein each corresponding electromagnetic shield in the plurality of electromagnetic shields is electrically isolated from the stator body and the plurality of winding assemblies;

such that the corresponding electromagnetic shield is mounted between a prior stator tooth and a successive stator tooth, on an outer side of a prior winding assembly and a successive winding assembly;

such that the corresponding electromagnetic shield is configured to guide an electromagnetic field along a lateral length of the corresponding electromagnetic shield, such that the corresponding electromagnetic shield minimizes electromagnetic field interaction with any of the prior winding assembly and the successive winding assembly.

6. The stacked plate stator device of claim 5, wherein each stator tooth further comprises:

a tooth head, which is connected to an outer end of the tooth body;

wherein the tooth head is positioned on an outer side of the winding assembly and wherein the tooth head of each stator tooth is vertically elongated and radially widening, such that the tooth head widens from an inner end of the tooth head to an outer end of the tooth head; and each electromagnetic shield is vertically elongated and radially narrowing from an inner end of the electromagnetic shield to an outer end of the electromagnetic shield; such that a plurality of tooth heads of the plurality of stator teeth overlap radially with the plurality of electromagnetic shields to form an overlapping peripheral electromagnetic shield around an outer periphery of the stacked plate stator device.

7. The stacked plate stator device of claim 1, wherein each winding assembly further comprises:

at least one spring, which is connected to the at least one portion of each plate assembly, such that the at least one spring is configured with the pre-tension.

8. The stacked plate stator device of claim 1, wherein each winding assembly further comprises:

a plurality of springs, which are each configured with the pre-tension, wherein each corresponding spring in the plurality of springs is connected to a first sub-plate of a corresponding plate assembly in the plurality of stacked plate assemblies;

such that the first sub-plate is pulled out of the corresponding winding assembly, when the at least one portion of the connecting solder is melted.

9. The stacked plate stator device of claim 1, wherein the plurality of winding assemblies is configured to be concentrated, such that each winding assembly is mounted around solely one corresponding stator tooth.

10. The stacked plate stator device of claim 1, wherein the plurality of winding assemblies is configured to be distributed, such that each winding assembly is mounted around at least two adjacent stator teeth in the plurality of stator teeth.

11. The stacked plate stator device of claim 10, wherein the plurality of winding assemblies is further configured to be interleaved, such that successive plate assemblies of each successive winding assembly is radially interleaved with preceding plate assemblies of the prior winding assembly on the corresponding intermediate stator tooth.

12. The stacked plate stator device of claim 11, wherein the plurality of winding assemblies further comprises:

a) a plurality of first winding assemblies, each comprising a plurality of corresponding first plate assemblies; and b) a plurality of second winding assemblies, each comprising a plurality of corresponding second plate assemblies;

wherein inner and outer ends of the corresponding second plate assemblies are configured to be bent and upward or downward tilted, such that the inner and outer ends are perpendicularly oriented and interleaving, relative to corresponding first winding assemblies in the plurality of first winding assemblies.

13. The stacked plate stator device of claim 1, wherein the stacked plate stator device is configured as a two-phase distributed and interleaved stacked plate stator device, such that each corresponding general winding assembly in the plurality of winding assemblies further comprises:

a) an outer plate assembly, which comprises:

an outer first sub-plate; and an outer second sub-plate;

such that a second end of the outer first sub-plate is mechanically and electrically connected to a first end of the outer second sub-plate;

such that a second end of the outer second sub-plate is electrically insulated from a first end of the outer first sub-plate;

wherein the second end of the outer second sub-plate is adjacent to the first end of the outer first sub-plate, such that the outer plate assembly forms a 360-degree turn around a first outer interior passageway of the outer plate assembly; and b) an inner plate assembly, which comprises:

an inner first sub-plate; and an inner second sub-plate;

such that a second end of the inner first sub-plate is mechanically and electrically connected to a first end of the inner second sub-plate;

such that a second end of the inner second sub-plate is electrically insulated from a first end of the inner first sub-plate;

wherein the second end of the inner second sub-plate is adjacent to the first end of the inner first sub-plate, such that the inner plate assembly forms a 360-degree turn around a first inner interior passageway of the inner plate assembly;

such that the outer plate assembly and the inner plate assembly are stacked radially with a rear of the outer plate assembly positioned adjacent to a front of the inner plate assembly;

such that the outer plate assembly and the inner plate assembly form a general combined passageway of the corresponding general winding assembly;

such that the outer plate assembly is electrically connected with the inner plate assembly, such that a front conductive entry portion of the outer plate assembly is electrically connected with a rear conductive exit portion of an inner plate assembly, such that the corresponding general winding assembly forms the spiraling continuous path of conductivity, which spirals around a corresponding pair of two tooth bodies of the plurality of stator teeth;

such that the corresponding pair of two tooth bodies protrude through the general combined passageway of the corresponding general winding assembly;

wherein the plurality of winding assemblies comprises:

a first plurality of first winding assemblies, which are oriented in a first vertical orientation with the outer first sub-plate and the inner first sub-plate positioned on a top end of each corresponding first winding assembly;

such that the first winding assemblies are successively laterally electrically connected to conduct a first phase of electrical power; and a second plurality of second winding assemblies, which are oriented in a vertically opposing second vertical orientation with the outer first sub-plate and the inner first sub-plate positioned on a bottom end of each corresponding second winding assembly;

such that the second winding assemblies are successively laterally electrically connected to conduct a second phase of electrical power;

such that the second plurality of second winding assemblies is interleaved with the first plurality of first winding assemblies.

14. The stacked plate stator device of claim 13, wherein the outer first sub-plate is configured as an outer convex horizontally curved segment and the outer second sub-plate is vertically u-shaped; and the inner first sub-plate is configured as an outer convex horizontally curved segment and the inner second sub-plate is vertically u-shaped.

15. The stacked plate stator device of claim 14, wherein each corresponding general winding assembly is configured such that:

the outer second sub-plate comprises:

a left outer vertical portion;

a right outer vertical portion; and an outward bent outer horizontal portion, which is mounted between a lower end of the left outer vertical portion and a lower end of the right outer vertical portion; and the inner second sub-plate comprises:

a left inner vertical portion;

a right inner vertical portion; and an inward bent inner horizontal portion, which is mounted between a lower end of the left inner vertical portion and a lower end of the right inner vertical portion;

such that the outward bent outer horizontal portion and the inward bent inner horizontal portion in combination create an interleaving opening, which enables the interleaving of the second plurality of second winding assemblies with the first plurality of first winding assemblies.

16. The stacked plate stator device of claim 15, wherein the outward bent outer horizontal portion is configured as an outer convex horizontally curved segment, which is mounted between a front side of the lower end of the left outer vertical portion and a front side of the lower end of the right outer vertical portion; and the inward bent inner horizontal portion is configured as an outer convex horizontally curved segment, which is mounted between a rear side of the lower end of the left inner vertical portion and a rear side of the lower end of the right inner vertical portion.

17. A stacked plate stator device, comprising:

a) a stator body, comprising:

a plurality of stator teeth, wherein each stator tooth comprises:

a tooth body; and b) a plurality of general winding assemblies, wherein each corresponding general winding assembly comprises:

an outer plate assembly, which comprises:
  an outer first sub-plate; and
  an outer second sub-plate;
  such that a second end of the outer first sub-plate is
    mechanically and electrically connected to a first
    end of the outer second sub-plate;
  such that a second end of the outer second sub-plate
    is electrically insulated from a first end of the
    outer first sub-plate; and
an inner plate assembly, which comprises:
  an inner first sub-plate; and
  an inner second sub-plate;
  such that a second end of the inner first sub-plate is
    mechanically and electrically connected to a first
    end of the inner second sub-plate;
  such that a second end of the inner second sub-plate
    is electrically insulated from a first end of the
    inner first sub-plate;
such that the outer plate assembly and the inner plate
  assembly are stacked radially with a rear of the outer
  plate assembly positioned adjacent to a front of the
  inner plate assembly;
such that the outer plate assembly and the inner plate
  assembly form a general combined passageway of the
  corresponding general winding assembly;
such that the outer plate assembly is electrically con-
  nected with the inner plate assembly, such that a front
  conductive entry portion of the outer plate assembly is
  electrically connected with a rear conductive exit por-
  tion of an inner plate assembly, such that the corre-
  sponding general winding assembly forms a first spi-
  raling continuous path of conductivity, which spirals
  around a corresponding pair of two tooth bodies of the
  plurality of stator teeth;
wherein the plurality of general winding assemblies com-
  prises:
  a first plurality of first winding assemblies, which are
    oriented in a first vertical orientation with the outer
    first sub-plate and the inner first sub-plate positioned
    on a top end of each corresponding first winding
    assembly;
    such that the first winding assemblies are succes-
      sively laterally electrically connected to conduct a
      first phase of electrical power; and
  a second plurality of second winding assemblies, which
    are oriented in a vertically opposing second vertical
    orientation with the outer first sub-plate and the inner
    first sub-plate positioned on a bottom end of each
    corresponding second winding assembly;
    such that the second winding assemblies are succes-
      sively electrically connected to conduct a second
      phase of electrical power;
  such that the second plurality of second winding assem-
    blies is interleaved with the first plurality of first
    winding assemblies.

18. The stacked plate stator device of claim 17, wherein
the outer first sub-plate is configured as an outer convex
horizontally curved segment and the outer second sub-plate
is vertically u-shaped; and the inner first sub-plate is con-
figured as an outer convex horizontally curved segment and
the inner second sub-plate is vertically u-shaped.

19. The stacked plate stator device of claim 18, wherein
each corresponding general winding assembly is configured
such that:
the outer second sub-plate comprises:
  a left outer vertical portion;
  a right outer vertical portion; and an outward bent outer horizontal portion, which is
    mounted between a lower end of the left outer
    vertical portion and a lower end of the right outer
    vertical portion; and
the inner second sub-plate comprises:
  a left inner vertical portion;
  a right inner vertical portion; and
  an inward bent inner horizontal portion, which is
    mounted between a lower end of the left inner
    vertical portion and a lower end of the right inner
    vertical portion;
  such that the outward bent outer horizontal portion and
    the inward bent inner horizontal portion in combi-
    nation create an interleaving opening, which enables
    the interleaving of the second plurality of second
    winding assemblies with the first plurality of first
    winding assemblies.

20. A stacked plate electrical device, comprising:
a) a device housing;
b) a stacked plate stator device, which is configured to be
  stationary relative to the device housing, wherein the
  stacked plate stator device comprises:
  a plurality of winding assemblies, each comprising:
    a plurality of stacked plate assemblies, each com-
      prising a first sub-plate and a second sub-plate;
      and
c) an electrical rotor, wherein the electrical rotor is
  configured to be rotatable relative to the stacked plate
  stator device;
wherein the stacked plate stator device is configured to
  cause a rotation of the electrical rotor, when at least one
  electrical current is passed through the stacked plate
  stator device; and
wherein the stacked plate stator device is configured such
  that a rotation of the electrical rotor, induces at least one
  electrical current of the stacked plate stator device;
wherein the stacked plate stator device, further comprises:
  a stator body, comprising:
    a stator support member; and
    a plurality of stator teeth, wherein each stator tooth
      comprises:
      a tooth body; and
    such that each stator tooth protrudes from the stator
      support member; and
    such that stator slots are formed between consecutive
      stator teeth in the plurality of stator teeth; and
  the plurality of winding assemblies, which each com-
    prise:
    the plurality of stacked plate assemblies, which each
      include:
      the first sub-plate; and
      the second sub-plate, such that a first end of the
        second sub-plate is mechanically connected to a
        second end of the first sub-plate;
      such that each plate assembly forms an interior
        passageway, such that the plurality of stacked
        plate assemblies form a combined passageway
        of the at least one winding assembly;
      such that the first end of the second sub-plate is
        electrically insulated from the second end of the
        first sub-plate and such that the second end of
        the second sub-plate is electrically connected to
        the first end of the first sub-plate, such that the
        plate assembly forms a 360-degree turn around
        the interior passageway;

such that the tooth body protrudes through the combined passageway of the at least one winding assembly;

such that each successive plate assembly is stacked upon a prior plate assembly;

such that each successive plate assembly is electrically connected with an immediately preceding plate assembly, such that a front conductive entry portion of each successive plate assembly is electrically connected with a rear conductive exit portion of the immediately preceding plate assembly, such that each winding assembly forms a spiraling continuous path of conductivity, which spirals around the tooth body of the stator tooth;

wherein each plate assembly further comprises a connecting solder, such that the second end of the first sub-plate is connected to the first end of the second sub-plate with the connecting solder;

wherein at least one portion of each plate assembly is configured with a pre-tension, such that the at least one portion of each plate assembly is pulled out of a corresponding winding assembly, when at least one portion of the connecting solder is melted, such that electrical connectivity of the spiraling continuous path of conductivity is broken.

21. The stacked plate electrical device of claim 20, wherein:

an inner side of the first end of the first sub-plate is configured with a first notch;

a outer side of the second end of the second sub-plate is configured with a second notch;

such that the first notch and the second notch enable a connection of the spiraling continuous path of conductivity from the second sub-plate of the immediately preceding plate assembly to the first sub-plate of the successive plate assembly.

22. The stacked plate electrical device of claim 20, wherein each winding assembly further comprises:

at least one spring, which is connected to the at least one portion of each plate assembly, such that the at least one spring is configured with the pre-tension.

23. The stacked plate electrical device of claim 20, wherein each winding assembly further comprises:

a plurality of springs, which are each configured with the pre-tension, wherein each corresponding spring in the plurality of springs is connected to a first sub-plate of a corresponding plate assembly in the plurality of stacked plate assemblies;

such that the first sub-plate is pulled out of the corresponding winding assembly, when the at least one portion of the connecting solder is melted.

24. The stacked plate electrical device of claim 20, wherein the plurality of winding assemblies is further configured to be interleaved, such that successive plate assemblies of each successive winding assembly is radially interleaved with preceding plate assemblies of an immediately preceding winding assembly on a corresponding intermediate stator tooth.

25. The stacked plate electrical device of claim 24, wherein the plurality of winding assemblies further comprises:

a) a plurality of first winding assemblies, each comprising a plurality of corresponding first plate assemblies; and b) a plurality of second winding assemblies, each comprising a plurality of corresponding second plate assemblies;

wherein inner and outer ends of the corresponding second plate assemblies are configured to be bent and upward or downward tilted, such that the inner and outer ends are perpendicularly oriented and interleaving, relative to corresponding first winding assemblies in the plurality of first winding assemblies.

26. The stacked plate electrical device of claim 20, wherein the stacked plate stator device is configured as a two-phase distributed and interleaved stacked plate stator device, such that the plurality of winding assemblies further comprises:

a) an outer plate assembly, which comprises:

an outer first sub-plate; and an outer second sub-plate;

such that a second end of the outer first sub-plate is mechanically and electrically connected to a first end of the outer second sub-plate;

such that a second end of the outer second sub-plate is electrically insulated from a first end of the outer first sub-plate; and b) an inner plate assembly, which comprises:

an inner first sub-plate; and an inner second sub-plate;

such that a second end of the inner first sub-plate is mechanically and electrically connected to a first end of the inner second sub-plate;

such that a second end of the inner second sub-plate is electrically insulated from a first end of the inner first sub-plate;

such that the outer plate assembly and the inner plate assembly are stacked radially with a rear of the outer plate assembly positioned adjacent to a front of the inner plate assembly;

such that the outer plate assembly and the inner plate assembly form a general combined passageway of the corresponding general winding assembly;

such that the outer plate assembly is electrically connected with the inner plate assembly, such that a front conductive entry portion of the outer plate assembly is electrically connected with a rear conductive exit portion of an inner plate assembly, such that the corresponding general winding assembly forms a first spiraling continuous path of conductivity, which spirals around a corresponding pair of two tooth bodies of the plurality of stator teeth;

such that the corresponding pair of two tooth bodies protrude through the general combined passageway of the corresponding general winding assembly;

wherein the plurality of winding assemblies comprises:

a first plurality of first winding assemblies, which are oriented in a first vertical orientation with the outer first sub-plate and the inner first sub-plate positioned on a top end of each corresponding first winding assembly;

such that the first winding assemblies are successively laterally electrically connected to conduct a first phase of electrical power; and a second plurality of second winding assemblies, which are oriented in a vertically opposing second vertical orientation with the outer first sub-plate and the inner first sub-plate positioned on a bottom end of each corresponding second winding assembly;

such that the second plurality of second winding assemblies are successively laterally electrically connected to conduct a second phase of electrical power;

such that the second plurality of second winding assemblies is interleaved with the first plurality of first winding assemblies.

27. A stacked plate stator device, comprising:
a) a stator body, comprising:
a stator support member; and
a plurality of stator teeth, wherein each stator tooth comprises:
a tooth body;
such that each stator tooth protrudes radially from the stator support member; and
such that stator slots are formed between consecutive stator teeth in the plurality of stator teeth; and
b) a plurality of winding assemblies, which each comprise:
a plurality of stacked plate assemblies, which each include:
a first sub-plate; and
a second sub-plate, such that a second end of the first sub-plate is mechanically and electrically connected to a first end of the second sub-plate;
such that each plate assembly forms an interior passageway, such that the plurality of stacked plate assemblies form a combined passageway of the plurality of winding assemblies;
such that the second end of the second sub-plate is electrically insulated from the first end of the first sub-plate;
wherein the second end of the second sub-plate is adjacent to the first end of the first sub-plate, such that the plate assembly forms a 360-degree turn around the interior passageway;
such that the tooth body protrudes through the combined passageway of the winding assembly;
such that each successive plate assembly is stacked after a prior plate assembly;
such that each successive plate assembly is electrically connected with an immediately preceding plate assembly, such that a front conductive entry portion of each successive plate assembly is electrically connected with a rear conductive exit portion of the immediately preceding plate assembly, such that each winding assembly forms a spiraling continuous path of conductivity, which spirals around the tooth body of the stator tooth;
wherein the stacked plate stator device is configured as a two-phase distributed and interleaved stacked plate stator device, such that each corresponding general winding assembly in the plurality of winding assemblies further comprises:
an outer plate assembly, which comprises:
an outer first sub-plate; and
an outer second sub-plate;
such that a second end of the outer first sub-plate is mechanically and electrically connected to a first end of the outer second sub-plate;
such that a second end of the outer second sub-plate is electrically insulated from a first end of the outer first sub-plate;
wherein the second end of the outer second sub-plate is adjacent to the first end of the outer first sub-plate, such that the outer plate assembly forms a 360-degree turn around a first outer interior passageway of the outer plate assembly; and
an inner plate assembly, which comprises:
an inner first sub-plate; and
an inner second sub-plate;

such that a second end of the inner first sub-plate is mechanically and electrically connected to a first end of the inner second sub-plate;
such that a second end of the inner second sub-plate is electrically insulated from a first end of the inner first sub-plate;
wherein the second end of the inner second sub-plate is adjacent to the first end of the inner first sub-plate, such that the inner plate assembly forms a 360-degree turn around a first inner interior passageway of the inner plate assembly;
such that the outer plate assembly and the inner plate assembly are stacked radially with a rear of the outer plate assembly positioned adjacent to a front of the inner plate assembly;
such that the outer plate assembly and the inner plate assembly form a general combined passageway of the corresponding general winding assembly;
such that the outer plate assembly is electrically connected with the inner plate assembly, such that a front conductive entry portion of the outer plate assembly is electrically connected with a rear conductive exit portion of an inner plate assembly, such that the corresponding general winding assembly forms the spiraling continuous path of conductivity, which spirals around a corresponding pair of two tooth bodies of the plurality of stator teeth;
such that the corresponding pair of two tooth bodies protrude through the general combined passageway of the corresponding general winding assembly;
wherein the plurality of winding assemblies comprises:
a first plurality of first winding assemblies, which are oriented in a first vertical orientation with the outer first sub-plate and the inner first sub-plate positioned on a top end of each corresponding first winding assembly;
such that the first winding assemblies are successively laterally electrically connected to conduct a first phase of electrical power; and
a second plurality of second winding assemblies, which are oriented in a vertically opposing second vertical orientation with the outer first sub-plate and the inner first sub-plate positioned on a bottom end of each corresponding second winding assembly;
such that the second winding assemblies are successively laterally electrically connected to conduct a second phase of electrical power;
such that the second plurality of second winding assemblies is interleaved with the first plurality of first winding assemblies.

28. A stacked plate electrical device, comprising:
a) a device housing;
b) a stacked plate stator device, which is configured to be stationary relative to the device housing, wherein the stacked plate stator device comprises:
a plurality of winding assemblies, each comprising:
a plurality of stacked plate assemblies, each comprising a first sub-plate and a second sub-plate; and
c) an electrical rotor, wherein the electrical rotor is configured to be rotatable relative to the stacked plate stator device;
wherein the stacked plate stator device is configured to cause a rotation of the electrical rotor, when at least one electrical current is passed through the stacked plate stator device; and wherein the stacked plate stator device is configured such that a rotation of the electrical rotor, induces at least one electrical current of the stacked plate stator device;

wherein the stacked plate stator device, further comprises:

a stator body, comprising:

a stator support member; and a plurality of stator teeth, wherein each stator tooth comprises:

a tooth body; and such that each stator tooth protrudes from the stator support member; and such that stator slots are formed between consecutive stator teeth in the plurality of stator teeth; and the plurality of winding assemblies, which each comprise:

the plurality of stacked plate assemblies, which each include:

the first sub-plate; and the second sub-plate, such that a first end of the second sub-plate is mechanically connected to a second end of the first sub-plate;

such that each plate assembly forms an interior passageway, such that the plurality of stacked plate assemblies form a combined passageway of the at least one winding assembly;

such that the first end of the second sub-plate is electrically insulated from the second end of the first sub-plate and such that the second end of the second sub-plate is electrically connected to the first end of the first sub-plate, such that the plate assembly forms a 360-degree turn around the interior passageway;

such that the tooth body protrudes through the combined passageway of the at least one winding assembly;

such that each successive plate assembly is stacked upon a prior plate assembly;

such that each successive plate assembly is electrically connected with an immediately preceding plate assembly, such that a front conductive entry portion of each successive plate assembly is electrically connected with a rear conductive exit portion of the immediately preceding plate assembly, such that each winding assembly forms a spiraling continuous path of conductivity, which spirals around the tooth body of the stator tooth;

wherein the plurality of winding assemblies is further configured to be interleaved, such that successive plate assemblies of each successive winding assembly is radially interleaved with preceding plate assemblies of an immediately preceding winding assembly on a corresponding intermediate stator tooth;

wherein the plurality of winding assemblies further comprises:

a plurality of first winding assemblies, each comprising a plurality of corresponding first plate assemblies; and a plurality of second winding assemblies, each comprising a plurality of corresponding second plate assemblies;

wherein inner and outer ends of the corresponding second plate assemblies are configured to be bent and upward or downward tilted, such that the inner and outer ends are perpendicularly oriented and interleaving, relative to corresponding first winding assemblies in the plurality of first winding assemblies.

* * * * *